(12) United States Patent
Ishi et al.

(10) Patent No.: US 11,852,511 B2
(45) Date of Patent: Dec. 26, 2023

(54) ABSOLUTE ENCODER

(71) Applicant: MINEBEA MITSUMI Inc., Nagano (JP)

(72) Inventors: Yujin Ishi, Kanagawa (JP); Yasuo Osada, Saitama (JP)

(73) Assignee: MINEBEA MITSUMI Inc., Nagano (JP)

( * ) Notice: Subject to any disclaimer, the term of this patent is extended or adjusted under 35 U.S.C. 154(b) by 102 days.

(21) Appl. No.: 17/593,766

(22) PCT Filed: Mar. 13, 2020

(86) PCT No.: PCT/JP2020/011277
§ 371 (c)(1),
(2) Date: Sep. 24, 2021

(87) PCT Pub. No.: WO2020/203199
PCT Pub. Date: Oct. 8, 2020

(65) Prior Publication Data
US 2022/0221310 A1   Jul. 14, 2022

(30) Foreign Application Priority Data
Mar. 29, 2019 (JP) .................................. 2019-068117

(51) Int. Cl.
*G01D 5/249* (2006.01)
*G01D 5/244* (2006.01)

(52) U.S. Cl.
CPC ....... *G01D 5/2497* (2013.01); *G01D 5/24442* (2013.01)

(58) Field of Classification Search
CPC .... G01D 5/24442; G01D 11/24; G01D 11/30; G01D 2205/60
See application file for complete search history.

(56) References Cited

U.S. PATENT DOCUMENTS 4,942,295 A * 7/1990 Brunner ............. G01D 5/24442
250/231.13
8,878,125 B2   11/2014 Miyajima et al.
(Continued)

FOREIGN PATENT DOCUMENTS

JP   2006-041019   2/2006
JP   2008-064900   3/2008
(Continued)

OTHER PUBLICATIONS

English translation of JP 2016-169966, Magnetic Sensor and Motor; published Sep. 23, 2016, Tsutagawa, et al. (Year: 2016).*
(Continued)

*Primary Examiner* — Steven L Yeninas
(74) *Attorney, Agent, or Firm* — IPUSA, PLLC

(57) ABSTRACT

An absolute encoder includes a circuit board disposed away from a rotation shaft of a motor. The circuit board includes first fixing portions and a second fixing portion. At each of the first fixing portions, an adjustment portion is disposed between the circuit board and a top end portion of a given pillar is provided, the adjustment portion being set to adjust a distance between the circuit board and the top end portion of the given pillar, so that a height of the circuit board at each first fixing portion is set to be the same as a height of the circuit board at the second fixing portion. Each adjustment portion is a resist layer formed between a surface of the circuit board and a top end surface of a given first pillar.

4 Claims, 36 Drawing Sheets

(56) References Cited

U.S. PATENT DOCUMENTS

| | | |
|---|---|---|
| 2009/0191730 A1 | 7/2009 | Ito et al. |
| 2011/0187351 A1 | 8/2011 | Hunger |
| 2012/0187942 A1* | 7/2012 | Lee .................... G01D 5/24442 |
| | | 324/207.25 |
| 2013/0057975 A1* | 3/2013 | Jang ....................... G02B 7/023 |
| | | 324/207.21 |
| 2018/0248537 A1 | 8/2018 | Muranaka |
| 2020/0232820 A1* | 7/2020 | Rosenegger ......... G01D 5/2053 |
| 2022/0146285 A1* | 5/2022 | Dölz .................... H02K 11/215 |

FOREIGN PATENT DOCUMENTS

| | | |
|---|---|---|
| JP | 2009-182141 | 8/2009 |
| JP | 2013-024572 | 2/2013 |
| JP | 2016-169966 | 9/2016 |
| JP | 2019-027865 | 2/2019 |
| WO | 2017/085976 | 5/2017 |

OTHER PUBLICATIONS

International Search Report of Int. Appl. No. PCT/JP2020/011277 dated Jun. 9, 2020.

* cited by examiner

ABSOLUTE ENCODER

TECHNICAL FIELD

The present invention relates to an absolute encoder.

BACKGROUND ART

Conventionally, for various control mechanical devices, rotary encoders are known to be used to detect locations or angles of movable elements. Such encoders include incremental encoders for detecting relative positions or angles and absolute encoders for detecting absolute positions or angles. For example, Patent Document 1 describes an absolute rotary encoder that includes a plurality of magnetic encoders to magnetically detect an angular position of each of a main shaft and a layshaft.

CITATION LIST

Patent Document

Patent Document 1: Japanese Unexamined Patent Application Publication No. 2013-24572

SUMMARY OF INVENTION

However, the conventional absolute encoder employs a configuration in which a light sensitive element provided on a circuit board is disposed facing a surface of a rotation disk and that detects a rotation amount of the rotation disk. In such a case, in the conventional absolute encoder, if accuracy in mounting a circuit board is decreased, a detection surface of the light sensitive element and the surface of the rotation disk are not parallel to each other, and thus detection accuracy of the light sensitive element might be reduced.

In view of the point described above, an objective of the present invention is to provide an absolute encoder that can mitigate reductions in accuracy in detecting a rotation amount.

An absolute encoder according to an embodiment of the present invention includes a circuit board disposed away from a rotation shaft of a motor in a shaft direction of the rotation shaft thereof, the circuit board being fixed to top end surfaces of multiple pillars each extending from a motor side, by respective locking sections. The absolute encoder includes a sensor disposed, on the circuit board, facing a rotating body that rotates in accordance with rotation of the rotation shaft, the sensor being configured to detect a rotation amount of the rotating body. The circuit board includes first fixing portions each fixed to a top end surface of a given pillar, by a corresponding locking section. The circuit board includes a second fixing portion fixed to a top end surface of a given pillar by a corresponding locking section, the second fixing portion being connected to a ground. At each of the first fixing portions, an adjustment portion is disposed between the circuit board and a top end portion of a given pillar, the adjustment portion being set to adjust a distance between the circuit board and the top end portion of the given pillar, so that a height of the circuit board at a given first fixing portion is set to be the same as a height of the circuit board at the second fixing portion.

Advantageous Effects of Invention

According to an absolute encoder according to the present invention, the effect of mitigating reductions in accuracy in detecting a rotation amount can be obtained.

DESCRIPTION OF THE EMBODIMENTS

The configuration of an absolute encoder according to one or more embodiments of the present invention will be described below in detail with reference to the drawings. Note that that the present invention is not intended to be limited by the embodiments.

First Embodiment

Figure 1:
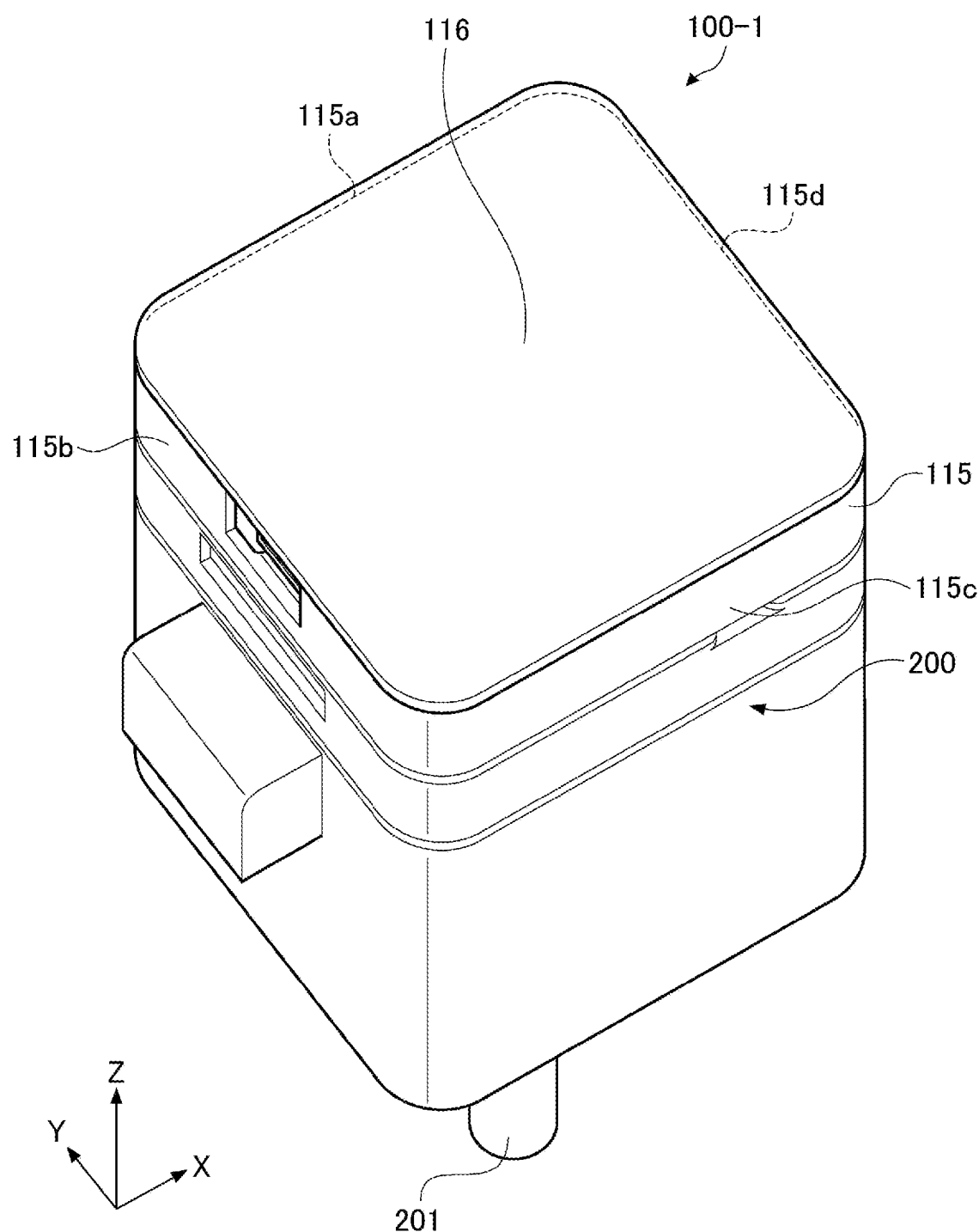
FIG. 1 is a perspective view of an absolute encoder 100-1 attached to a motor 200 according to a first embodiment.

FIG. 1 is a perspective view of an absolute encoder 100-1 attached to a motor 200 according to a first embodiment of the present invention. In the following description, an XYZ orthogonal coordinate system is employed. An X-axis direction corresponds to a horizontal right-left direction, a Y-axis direction corresponds to a horizontal back-front direction, and a Z-axis direction corresponds to a vertical up-down direction. The Y-axis direction and Z-axis direction are each perpendicular to the X-axis direction. The X-axis direction may be expressed by using the word of leftward or rightward, the Y-axis direction may be expressed by using the word of forward or backward, and the z-axis direction may be expressed by using the word of upward or downward. In FIG. 1, a state of the absolute encoder viewed from above in the Z-axis direction is referred to as a plan view, a state of the absolute encoder viewed from the front in the Y-axis direction is referred to as a front view, and a state of the absolute encoder viewed from the side in the X-axis direction is referred to as a side view. Description for the above directions is not intended to limit an applicable pose of the absolute encoder 100-1, and the absolute encoder 100-1 may be used in any pose. Note that illustration of the tooth shape is omitted in the drawings.

Figure 2:
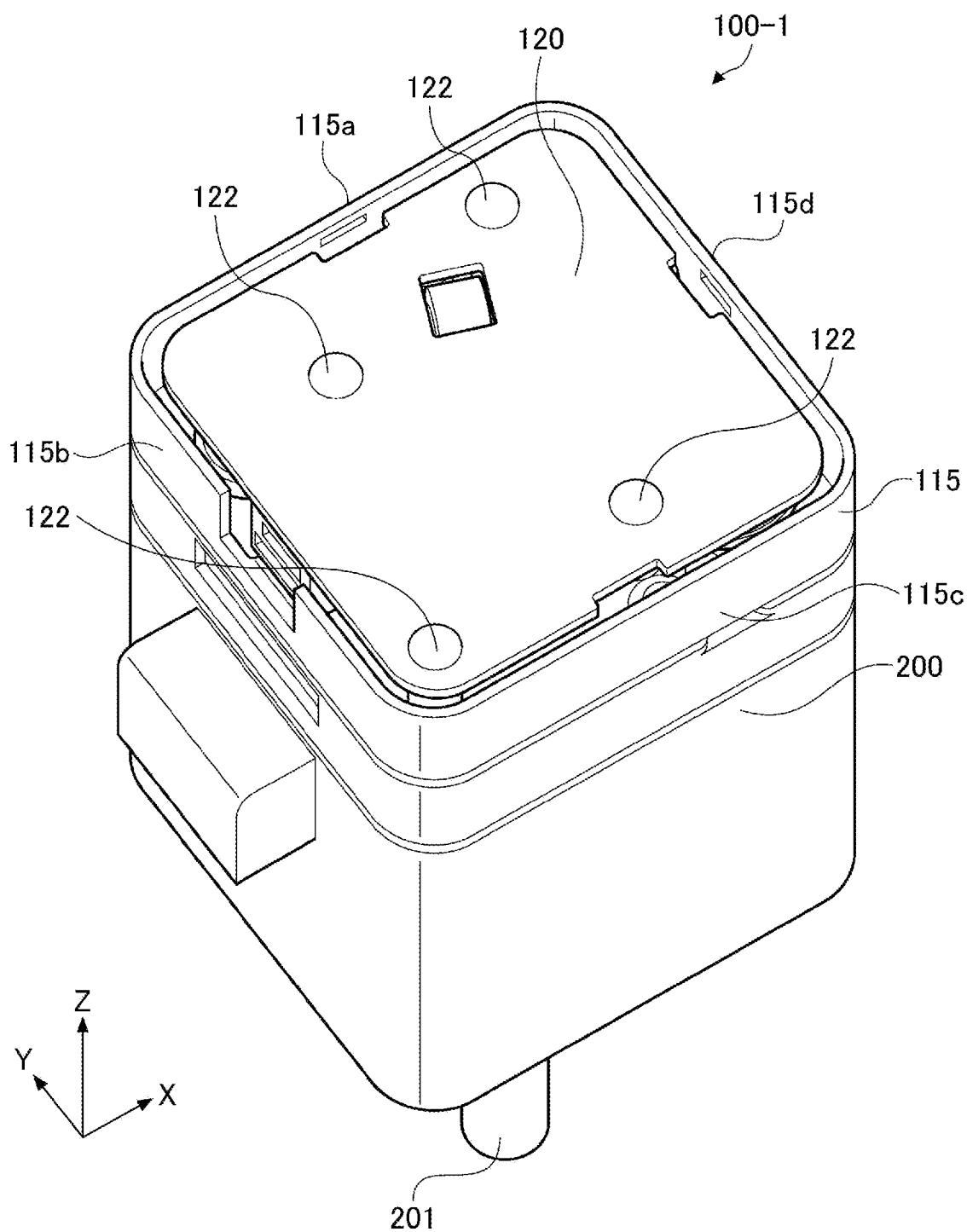
FIG. 2 is a perspective view of the absolute encoder in which a cover 116 is removed from a case 115 illustrated in FIG. 1.
Figure 3:
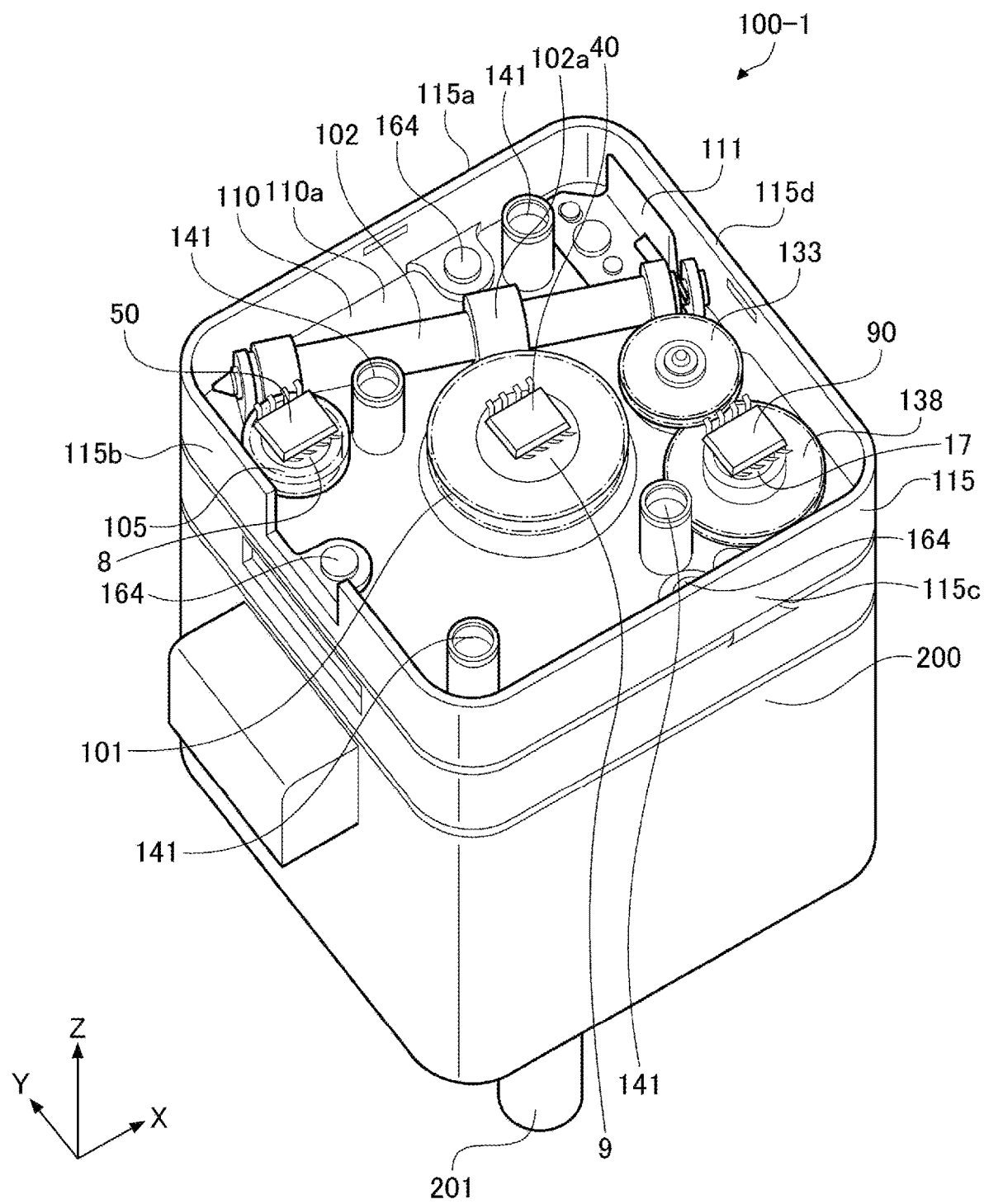
FIG. 3 is a perspective view of the absolute encoder 100-1, as illustrated in FIG. 2, from which a substrate 120 and substrate mounting screws 122 are removed.
Figure 4:
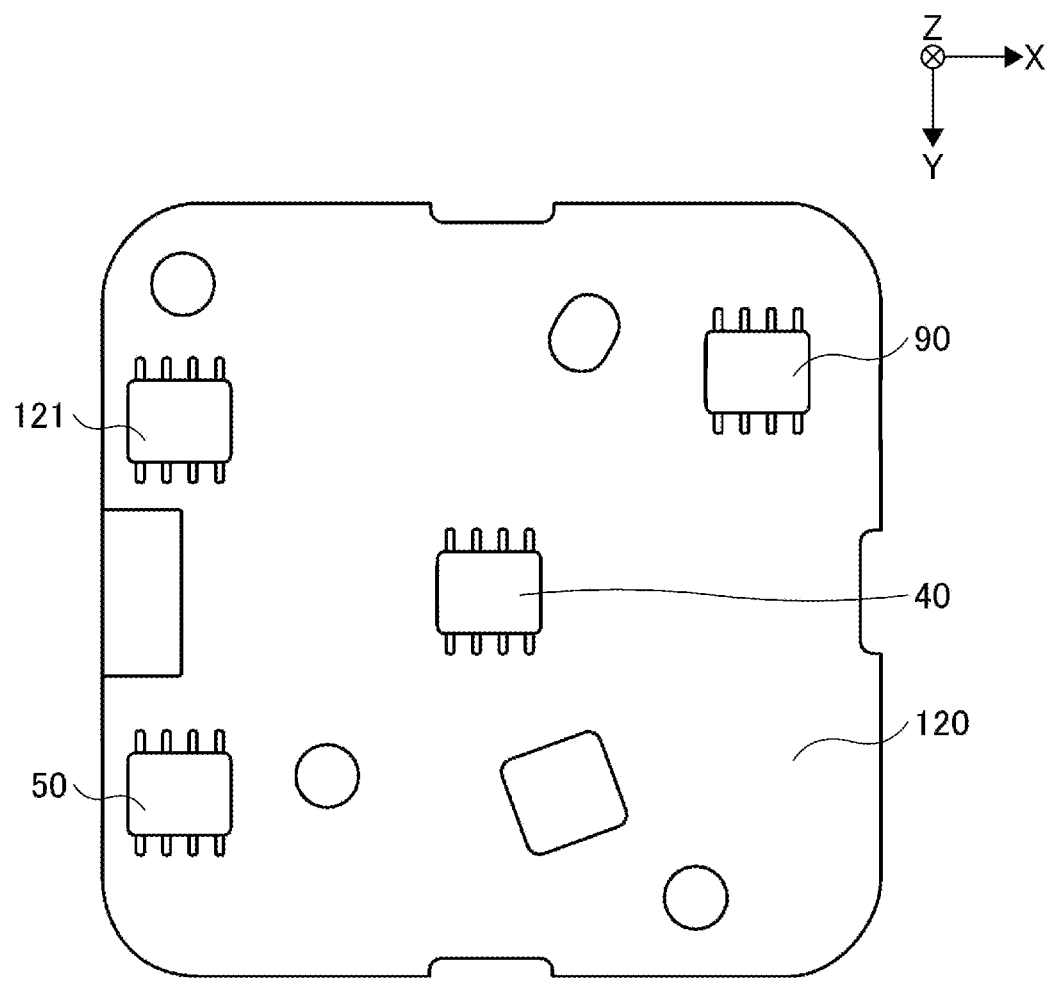
FIG. 4 is a bottom view of the substrate 120.
Figure 5:
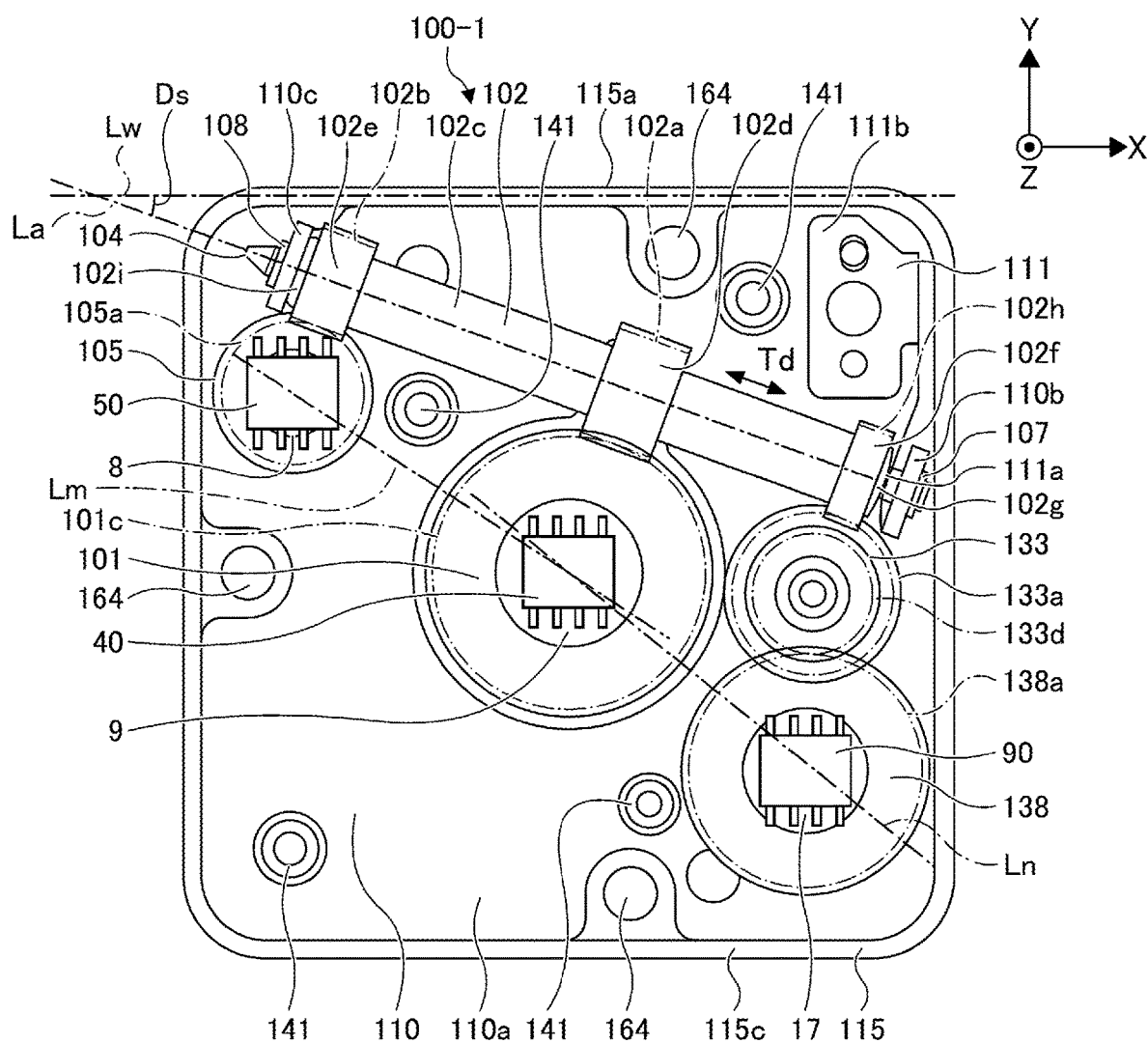
FIG. 5 is a plan view of the absolute encoder 100-1 illustrated in FIG. 3.
Figure 6:
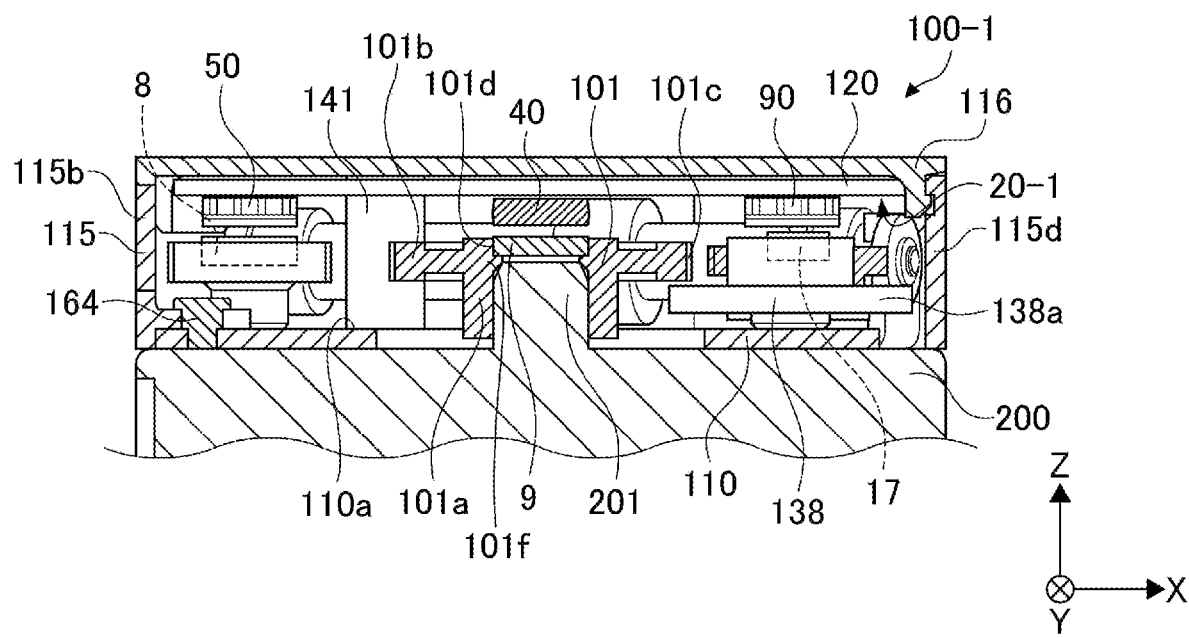
FIG. 6 is a cross-sectional view of the absolute encoder 100-1 taken along a plane that passes through the center of a motor shaft 201 and that is parallel to an X-Z plane, where a second layshaft gear 138 and a magnetic sensor 90 are illustrated.
Figure 7:
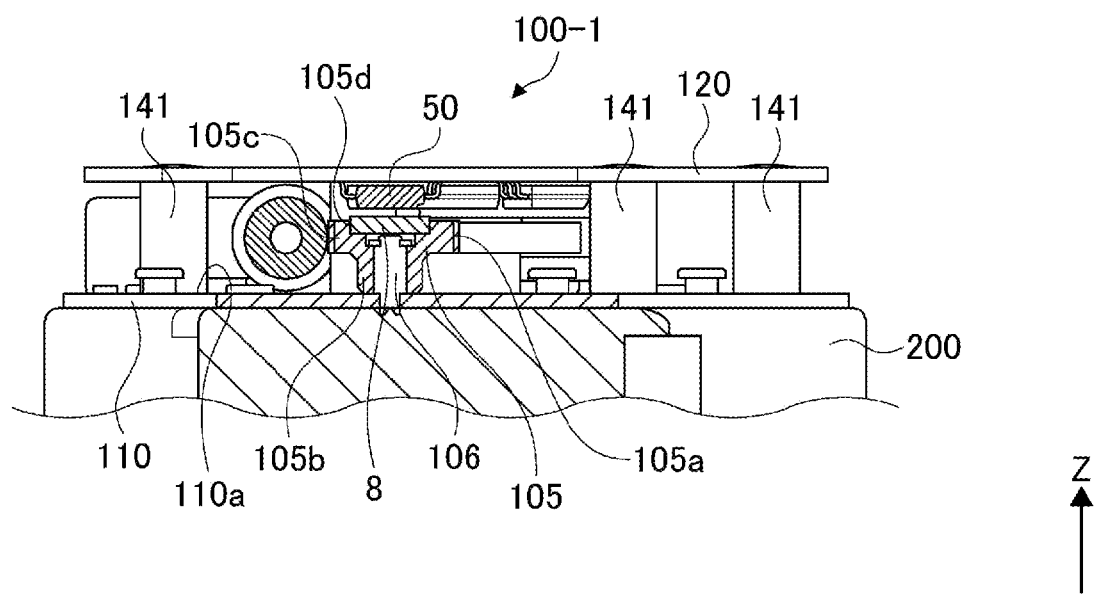
FIG. 7 is a cross-sectional view of the absolute encoder 100-1 taken along a plane that is perpendicular to a centerline of a first intermediate gear 102 and that passes through the center of a first layshaft gear 105.
Figure 8:
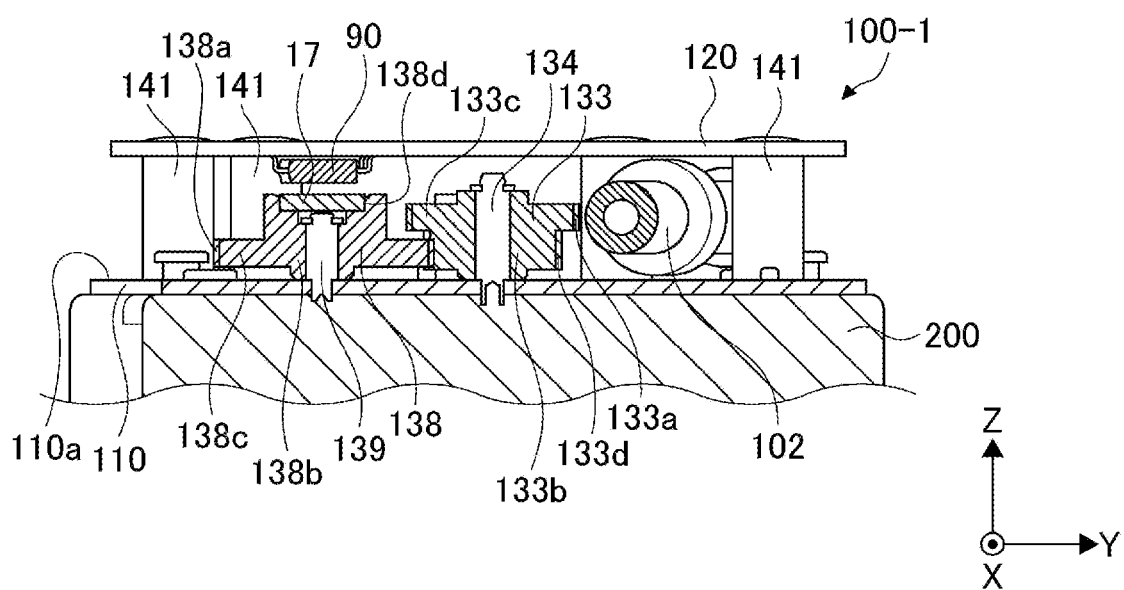
FIG. 8 is a cross-sectional view of the absolute encoder 100-1, when viewed approximately from the right side, taken along a plane that passes through the center of a second layshaft gear 138 and the center of a second intermediate gear 133 and that is parallel to a Z-axis direction.

FIG. 2 is a perspective view of the absolute encoder in which a cover 116 is removed from a case 115 illustrated in FIG. 1. FIG. 3 is a perspective view of the absolute encoder 100-1 illustrated in FIG. 2 from which a substrate 120 and substrate mounting screws 122 are removed. FIG. 4 is a bottom view of the substrate 120. FIG. 5 is a plan view of the absolute encoder 100-1 illustrated in FIG. 3. FIG. 6 is a cross-sectional view of the absolute encoder 100-1 taken along a plane that passes the center of a motor shaft 201 and that is parallel to an X-Z plane, where a second layshaft gear 138 and a magnetic sensor 90 are illustrated. FIG. 7 is a cross-sectional view of the absolute encoder 100-1 taken along a plane that is perpendicular to a centerline of a first intermediate gear 102 and that passes the center of a first layshaft gear 105. FIG. 8 is a cross-sectional view of the absolute encoder 100-1, when viewed approximately from the right side, taken along a plane that passes the center of a second layshaft gear 138 and the center of a second intermediate gear 133 and that is parallel to a Z-axis direction. In FIG. 8, illustration of the case 115 and cover 116 are omitted.

Hereinafter, the configuration of the absolute encoder 100-1 will be described in detail with reference to FIG. 1 to FIG. 8. The absolute encoder 100-1 is an absolute-type encoder that determines a rotation amount of a main spindle of the motor 200 through multiple revolutions and outputs the rotation amount. The motor 200 may be, for example, a stepping motor or a DC brushless motor. As an example, the motor 200 may be applied as a drive source that drives a robot such as for an industrial robot, via a speed reduction mechanism, such as wave gearing. A motor shaft 201 of the motor 200 protrudes from both sides of the motor 200 in the Z-axis direction. The absolute encoder 100-1 outputs the rotational amount of the motor shaft 201 as a digital signal. Note that the motor shaft 201 is an example of a main spindle.

The absolute encoder 100-1 is provided at an end of the motor 200 in the Z-axis direction. The shape of the absolute encoder 100-1 is not particularly restricted. In the embodiment, the absolute encoder 100-1 has an approximately rectangular shape in a plan view, and has a thin, wider rectangular shape in an extending direction (Hereafter referred to as an axial direction. In the first embodiment, the axial direction is a direction parallel to the Z-axis direction.) of a main spindle, in each of a front view and a side view. That is, the absolute encoder 100-1 has a flat cuboid shape in the Z-axis direction.

The absolute encoder 100-1 includes the hollow, square tubular case 115 that houses an internal structure. The case 115 includes a plurality (e.g., four) of outer walls, e.g., an outer wall 115a, an outer wall 115b, an outer wall 115c, and an outer wall 115d that surround at least the main spindle and an intermediate rotating body. The cover 116 is fixed to end portions of the outer wall 115a, the outer wall 115b, the outer wall 115c, and the outer wall 115d of the case 115. The cover 116 has an approximately rectangular shape in a plan view and is a plate-like member that is axially thin.

The outer wall 115a, the outer wall 115b, the outer wall 115c, and the outer wall 115d are coupled in this order. The outer wall 115a and the outer wall 115c are provided parallel to each other. Each of the outer wall 115b and the outer wall 115d extends to side ends to the outer wall 115a and the outer wall 115c, and the outer wall 115b and the outer wall 115d are provided parallel to each other. In this example, the outer wall 115a and the outer wall 115c extend in the X-axis direction in a plan view, and the outer wall 115b and the outer wall 115d extend in the Y-axis direction in a plan view.

The absolute encoder 100-1 includes a main base 110, the case 115, the cover 116, a substrate 120, a leaf spring 111, and a plurality of screws 164. The main base 110 is a base that rotatably supports rotating bodies and gears. The main base 110 includes a base 110a, a plurality (e.g., four) of pillars 141, and a shaft 106, a shaft 134, and a shaft 139.

The base 110a of the main base 110 is a plate-like portion that is on the motor 200-side of the absolute encoder 100-1, and extends in the X-axis direction and Y-axis direction. The case 115 having a hollow cylindrical shape is secured to the base 110a of the main base 110 by a plurality (e.g., three) of screws 164.

The pillars 141 disposed on the main base 110 are approximately cylindrical portions each of which protrudes in an axial direction that is away from the motor 200, relative to the base 110a. The pillars 141 support the substrate 120. The substrate 120 is secured to protruding ends of the pillars 141, by using the substrate mounting screws 122. In FIG. 2, the substrate 120 is provided in a manner of covering an interior of the encoder. The substrate 120 has an approximately rectangular shape in a plan view, and is a printed wiring board that is axially thin. A magnetic sensor 50, a magnetic sensor 40, a magnetic sensor 90, and a microcomputer 121 are mainly provided on the substrate 120.

The absolute encoder 100-1 also includes a main spindle gear 101, a worm gear 101c, a worm wheel 102a, a first intermediate gear 102, a first worm gear 102b, a worm wheel 105a, a first layshaft gear 105, a second worm gear 102h, and a worm wheel 133a. The absolute encoder 100-1 also includes a second intermediate gear 133, a fourth drive gear 133d, a fourth driven gear 138a, a second layshaft gear 138, a permanent magnet 8, a permanent magnet 9, a permanent magnet 17, the magnetic sensor 50, the magnetic sensor 40, the magnetic sensor 90, and the microcomputer 121.

The main spindle gear 101 rotates in accordance with rotation of the motor shaft 201 and transmits the rotation of the motor shaft 201 to the worm gear 101c. As illustrated in FIG. 6, the main spindle gear 101 includes a first cylindrical portion 101a that fits the outer periphery of the motor shaft 201, and includes a disk portion 101b with which a worm gear 101c is formed, and a magnet holding portion 101d that holds the permanent magnet 9. The magnet holding portion 101d has a cylindrical recessed shape that is provided at a middle portion of the disk portion 101b and an upper end surface of the first cylindrical portion 101a. The first cylindrical portion 101a, the disk portion 101b, and the magnet holding portion 101d are integrally formed such that the central axes thereof approximately coincide with one another. The main spindle gear 101 can be formed of various materials, such as resinous materials or metallic materials. The main spindle gear 101 is formed of, for example, a polyacetal resin.

The worm gear 101c is an example of a first drive gear that drives the worm wheel 102a. In particular, the worm gear 101c is a worm gear of which the number of threads is 1, and that is formed on the outer periphery of the disk portion 101b. A rotation axis line of the worm gear 101c extends in the axial direction of the motor shaft 201.

As illustrated in FIG. 5, the first intermediate gear 102 is a gear that transmits rotation of the main spindle gear 101 to each of the worm wheel 105a and the second intermediate gear 133. The first intermediate gear 102 is rotatably supported about a rotation axis line La, by the shaft 104, where the rotation axis line La extends approximately parallel to the base 110a. The first intermediate gear 102 is an approximately cylindrical member that extends in a direction of the rotation axis line La thereof. The first intermediate gear 102 includes a base 102c, a first cylindrical portion 102d with which a worm wheel 102a is formed, a second cylindrical portion 102e with which a first worm gear 102b is formed, and a third cylindrical portion 102f with which a second worm gear 102h is formed. A through-hole is formed in an interior of the first intermediate gear 102, and the shaft 104 is inserted through the through-hole. The shaft 104 is inserted through a hole formed in each of the support 110b and the support 110c that is provided on the base 110a of the main base 110, to thereby rotatably support the first intermediate gear 102. Grooves are provided proximal to both ends of the shaft 104 that respectively protrude outwardly from the support 110b and the support 110c, and a stopper ring 107 and a stopper ring 108 for prevention of the shaft 104 from coming out are fitted to the respective grooves, thereby preventing the shaft 104 from coming out.

An outer wall 115a is provided on the side of the first intermediate gear 102 opposite to the motor shaft 201. An outer wall 115c is provided on the side of the first intermediate gear 102 where the motor shaft 201 is provided, so as to be parallel to the outer wall 115a. The first intermediate gear 102 may be disposed such that the rotation axis line La thereof is directed to any direction. The rotation axis line La of the first intermediate gear 102 may be provided in a plan view in the range of 5° to 30°, relative to an extending direction of the outer wall 115a that is provided on the side of the first intermediate gear 102 opposite to the motor shaft 201. In the example of FIG. 5, the rotation axis line La of the first intermediate gear 102 is inclined at an angle of 20°, relative to the extending direction of the outer wall 115a. In other words, the case 115 includes the outer wall 115a that extends, in a plane view, in a direction inclined at an angle in the range of 5° to 30°, relative to the rotation axis line La of the first intermediate gear 102. In the example of FIG. 5, an inclination Ds of the extending direction of the outer wall 115a, relative to the rotation axis line La of the first intermediate gear 102, is set to indicate 20°.

In the first embodiment, the base 102c of the first intermediate gear 102 has a cylindrical shape, and each of the first cylindrical portion 102d, the second cylindrical portion 102e, and the third cylindrical portion 102f has a cylindrical shape of which the diameter is greater than that of the base 102c. A through-hole is formed in the center of the first intermediate gear 102. The base 102c, the first cylindrical portion 102d, the second cylindrical portion 102e, the third cylindrical portion 102f, and the through-hole are integrally formed such that central axes thereof approximately coincide with one another. A second cylindrical portion 102e, a first cylindrical portion 102d, and a third cylindrical portion 102f are disposed in this order, at locations spaced apart from one another. The first intermediate gear 102 can be formed of various materials, such as resin materials or metallic materials. In the first embodiment, the first intermediate gear 102 is formed of a polyacetal resin.

Each of the support 110b and the support 110c is a protrusive member that protrudes from the base 110a in the positive Z-axis direction, by cutting and raising of a portion of the base 110a of the main base 110. A hole through which the shaft 104 of the first intermediate gear 102 is inserted is formed in each of the support 110b and the support 110c. Further, the grooves are provided proximal to both ends of the shaft 104, which respectively extend from the support 110b and the support 110c, and the stopper ring 107 and the stopper ring 108 for prevention of the shaft 104 from coming out are respectively fitted into the grooves, thereby preventing the shaft 104 from coming out. By such a configuration, the first intermediate gear 102 is rotatably supported about the rotation axis line La.

The leaf spring 111 will be described. When the first worm gear 102b and the second worm gear 102h drive respective worm wheels, a reaction force is applied in the axial direction Td of the first intermediate gear 102, and the position of the first intermediate gear 102 in the axial direction Td might change. In view of the point described above, in the first embodiment, the leaf spring 111 for applying a preloading force to the first intermediate gear 102 is provided. The leaf spring 111 applies the preloading force in a direction of the rotation axis line La of the first intermediate gear 102, to the first intermediate gear 102 to thereby reduce changes in the position of the axial direction Td. The leaf spring 111 includes a mounting portion 111b attached to the base 110a of the main base 110, and includes a sliding portion 111a that extends from the mounting portion 111b and then contacts a hemispherical protrusion 102g. The mounting portion 111b and the sliding portion 111a are each formed of a spring material having a thin plate shape, and a base of the sliding portion 111a is bent at an approximately right angle relative to the mounting portion 111b. As described above, when the leaf spring 111 directly contacts and presses the hemispherical protrusion 102g of the first intermediate gear 102, the first intermediate gear 102 is preloaded in the axial direction Td. Further, a sliding portion 102i of the first intermediate gear 102 contacts the support 110c of the main base 110, and the sliding portion 102i slides. Thus, changes in the position of the first intermediate gear 102 in the axial direction Td can be reduced.

In the first embodiment, the direction of a given reaction force to be applied from the worm wheel 105a of the first layshaft gear 105 due to rotation of the first worm gear 102b engaged with the worm wheel 105a of the first layshaft gear 105 is set to be opposite to the direction of a given reaction force to be applied from the worm wheel 133a of the second intermediate gear 133 due to rotation of the second worm gear 102h engaged with the worm wheel 133a of the second intermediate gear 133. In other words, the tooth shapes of the respective worm gears are set such that components of the resulting reaction forces, in the axial direction Td, to be applied to the first intermediate gear 102 are inverted with respect to each other. Specifically, inclining directions of the teeth at the respective worm gears are set such that components of the reaction forces to be applied, in the axial direction Td, to the first intermediate gear 102 are inversely oriented with respect to each other. In this case, a small resultant reaction force in the axial direction Td is obtained in comparison to a case where directions of components, in the axial direction Td, of the reaction forces to be applied to the first intermediate gear 102 through the worm gears are in the same direction, and thus the preloading force of the leaf spring 111 can be thereby reduced. Accordingly, rotation resistance of the first intermediate gear 102 is reduced, thereby enabling smooth rotation.

The above-described method is effective when sliding resistance caused by engagement of the worm gear 101c of the main spindle gear 101 with the worm wheel 102a of the first intermediate gear 102 is relatively low, and further, a small force to be applied, in the axial direction Td, to the first intermediate gear 102 due to rotation of the main spindle gear 101, is obtained in comparison to a reaction force to be applied to the first intermediate gear 102, through the worm wheel 105a of the first layshaft gear 105 and the worm wheel 133a of the second intermediate gear 133. In contrast, when sliding resistance caused by engagement of the worm gear 101c of the main spindle gear 101 with the worm wheel 102a of the first intermediate gear 102 is relatively high, the following method is effective.

In FIG. 5, when the main spindle gear 101 rotates to the right, a force acts rightward on the first intermediate gear 102, due to sliding resistance caused by engagement of the worm gear 101c of the main spindle gear 101 with the worm wheel 102a of the first intermediate gear 102, and thus the first intermediate gear 102 is to be moved rightward. At this time, when forces generated, in the axial direction Td, through the worm gears at both ends of the first intermediate gear 102 are set to be offset by the method described above, a rightward acting force on the first intermediate gear 102 is relatively increased due to sliding resistance caused by the engagement of the worm gear 101c of the main spindle gear 101 with the worm wheel 102a of the first intermediate gear 102, as described above. In order to prevent the first intermediate gear 102 from moving rightward, against the rightward acting force on the first intermediate gear 102, a pressing force by the leaf spring 111 needs to be increased. In such a case, sliding resistance associated with the sliding portion 111a of the leaf spring 111 and the hemispherical protrusion 102g of the first intermediate gear 102 to be contacted and pressed by the sliding portion 111a, as well as sliding resistance associated with the sliding portion 102i, which is located at the end of the first intermediate gear 102 toward a direction opposite to the hemispherical protrusion 102g, and the support 110c, are increased, thereby increasing the rotational resistance of the first intermediate gear 102.

When the main spindle gear 101 rotates to the right, each of a reaction force to act on the first intermediate gear 102 through the worm wheel 105a of the first layshaft gear 105, due to rotation of the first worm gear 102b engaged with the worm wheel 105a of the first layshaft gear 105, and a reaction force to act on the first intermediate gear 102 through the worm wheel 133a of the second intermediate gear 133, due to rotation of the second worm gear 102h engaged with the worm wheel 133a of the second intermediate gear 133, is set to a force acting in a direction that enables the first intermediate gear 102 to move leftward relative to axial direction Td, and thus a rightward acting force on the first intermediate gear 102 can be reduced due to the above-mentioned sliding resistance caused by engagement of the worm gear 101c of the main spindle gear 101 with the worm wheel 102a of the first intermediate gear 102. In such a manner, a smaller preloading force to be applied to the first intermediate gear 102 can be set by the leaf spring 111. Accordingly, rotation resistance of the first intermediate gear 102 can be reduced, thereby resulting in smooth rotation of the first intermediate gear 102.

In contrast, when the main spindle gear 101 rotates to the left, sliding resistance caused by the engagement of the worm gear 101c of the main spindle gear 101 with the worm wheel 102a of the first intermediate gear 102 causes a leftward acting force on the first intermediate gear 102, relative to the axial direction Td, and thus the first intermediate gear 102 is to be moved leftward. At this time, the reaction forces on the first worm gear 102b and the second worm gear 102h, which are at both ends of the first intermediate gear 102, are both forces to move the first intermediate gear 102 rightward. Thus, in this case as well, a leftward acting force on the first intermediate gear 102 can be reduced. Because the preloading force to be applied to the first intermediate gear 102 by the leaf spring 111 is constantly a leftward acting force relative to the axial direction Td, by reducing the leftward acting force on the first intermediate gear 102, through engagement of the gears at three locations described above, the entirely leftward acting force on the first intermediate gear 102 is also reduced. Accordingly, rotation resistance caused by sliding of the sliding portion 102i at the left end, as illustrated in the figure, of the first intermediate gear 102, as well as sliding of the support 110c provided on the base 110a of the main base 110, can be reduced.

In FIG. 5, the worm wheel 102a is an example of a first driven gear that engages with the worm gear 101c of the main spindle gear 101. The worm wheel 102a is a worm wheel for which the number of teeth is 20 and that is formed on the outer periphery of the first cylindrical portion 102d. The worm gear 101c and the worm wheel 102a constitute a first worm speed-changing mechanism. The rotation axial line of the worm wheel 102a extends in a direction perpendicular to the axial direction of the motor shaft 201.

When the number of threads for the worm gear 101c of the main spindle gear 101 is 1, and the number of teeth for the worm wheel 102a of the first intermediate gear 102 is 20, a reduction ratio is 20. That is, when the main spindle gear 101 rotates 20 revolutions, the first intermediate gear 102 rotates once, expressed by 20÷20.

The first worm gear 102b is an example of a second drive gear that drives the worm wheel 105a and is a gear of the first intermediate gear 102. In particular, the first worm gear 102b is a worm gear for which the number of threads is 5 and that is formed on the outer periphery of the second cylinder portion 102e. The rotation axis line of the first worm gear 102b extends in a direction perpendicular to the axial direction of the motor shaft 201.

In FIGS. 5 and 7, the first layshaft gear 105 is decelerated to rotate together with the permanent magnet 8, in accordance with rotation of the motor shaft 201. The first layshaft gear 105 is an approximately circular member, in a plan view, that includes the cylindrical shaft receiving portion 105b that is rotatably supported by the shaft 106 and that protrudes approximately perpendicular to the base 110a of the main base 110. The member includes a disk portion 105c with which the worm wheel 105a is formed, and a holding portion 105d with which the permanent magnet 8 is held.

In FIG. 7, the disk portion 105c has a disc shape extending radially from the outer periphery of the shaft receiving portion 105b. In the first embodiment, the disk portion 105c is disposed at a location toward a distal end of the shaft receiving portion 105b, relative to the base 110a. The holding portion 105d has a cylindrical recessed shape provided at a distal end surface of the shaft receiving portion 105b, relative to the base 110a, in the axial direction of the disk portion 105c. The shaft receiving portion 105b, the disk portion 105c, and the holding portion 105d are integrally formed such that central axes thereof approximately coincide with one another. The first layshaft gear 105 may be formed of various materials, such as resin materials or metallic materials. In the first embodiment, the first layshaft gear 105 is formed of a polyacetal resin.

The worm wheel 105a is an example of a second driven gear that is engaged with the first worm gear 102b. In particular, the worm wheel 105a is a gear for which the number of teeth is 25 and that is formed on the outer periphery of the disk portion 105c. The first worm gear 102b and the worm wheel 105a constitute a second worm speed-changing mechanism. The rotation axis line of the worm wheel 105a extends in a direction parallel to the axial direction of the motor shaft 201.

When the number of threads for the first worm gear 102b of the first intermediate gear 102 is 5, and the number of teeth for the worm wheel 105a of the first layshaft gear 105 is 25, a reduction ratio is 5. That is, when the first intermediate gear 102 rotates five revolutions, the first layshaft gear 105 rotates once. Thus, when the main spindle gear 101 rotates 100 revolutions, the first intermediate gear 102 rotates 5 rotations, expressed by 100÷20, and the first layshaft gear 105 rotates once, expressed by 5÷5. Because the first layshaft gear 105 rotates together with the permanent magnet 8, when the main spindle gear 101 rotates 100 revolutions, the permanent magnet 8 rotates once. That is, the magnetic sensor 50 can identify a rotational amount of the main spindle gear 101, corresponding to 100 revolutions.

The absolute encoder 100-1 in such a configuration can determine a rotational amount of the main spindle gear 101. As an example, when the main spindle gear 101 rotates once, each of the first layshaft gear 105 and the permanent magnet 8 rotate one-hundredth, i.e., by 3.6°. Thus, when a rotation angle of the first layshaft gear 105 is less than or equal to 3.6°, a rotation amount of the main spindle gear 101 that is rotated by less than or equal to a single revolution can be determined.

In FIG. 5, the second worm gear 102h is an example of a third drive gear that drives the worm wheel 133a and is a gear of the first intermediate gear 102. In particular, the second worm gear 102h is a worm gear for which the number of threads is 1 and that is formed on the outer periphery of the third cylindrical portion 102f. The rotation axis line of the second worm gear 102h extends in a direction perpendicular to the axial direction of the motor shaft 201.

In FIG. 5, the second intermediate gear 133 is a disk-like gear that rotates in accordance with rotation of the motor shaft 201 and that decelerates the rotation of the motor shaft 201 to transmit it to the second layshaft gear 138. The second intermediate gear 133 is provided between the second worm gear 102h and the fourth driven gear 138a that is provided in the second layshaft gear 138. The fourth driven gear 138a engages with the fourth drive gear 133d. The second intermediate gear 133 includes a worm wheel 133a that engages with the second worm gear 102h of the third drive gear, and includes a fourth drive gear 133d which drives the fourth driven gear 138a. The second intermediate gear 133 is formed, for example, of a polyacetal resin. The second intermediate gear 133 is an approximately circular member in a plan view. The second intermediate gear 133 includes a shaft receiving portion 133b that is rotatably supported at the base 110a of the main base 110 and includes an extended portion 133c with which a worm wheel 133a is formed.

In FIG. 5, by providing the second intermediate gear 133, the second layshaft gear 138 described below can be thereby disposed at a location away from the second worm gear 102h. Thus, a distance between the permanent magnet 9 and the permanent magnet 17 can be increased to reduce the effect of leakage flux with respect to each other. Further, by providing the second intermediate gear 133, a greater range of reduction ratios can be thereby set, and thus design flexibility is increased.

In FIG. 8, the extended portion 133c has a disc shape extending radially from the outer periphery of the shaft receiving portion 133b. In the first embodiment, the extended portion 133c is disposed at a location toward a distal end of the shaft receiving portion 133b, relative to the main base 110. The fourth drive gear 133d is formed on the outer periphery of the shaft receiving portion 133b, in a region toward the base 110a relative to the extended portion 133c. The shaft receiving portion 133b and the extended portion 133c are integrally formed such that central axes thereof approximately coincide with each other.

The worm wheel 133a is a gear of the second intermediate gear 133 that is engaged with the second worm gear 102h. In particular, the worm wheel 133a is a worm wheel for which the number of teeth is 30 and that is formed on the outer periphery of the extended portion 133c. The second worm gear 102h and the worm wheel 133a constitute a third worm speed-changing mechanism. The rotation axis line of the worm wheel 133a extends in a direction parallel to the axial direction of the motor shaft 201.

When the number of threads for the second worm gear 102h of the first intermediate gear 102 is 1, and the number of teeth for the worm wheel 133a of the second intermediate gear 133 is 30, a reduction ratio is 30. That is, when the first intermediate gear 102 rotates 30 revolutions, the second intermediate gear 133 rotates once. Accordingly, when the main spindle gear 101 rotates 600 revolutions, the first intermediate gear 102 rotates 30 revolutions, expressed by 600÷20, and the second intermediate gear 133 rotates once, expressed by 30÷30.

The fourth driven gear 133d is a transmission element that drives the fourth driven gear 138a. The fourth drive gear 133d is provided on the side of the main spindle gear 101 opposite to the first layshaft gear 105, and rotates in accordance with rotation of the worm wheel 133a. The fourth drive gear 133d is a flat gear for which the number of teeth is 24 and that is formed on the outer periphery of the shaft receiving portion 133b.

In FIG. 8, the second layshaft gear 138 is a disk-like gear, in a plan view, that rotates in accordance with rotation of the motor shaft 201 and that decelerates the rotation of the motor shaft 201 to thereby transmit it to the permanent magnet 17. The second layshaft gear 138 is rotatably supported about a rotation axis line that approximately extends vertically from the base 110a of the main base 110. The second layshaft gear 138 includes a shaft receiving portion 138b that is rotatably supported at the base 110a of the main base 110, and includes an extended portion 138c with which the fourth driven gear 138a is formed, and a magnet holding portion 138d with which the permanent magnet 17 is held. The shaft receiving portion 138b has a cylindrical shape that annularly surrounds, via a space, the shaft 139 that protrudes from the base 110a of the main base 110.

The extended portion 138c has a disc shape that radially extends from an outer periphery of the shaft receiving portion 138b. In the first embodiment, the extended portion 138c is disposed at a location of the shaft receiving portion 138b toward the base 110a of the main base 110. The magnet holding portion 138d has a cylindrical, recessed shape that is provided, in the axial direction of the shaft receiving portion 138b, at a distal end surface of the shaft receiving portion 138b, relative to the base 110a. The shaft receiving portion 138b, the extended portion 138c, and the magnet holding portion 138d are formed integrally such that central axes thereof approximately coincide with one another. The second layshaft gear 138 can be formed of various materials such as residual materials or metallic materials. In the first embodiment, the second layshaft gear 138 is formed of a polyacetal resin.

The fourth driven gear 138a is a transmission element that is driven by the fourth drive gear 133d. The fourth driven gear 138a and the fourth drive gear 133d constitute a speed reduction mechanism. In particular, the fourth driven gear 138a is a flat gear for which the number of teeth is 40 and that is formed on the outer periphery of the extended portion 138c.

When the number of teeth for the fourth drive gear 133d is 24, and the number of teeth for the fourth driven gear 138a is 40, a reduction ratio is 40/24, i.e., 5/3. When the main spindle gear 101 rotates 1000 revolutions, the first intermediate gear 102 rotates 50 revolutions, expressed by 1000÷20, and the second intermediate gear 133 rotates 5/3 revolutions, expressed by 50÷30. Thus, the second layshaft gear 138 rotates once, expressed by 5/3÷5/3. The second layshaft gear 138 rotates together with the permanent magnet 17. Accordingly, when the main spindle gear 101 rotates 1000 revolutions, the permanent magnet 17 rotates once. In such a manner, the magnetic sensor 90 can identify a rotational amount corresponding to 1000 revolutions of the main spindle gear 101.

Figure 34:
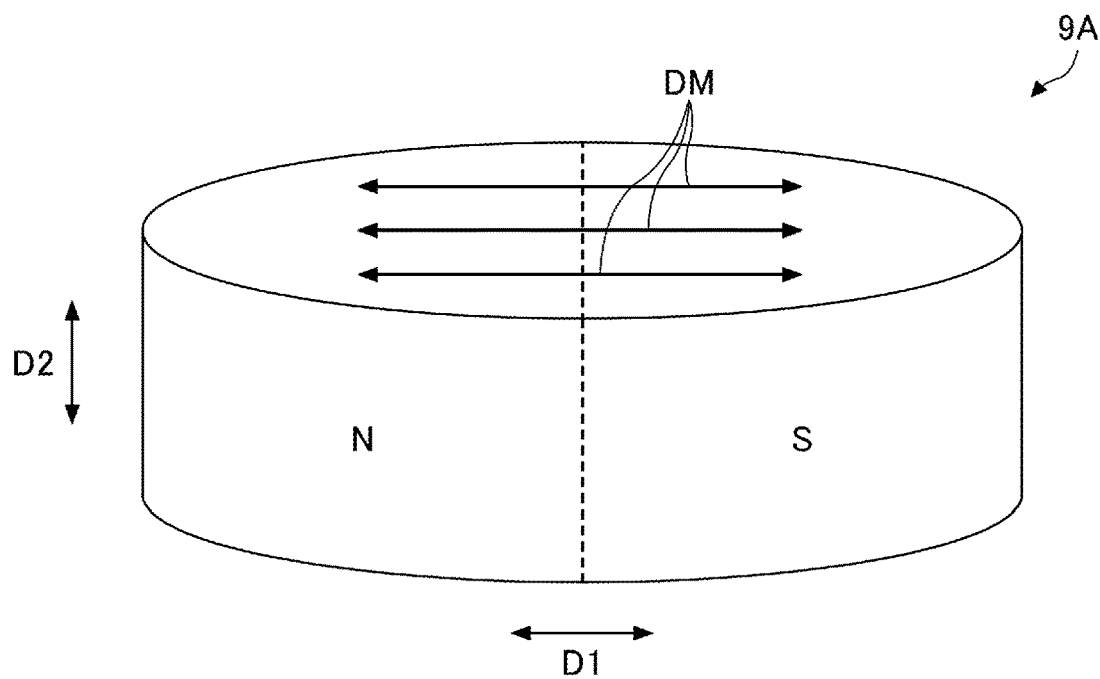
FIG. 34 is a diagram illustrating a permanent magnet 9A applicable to the absolute encoders 100-1 and 100-2 according to the first and second embodiments.
Figure 35:
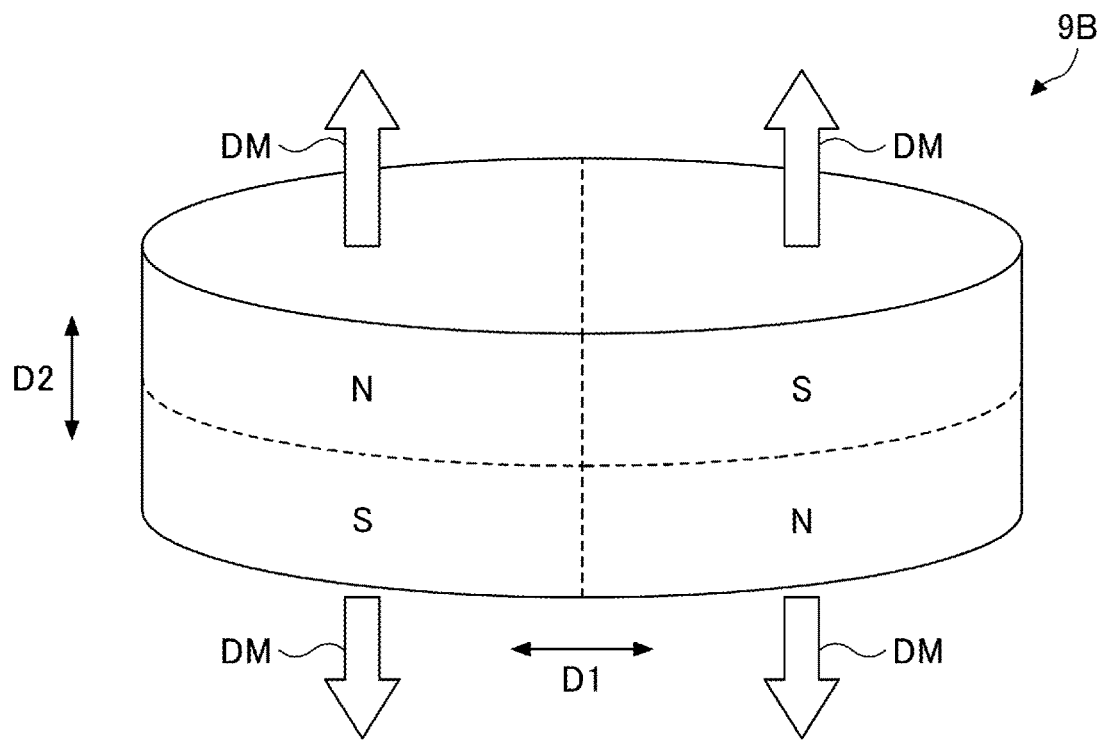
FIG. 35 is a diagram illustrating a permanent magnet 9B applicable to the two absolute encoders 100-1 and 100-2 according to the first and second embodiments.

In FIGS. 5 to 8, the permanent magnet 9 is a first permanent magnet, the permanent magnet 8 is a second permanent magnet, and the permanent magnet 17 is a third permanent magnet. Each of the permanent magnet 8, the permanent magnet 9, and the permanent magnet 17 (hereafter also referred to as each permanent magnet) has an approximately flat, cylindrical shape in an axial direction thereof. Each permanent magnet is formed of a magnetic material such as a ferritic-based material, or Nd (neodymium)-Fe (iron)-B (boron) based material. Each permanent magnet may be, for example, a rubber magnet containing a binder resin, or a bonded magnet. Each permanent magnet has magnetic poles. There is no limitation to a magnetization direction of each permanent magnet. In the first embodiment, as illustrated in FIG. 34 and FIG. 35, two magnetic poles are provided on opposing end surfaces of each permanent magnet facing the magnetic sensor. A distribution of magnetic flux density of each permanent magnet in the rotation direction thereof may be set to indicate a trapezoidal shape, a sinusoidal shape, or a rectangular shape.

Each permanent magnet is partially or entirely housed in a recessed portion formed at a given end of a corresponding rotor, and is secured, for example, with adhesion, a swage, press fit, or the like. The permanent magnet 8 is bonded and fixed to the holding portion 105d for the first layshaft gear 105. The permanent magnet 9 is bonded and fixed to the magnet holding portion 101d of the main spindle gear 101. The permanent magnet 17 is bonded and fixed to the magnet holding portion 138d of the second layshaft gear 138.

When a shorter distance between permanent magnets is set, a greater detection error by a given magnetic sensor might be obtained due to the effect of leakage magnetic flux from adjacent magnets. In view of the point described above, in the example of FIG. 5, in a plan view, the permanent magnet 9 and the permanent magnet 8 are disposed spaced apart from each other, on a sight line Lm that is inclined relative to the outer wall 115a of the case 115. The sight line Lm corresponds to a virtual line that connects the permanent magnet 8 and the permanent magnet 9. The permanent magnet 9 and the permanent magnet 17 are disposed spaced apart from each other, on a sight line Ln that is inclined relative to the outer wall 115a of the case 115. The sight line Ln corresponds to a virtual line that connects the permanent magnet 17 and the permanent magnet 9. In the first embodiment, each of the sight lines Lm and Ln is provided to be inclined relative to the outer wall 115a, and thus a great distance between the permanent magnets can be set in comparison to a case where the sight lines Lm and Ln are each parallel to the outer wall 115a.

Each of the magnetic sensor 50, the magnetic sensor 40, and the magnetic sensor 90 (hereafter also referred to as each magnetic sensor) is a sensor that detects an absolute rotation angle in the range of 0° to 360° corresponding to a single revolution of a given rotor. Each magnetic sensor outputs a signal (e.g., a digital signal) corresponding to a detected rotation angle to the microcomputer 121. Each magnetic sensor outputs the same rotation angle as that before interruption of the power supply, even when power is interrupted and then is supplied again. Thus, a configuration that does not include a backup power supply is achieved.

As illustrated in FIG. 4, each magnetic sensor is secured to the same plane, by a method such as soldering or adhesion achieved with respect to a surface of the substrate 120 toward the base 110a of the main base 110. The magnetic sensor 40 is secured to the substrate 120 so as to be at a location facing, via a fixed space, the end surface of the permanent magnet 9 that is provided with respect to the main spindle gear 101. The magnetic sensor 40 is a first angular sensor that detects a rotation angle of the main spindle gear 101, corresponding to a change in magnetic flux that is generated from the permanent magnet 9. The magnetic sensor 50 is secured to the substrate 120 so as to be at a location facing, via a fixed space, a given end surface of the permanent magnet 8 provided with respect to the first layshaft gear 105. The magnetic sensor 50 is a second angular sensor that detects a rotation angle of the first layshaft gear 105, corresponding to a change in magnetic flux that is generated from the permanent magnet 8. The magnetic sensor 90 is secured to the substrate 120 so as to be at a location facing, via a fixed space, a given end surface of the permanent magnet 17 that is provided with respect to the second layshaft gear 138. The magnetic sensor 90 is a third angular sensor that detects a rotation angle of the second layshaft gear 138, corresponding to a change in magnetic flux that is generated from the permanent magnet 17.

A magnetic angular sensor with relatively high resolution may be used as each angular sensor. A magnetic angular sensor is disposed in an axial direction of a given rotating body so as to face, via a fixed space, end surfaces of each permanent magnet including magnetic poles. The magnetic angular sensor identifies a rotation angle of a given rotor, based on rotation of the magnetic poles, and then outputs a digital signal. As an example, the magnetic angular sensor includes a detecting element that detects magnetic poles, and an arithmetic circuit that outputs a digital signal based on an output of the detecting element. The detecting element may include a plurality (e.g., four) of magnetic field-detecting elements, such as Hall elements or giant magneto resistive (GMR) elements.

The arithmetic circuit may determine a rotation angle by table processing in which a look-up table is used with, for example, a difference or ratio, as a key, between outputs of the plurality of detecting elements. The detecting element and arithmetic circuitry may be integrated on one IC chip. The IC chip may be embedded in a resin that has a thin cuboid contour. Each magnetic sensor outputs, to the microcomputer 121, an angle signal that is a digital signal corresponding to a rotation angle of a given rotor, where the rotation angle is detected through a wiring member not illustrated. For example, each magnetic sensor outputs a rotation angle of a corresponding rotor as a digital signal of multiple bits (e.g., 7 bits).

Figure 9:
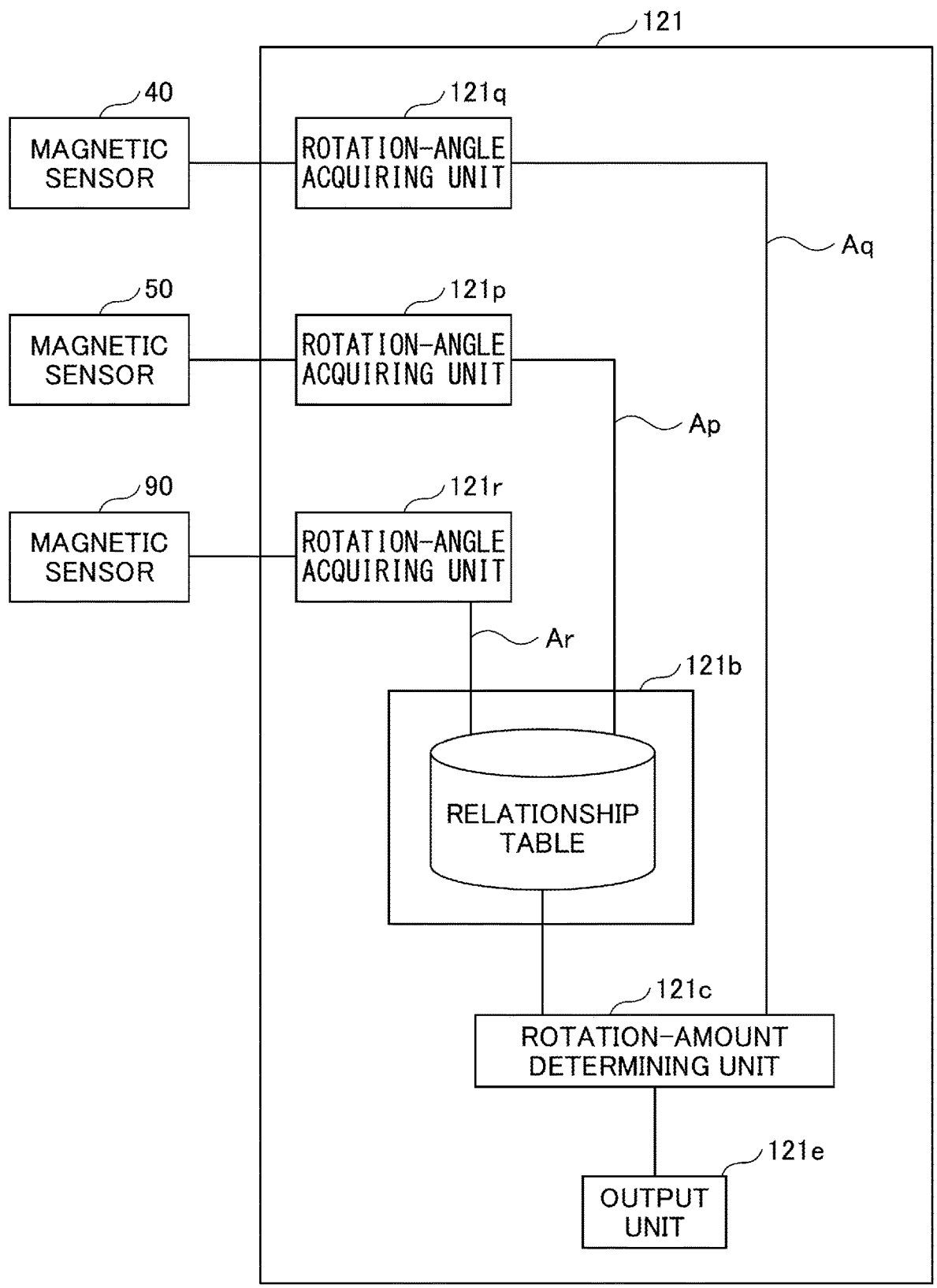
FIG. 9 is a diagram illustrating a functional configuration of a microcomputer 121 provided in the absolute encoder 100-1 according to the first embodiment of the present invention.

FIG. 9 is a diagram illustrating the functional configuration of the microcomputer 121 that is provided in the absolute encoder 100-1 according to the first embodiment of the present invention. The microcomputer 121 is secured to the surface of the substrate 120 toward the base 110a of the main base 110, with a method such as soldering or adhesion. The microcomputer 121 is implemented by a CPU, and acquires a digital signal indicating a rotation angle that is output from each of the magnetic sensor 40, the magnetic sensor 50, and the magnetic sensor 90, and then calculates a rotation amount of the main spindle gear 101. Each block of the microcomputer 121 illustrated in FIG. 9 represents a function (function) implemented when the CPU as the microcomputer 121 executes a program. In terms of hardware, each block of the microcomputer 121 may be implemented by an element, such as a central processing unit (CPU) of a computer, or a machine device. In terms of software, each block may be implemented by a computer program or the like. In this description, each functional block achieved by co-operation of hardware with software is illustrated. In this regard, it would be understood by those skilled in the art involved with the specification, that each block can be implemented in various manners by using a combination of hardware and software.

The microcomputer 121 includes a rotation-angle acquiring unit 121p, a rotation-angle acquiring unit 121q, a rotation-angle acquiring unit 121r, a table processing unit 121b, a rotation-amount determining unit 121c, and an output unit 121e. The rotation-angle acquiring unit 121q acquires, based on a signal output from the magnetic sensor 40, a rotation angle Aq that is angle information indicating a rotation angle of the main spindle gear 101. The rotation-angle acquiring unit 121p acquires, based on the signal output from the magnetic sensor 50, a rotation angle Ap that is angle information indicating a rotation angle of the first layshaft gear 105. The rotation-angle acquiring unit 121r acquires a rotation angle Ar that is angle information indicating a rotation angle of the second layshaft gear 138 that is detected by the magnetic sensor 90.

The table processing unit 121b identifies a rotation speed of the main spindle gear 101, corresponding to an acquired rotation angle Ap, by referring to a first relationship table that stores rotation angles Ap and rotation speeds of the main spindle gear 101 each corresponding to a given rotation angle Ap. The table processing unit 121b also identifies a rotation speed of the main spindle gear 101 corresponding to an acquired rotation angle Ar by referring to a second corresponding table that stores rotation angles Ar and rotation speeds of the main spindle gear 101 each corresponding to a given rotation angle Ar.

The rotation-amount determining unit 121c determines a first rotation amount through multiple revolutions of the main spindle gear 101, in accordance with a rotation speed of the main spindle gear 101 identified by the table processing unit 121b, as well as an acquired rotation angle Aq. The output unit 121e converts the rotation amount of the main spindle gear 101 through the multiple revolutions, determined by the rotation-amount determining unit 121c, into information indicating the rotation-amount, and then outputs the information.

In such a configuration, the function and effect of the absolute encoder 100-1 according to the first embodiment will be described.

The absolute encoder 100-1 according to the first embodiment is an absolute encoder that determines a rotation amount of a motor shaft 201 that rotates a plurality of revolutions. The absolute encoder 100-1 includes a worm gear 101c that rotates in accordance with rotation of the motor shaft 201, and a worm wheel 102a that engages with the worm gear 101c. The absolute encoder 100-1 includes a first worm gear 102b that rotates in accordance with rotation of the worm wheel 102a, and a worm wheel 105a that engages with the first worm gear 102b. The absolute encoder 100-1 includes a first layshaft gear 105 that rotates in accordance with rotation of the worm wheel 105a, and a permanent magnet 8 that rotates together with the first layshaft gear 105. The absolute encoder 100-1 includes a magnetic sensor 50 that detects a rotation angle of the permanent magnet 8. In such a configuration, a rotation amount of the motor shaft 201 that rotates a plurality of revolutions can be determined based on a detected result by the magnetic sensor 50. A first worm speed-changing mechanism that includes the worm gear 101c and the worm wheel 102a engaging with the worm gear 101c, as well as a second worm speed-changing mechanism that includes the first worm gear 102b and the first worm wheel 105a engaging with the first worm gear 102b, are included, and thus the absolute encoder 100-1 forms a bent transmission path, thereby enabling the absolute encoder to be made thinner.

An absolute encoder 100-1 according to the first embodiment is an absolute encoder that determines a rotation amount of a motor shaft 201 that rotates a plurality of revolutions. The absolute encoder 100-1 includes a first intermediate rotating body 102 that rotates at a first reduction ratio in accordance with rotation of the motor shaft 201, and a first layshaft gear 105 that rotates at a second reduction ratio in accordance with rotation of the first intermediate rotating body 102. The absolute encoder 100-1 includes a permanent magnet 8 that rotates together with the first layshaft gear 105, and a magnetic sensor 50 that detects a rotation angle of the permanent magnet 8. Where, a rotation axis line of the motor shaft 201 is skew with respect to a rotation axis line of the first intermediate gear 102 and is set to be parallel to a rotation axis line of the first layshaft gear 105. In such a configuration, the rotation amount of the motor shaft 201 that rotates a plurality of revolutions can be determined in accordance with a detected result by the magnetic sensor 50. A rotation axis line of the first intermediate gear 102 is skew with respect to rotation axis lines of the motor shaft 201 and the first layshaft gear 105, and is perpendicular to each of the rotation axis lines, in a front view. Thus, the absolute encoder 100-1 forms a bent transmission path, thereby enabling the absolute encoder to be made thinner.

The absolute encoder 100-1 according to the first embodiment is an absolute encoder that determines a rotation amount of a motor shaft 201 that rotates a plurality of revolutions. The absolute encoder 100-1 includes a speed reduction mechanism that includes a first worm speed-changing mechanism to rotate a permanent magnet 8 in accordance with rotation of the motor shaft 201, and includes a magnetic sensor 50 that detects a rotation angle of the permanent magnet 8, through magnetic poles of the permanent magnet 8. Where, a rotation axis line of the motor shaft 201 is set to be parallel to a rotation axis line of the permanent magnet 8. In such a configuration, a rotation amount of the motor shaft 201 that rotates a plurality of revolutions can be determined in accordance with a detected result by the magnetic sensor 50. The first worm speed-changing mechanism is included, and a rotation axis line of the motor shaft 201, as well as the rotation axis line of the permanent magnet 8, are set to be parallel to each other. Thus, the absolute encoder 100-1 can form a bent transmission path, thereby enabling the absolute encoder to be made thinner.

The absolute encoder 100-1 according to the first embodiment includes a magnetic sensor 40 that detects a rotation angle of the motor shaft 201. In such a configuration, a rotation angle of the motor shaft 201 can be determined based on a detected result by the magnetic sensor 40. In comparison to a case where a magnetic sensor 40 is not included, the absolute encoder 100-1 can increase resolution of identifiable rotation angles of the motor shaft 201.

The absolute encoder 100-1 according to the first embodiment includes a second worm gear 102h that rotates in accordance with rotation of a worm wheel 102a, and includes a worm wheel 133a that engages with the second worm gear 102h, and a second layshaft gear 138 that rotates in accordance with rotation of the worm wheel 133a. The absolute encoder 100-1 includes a permanent magnet 17 that rotates together with the second layshaft gear 138, and a magnetic sensor 90 that detects a rotation angle of the permanent magnet 17. In such a configuration, a rotation amount of the motor shaft 201 that rotates a plurality of rotations can be determined based on a detected result by the magnetic sensor 90. The absolute encoder 100-1 can obtain a great range of identifiable rotation of the motor shaft 201, in comparison to a case where a magnetic sensor 90 is not included.

The absolute encoder 100-1 according to the first embodiment includes a first intermediate gear 102 that includes a first worm gear 102b and a second worm gear 102h, and a direction of a reaction force applied to the first intermediate gear 102 due to rotation of the first worm gear 102b is set to be opposite to a direction of a reaction force applied to the first intermediate gear 102 due to rotation of the second worm gear 102h. In such a configuration, a resultant reaction force of the reaction forces can be reduced in comparison to a case where directions of reaction forces are the same.

In the absolute encoder 100-1 according to the first embodiment, an outer diameter of the worm wheel 102a is set to be smaller than an outer diameter of the worm gear 101c. In such a configuration, it is easy to make the worm wheel 102a thin in comparison to a case in which the outer diameter of the worm wheel 102a is greater.

Hereafter, magnetic interference will be described, where for example, if the main spindle gear 101 and the first layshaft gear 105 are disposed adjacent to each other, a portion of magnetic flux induced through each of the permanent magnet 8 and the permanent magnet 9 might influence a magnetic sensor that does not correspond to the other permanent magnet among the permanent magnet 8 and the permanent magnet 9.

Figure 10:
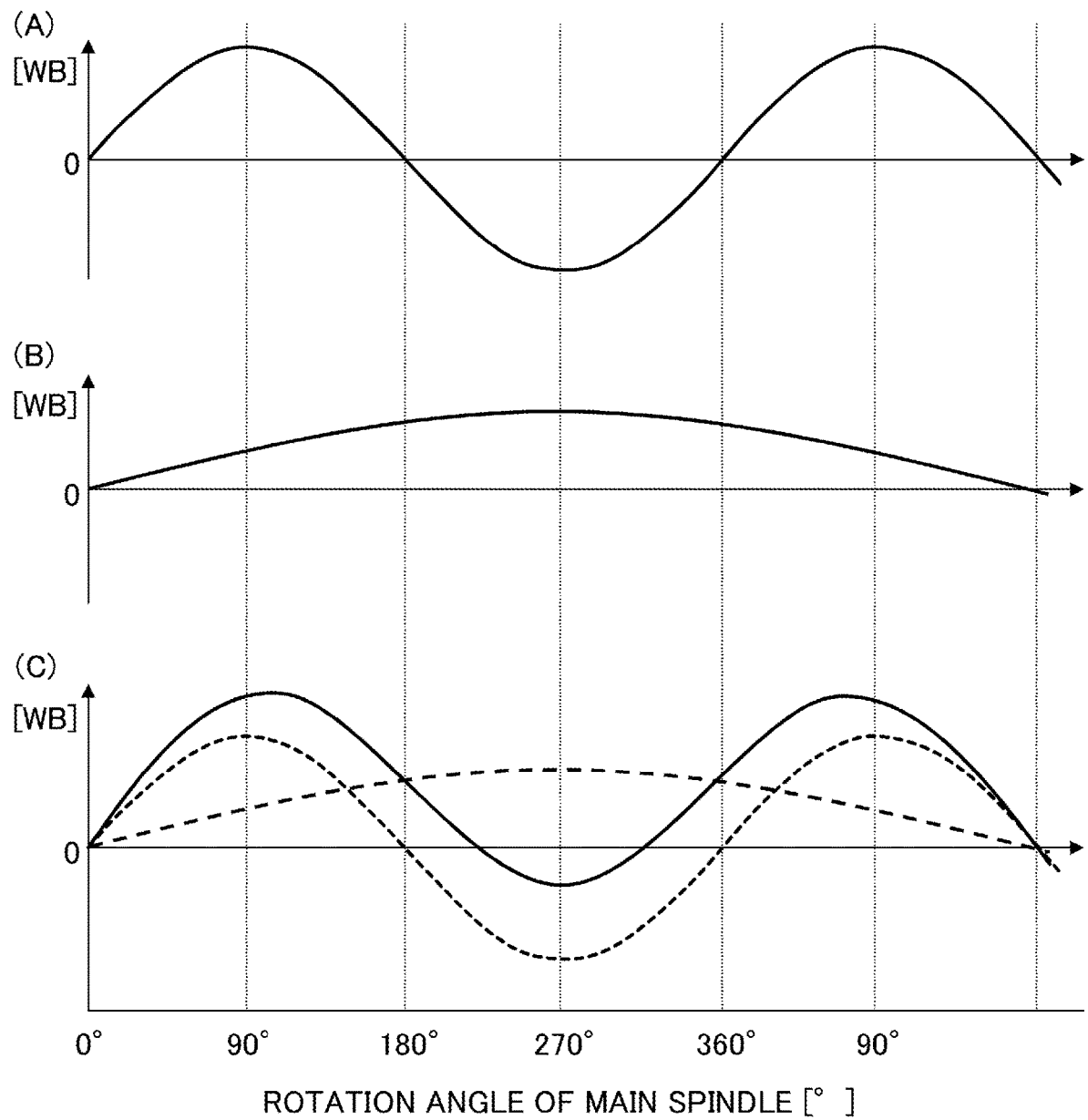
FIG. 10 is a diagram illustrating a manner of a waveform (A) of magnetic flux that is from the permanent magnet 9 provided with respect to a main spindle gear 101 (main spindle gear 1) and that is detected by the magnetic sensor 40, a waveform (B) of magnetic flux that is from the permanent magnet 9 provided with respect to a first layshaft gear 105 (layshaft gear 5) and that is detected by the magnetic sensor 50, and a magnetically interfering waveform (C) of the magnetic flux, from the permanent magnet 9, on which a portion of the magnetic flux from the permanent magnet 8 is superimposed as leakage magnetic flux, where the magnetically interfering waveform (C) is detected by the magnetic sensor 40.

FIG. 10 is a diagram illustrating a manner of a waveform (A) of magnetic flux that is from the permanent magnet 9 provided with respect to the main spindle gear 101 (main spindle gear 1) and that is detected by the magnetic sensor 40, a waveform (B) of magnetic flux that is from the permanent magnet 9 provided with respect to the first layshaft gear 105 (layshaft gear 5) and that is detected by the magnetic sensor 50, and a magnetically interfering waveform (C) of the magnetic flux, from the permanent magnet 9, on which a portion of the magnetic flux from the permanent magnet 8 is superimposed as leakage magnetic flux, where the magnetically interfering waveform (C) is detected by the magnetic sensor 40. The vertical axis represents the magnetic flux, and the horizontal axis represents the rotation angle of the main spindle gear 1. In such a manner, the magnetic sensor 40 desirably detects the waveform (A) above. However, if magnetic interference occurs, the waveform illustrated in (C) above is produced, and thus the waveform could not be detected accurately.

Figure 11:
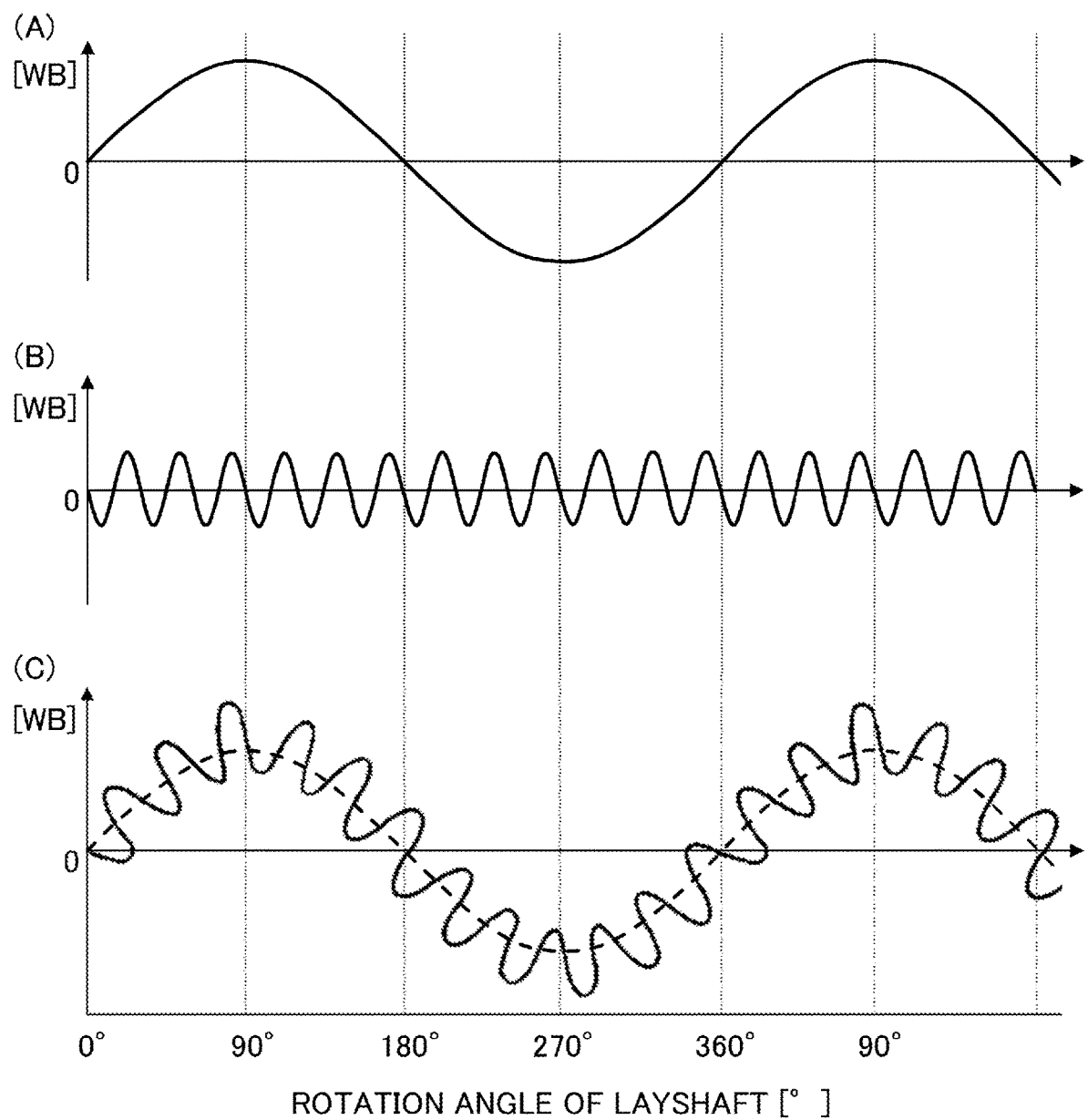
FIG. 11 is a diagram illustrating a concept of a waveform (A) of magnetic flux that is from the permanent magnet 8 provided with respect to the first layshaft gear 105 (layshaft gear 5) and that is detected by a magnetic sensor 50, a waveform (B) of magnetic flux that is from the permanent magnet 9 provided with respect to the main spindle gear 101 (main spindle gear 1) and that is detected by the magnetic sensor 40, and a magnetically interfering waveform (C) of the magnetic flux, from the permanent magnet 8, on which a portion of the magnetic flux from the permanent magnet 9 is superimposed as leakage magnetic flux, where the magnetically interfering waveform (C) is detected by the magnetic sensor 50.

Likewise, FIG. 11 is a diagram illustrating a concept of a waveform (A) of magnetic flux that is from the permanent magnet 8 provided with respect to the first layshaft gear 105 (layshaft gear 5) and that is detected by a magnetic sensor 50, a waveform (B) of magnetic flux that is from the permanent magnet 9 provided with respect to the main spindle gear 101 (main spindle gear 1) and that is detected by the magnetic sensor 40, and a magnetically interfering waveform (C) of the magnetic flux, from the permanent magnet 8, on which a portion of the magnetic flux from the permanent magnet 9 is superimposed as leakage magnetic flux, where the magnetically interfering waveform (C) is detected by the magnetic sensor 50. The vertical axis represents the magnetic flux, and the horizontal axis represents the rotation angle of the layshaft gear 5. In such a manner, the magnetic sensor 50 desirably detects the waveform (A) above. However, if magnetic interference occurs, the waveform illustrated in (C) above is produced, and thus the waveform could not be detected accurately. Further, magnetic interference might occur between the main spindle gear 101 and the second layshaft gear 138, as in FIG. 11(C).

The absolute encoder 100-1 according to the first embodiment includes a case 115 including an outer wall 115a that is disposed on the side of the first intermediate gear 102 opposite to the motor shaft 201, and in a plan view, a rotation axis line La of the first intermediate gear 102 is inclined at an angle of 20°, relative to an extending direction of the outer wall 115a. According to such a configuration, great inclination of an arrangement line of each permanent magnet with respect to the outer wall 115a can be set in comparison to a case where the rotation axis line La of the first intermediate gear 102 is not inclined. In such a manner, a greater distance between permanent magnets can be set. Thus, by increasing a given distance between the permanent magnets, a portion of magnetic flux generated through each of the permanent magnet 8, the permanent magnet 9, and the permanent magnet 17 can cause reductions in the occurrence of magnetic interference that influences a given magnetic sensor that does not correspond to the other magnet among the permanent magnet 8, the permanent magnet 9, and the permanent magnet 17. For example, interference of a portion of magnetic flux, as leak magnetic flux, generated through the permanent magnet 9 that is provided with respect to the main spindle gear 101, in the magnetic sensor 50 provided in order to achieve its primary purpose of detecting changes in magnetic flux that is generated through the permanent magnet 9 with respect to the first layshaft gear 105, can be mitigated. Also, for example, interference of a portion of magnetic flux, as leak magnetic flux, generated through the permanent magnet 8 that is provided with respect to the first layshaft gear 105, in the magnetic sensor 40 provided in order to achieve its primary purpose of detecting changes in magnetic flux that is generated through the permanent magnet 9 with respect to the first layshaft gear 105, can be mitigated. Thus, the effect of leakage flux through adjacent magnets can be reduced.

<Method of Fixing Substrate 120>

Hereafter, a method of fixing the substrate 120 in the absolute encoder 100-1 according to the first embodiment will be specifically described with reference to FIGS. 12 to 14.

In the absolute encoder 100-1 according to the first embodiment, as illustrated in FIG. 6, the detection surface (lower surface) of the magnetic sensor 40 provided on the substrate 120 is disposed in parallel with the upper surface of the permanent magnet 9 provided on the main spindle gear 101, and thus the magnetic sensor 40 can detect a given rotation angle of the main spindle gear 101 (which is an example of a "rotating body"), with relatively high accuracy.

Now, in the absolute encoder 100-1 according to the first embodiment, as illustrated in FIG. 3, four pillars 141 are disposed on the main base 110. Further, as illustrated in FIG. 2, the absolute encoder 100-1 according to the first embodiment employs a configuration in which the substrate 120 at four fixing portions is screwed and fixed to the four pillars 141, by the substrate mounting screws 122 (each of which is an example of a "locking section").

In such a manner, in the absolute encoder 100-1 according to the first embodiment, if heights (heights from the substrate 120 to the base 110a of the main base 110) of the substrate 120 at the four fixing portions differ from one another, the substrate 120 becomes inclined, and consequently the detection surface of the magnetic sensor 40 is not disposed in parallel with the upper surface of the permanent magnet 9. Also, accuracy in a given distance between the detection surface of the magnetic sensor 40 and the upper surface of the permanent magnet 9 is decreased, which might result in reductions in detection accuracy of the magnet sensor 40.

In particular, in the absolute encoder 100-1 according to the first embodiment, at one among the four fixing portions of the substrate 120, a connection terminal that is screwed and fixed by a given substrate mounting screw 122 and that is connected to a ground is provided. A configuration of the substrate 120 at the fixing portion at which the connection terminal is provided differs from that of the substrate 120 at other fixing portions, and thus an offset of the height of the substrate at the one fixing portion, relative to heights of the substrate at the other fixing portions, is likely to result.

Therefore, as described below, the absolute encoder 100-1 according to the first embodiment employs a configuration that can fix the substrate 120 to the four pillars 141, such that heights of the substrate 120 at the four fixing portions are the same. Thus, the absolute encoder 100-1 according to the first embodiment can be fixed in a state in which the substrate 120 is horizontally maintained with respect to the base 110a of the main base 110. In such a case, the detection surface of the magnetic sensor 40 and the upper surface of the permanent magnet 9 can be parallel to each other. Accordingly, the absolute encoder 100-1 according to the first embodiment can mitigate the reduction in detection accuracy of the magnetic sensor 40.

(Configuration of Substrate 120)

Figure 12:
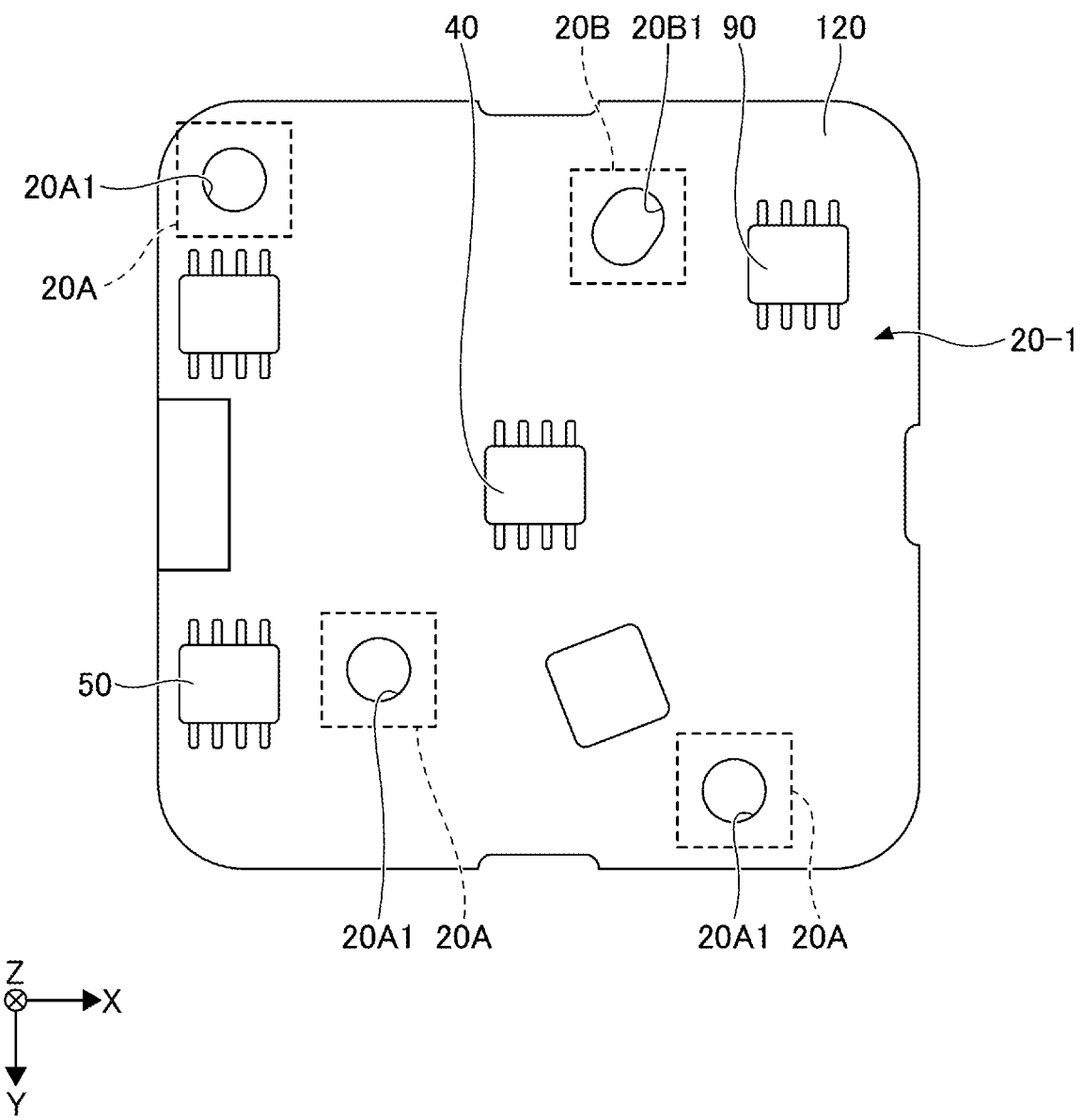
FIG. 12 is a bottom view of the substrate 120 illustrated in FIG. 4 where first fixing portions 20A and a second fixing portion 20B are arranged.

FIG. 12 is a bottom view of the substrate 120 illustrated in FIG. 4 where first fixing portions 20A and a second fixing portion 20B are arranged. As illustrated in FIG. 12, the substrate 120 includes three first fixing portions 20A and one second fixing portion 20B.

The substrate 120 is a circuit board that is disposed away from the motor shaft 201 in the axial direction (Z-axis direction) of the motor shaft 201, which is a rotation shaft of the motor 200, and that is fixed, with given substrate mounting screws 122 (each of which is a locking section), to top ends of the pillars 141 (which is an example of a "pillar") each extending from the main base 110 toward the motor 200. The substrate 120 is disposed facing the permanent magnet 9 (which is an example of a "rotating body") that rotates in accordance with rotation of the motor shaft 201, and the magnetic sensor 40 (which is an example of a "sensor") that detects a rotation amount of the permanent magnet 9 is provided with respect to the substrate 120.

At each first fixing portion 20A, a through-hole 20A1 passing through the substrate 120 vertically (in the Z-axis direction in the figure) is included. Each first fixing portion 20A is a portion at which the substrate 20 is screwed and fixed to given pillars 141, as first pillar 10A, among four pillars 141 provided on the main base 110, by respective substrate mounting screws 122 each passing through a given through-hole 20A1, from the top to bottom thereof.

At the second fixing portion 20B, a through-hole 20B1 passing through the substrate 120 vertically (in the Z-axis direction in the figure), as well as a connection terminal 20h (see FIG. 13) formed in the through-hole 20B1 (see FIG. 13), are included. The second fixing portion 20B is a portion at which the substrate 20 is screwed and fixed to a given pillar 141, as a second pillar 10B, among the four pillars 141 provided on the main base 110, by a given substrate mounting screw 122 passing through the contact terminal 20h, from the top to bottom thereof. The above portion of the substrate 20 is connected to a ground.

(Cross-Sectional Configuration of Substrate 120)

Figure 13:
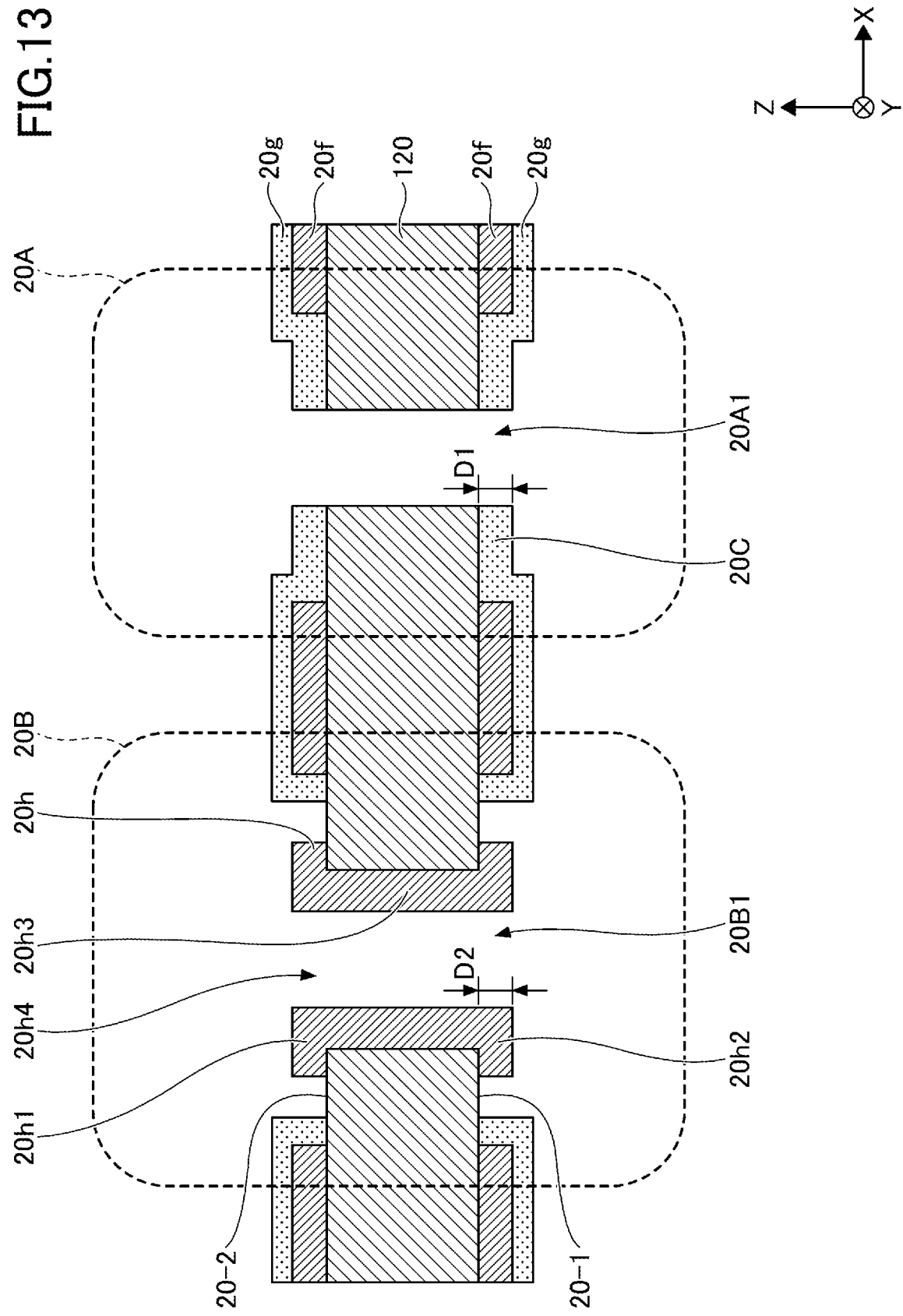
FIG. 13 is a schematic cross-sectional view of portions (first fixing portion 20A and second fixing portion 20B) of the substrate 120 in the absolute encoder 100-1 according to the first embodiment of the present invention.

FIG. 13 is a schematic cross-sectional view of portions (first fixing portion 20A and second fixing portion 20B) of the substrate 120 in the absolute encoder 100-1 according to the first embodiment of the present invention. FIG. 14 is a cross-sectional view of the substrate 120, as illustrated in FIG. 13, in a state of being fixed by a given first pillar 10A and a second pillar 10B. Note that the substrate 120 at three first fixing portions 20A has a common configuration in cross section. Accordingly, in each of FIG. 13 and FIG. 14, one first fixing portion 20A among the three first fixing portions 20A is used as a representative example to illustrate the cross section of the substrate at the first fixing portion 20A. For the purpose of convenience, in FIG. 14, the substrate mounting screw 122, the first pillar 10A, and the second pillar 10B are not illustrated in cross section.

As illustrated in FIG. 13, the substrate 120 is a flat plate-like member formed of a relatively stiff material. The substrate 120 has a lower surface 20-1 and an upper surface 20-2 that are horizontal planes (i.e., planes each parallel to the XY-plane). As the substrate 120, for example, a rigid substrate such as a glass epoxy substrate is used.

Also, as illustrated in FIG. 13, on each of the lower surface 20-1 and upper surface 20-2 of the substrate 120, a line layer 20f and a resist layer 20g are formed. Each line layer 20f is a thin film made of a conductive material, and forms a line pattern for transmitting various control signals. For example, copper foil is used as each line layer 20f. Each resist layer 20g is a thin film made of an insulating material, and covers a given surface among the lower surface 20-1 and the upper surface 20-2 of the substrate, in a state where a given line layer 20f is formed. Thus, each resist layer 20g protects a given surface among the lower surface 20-1 and the upper surface 20-2, including a corresponding line layer 20f.

(Configuration at First Fixing Portion 20A)

As illustrated in FIG. 13, the through-hole 20A1 passing through the substrate 120 vertically (the Z-axis direction in the figure) is formed at the first fixing portion 20A of the substrate 120. With respect to the upper surface 20-2 of the substrate 120, a given resist layer 20g is entirely formed, including a region surrounding the through-hole 20A1. With respect to the lower surface 20-1 of the substrate 120, a given resist layer 20g is also entirely formed, including a region surrounding the through-hole 20A1.

Figure 14:
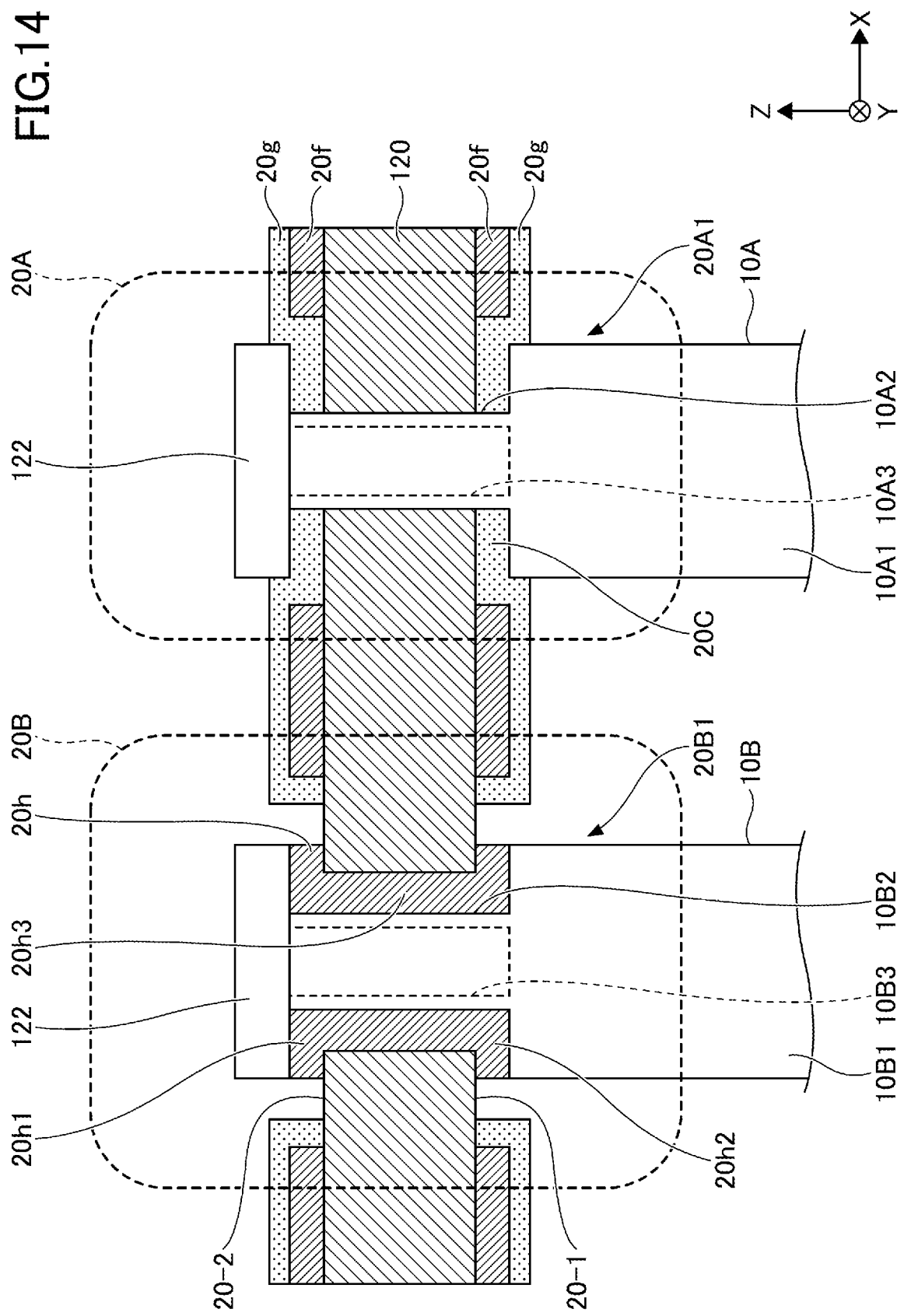
FIG. 14 is a cross-sectional view of the substrate 120, as illustrated in FIG. 13, in a state of being secured by a given first pillar 10A and a second pillar 10B.

As illustrated in FIG. 14, at the first fixing portion 20A, a surface of the resist layer 20g formed in the region surrounding the through-hole 20A1 in the lower surface 20-1 of the substrate 120 contacts an upper surface of a first columnar portion 10A1 of the first pillar 10A, and thus the height of the first pillar 10A is determined. In such a state, the first pillar 10A is screwed and fixed by a given substrate mounting screw 122 passing through a given through-hole 20A1.

As illustrated in FIG. 14, the first pillar 10A includes a cylindrical first columnar portion 10A1 extending upwardly (in the positive Z-axis direction in the figure) from the main base 110, and includes a cylindrical second columnar portion 10A2 provided in an upright position (in the positive Z-axis direction in the figure), so as to be situated from an upper surface and central portion of the first columnar portion 10A1.

As illustrated in FIG. 14, the first columnar portion 10A1 has an outer diameter greater than an inner diameter of the through-hole 20A1. Thus, the first columnar portion 10A1 does not pass through the through-hole 20A1. Also, the second columnar portion 10A2 has an outer diameter smaller than the inner diameter of the through-hole 20A1. Thus, the second columnar portion 10A2 passes through the through-hole 20A1.

For the second columnar portion 10A2, a screw hole 10A3 extending vertically (in the Z-axis direction in the figure) is formed in an interior of the second columnar portion 10A2. In such a manner, at the screw hole 10A3, the second columnar portion 10A2 can be screwed by a given substrate mounting screw 122.

Note that in the first embodiment, each first pillar 10A includes both a given first columnar portion 10A1 and a given second columnar portion 10A2. However, there is no limited to the manner described above. Each first pillar 10A includes only a given first columnar portion 10A1, and a given screw hole 10A3 may be formed in the given first columnar portion 10A1. Note, however, that by providing a given second columnar portion 10A2 in each first pillar 10A, a driven amount of each substrate mounting screw 122 can be restricted. Thus, the substrate 120 can be prevented from breaking by being excessively pressed by substrate mounting screws 122.

(Configuration at Second Fixing Portion 20B)

As illustrated in FIG. 13, a through-hole 20B1 passing through the substrate 120 vertically (Z-axis direction in the figure) is formed at the second fixing portion 20B of the substrate 120. The connection terminal 20h is formed in the through-hole 20B1. The connection terminal 20h includes a first exposed portion 20h1 formed in a perimeter of the through-hole 20B1 with respect to the upper surface 20-2 of the substrate 120. The connection terminal 20h includes a second exposed portion 20h2 formed in a perimeter of the through-hole 20B1 with respect to the lower surface 20-1 of the substrate 120. The connection terminal 20h includes a connection portion 20h3 that is formed along an inner peripheral surface of the through-hole 20B1 and that connects the first exposed portion 20h1 and the second exposed portion 20h2. Further, a through-hole 20h4 passing vertically through the connection terminal 20h is formed in the connection terminal 20h, and thus the connection terminal 20h enables a given substrate mounting screw 122 to pass through the through-hole 20h4.

As illustrated in FIG. 14, at the second fixing portion 20B, a surface of the second exposed portion 20h2 of the connection terminal 20h contacts an upper surface of the first columnar portion 10B1 of the second pillar 10B, and thus the height of the second pillar 10B is determined. Further, the second pillar 10B is electrically connected, and in such a state, the second pillar 10B is screwed and fixed by a given substrate mounting screw 122 passing through the through-hole 20h4 in the connection terminal 20h. The second support 10B is electrically connected to the housing 202 of the motor 200. Thus, by electrically connecting the connection terminal 20h to the second pillar 10B, the connection terminal 20h is connected to the housing 202 of the motor 200 via the second pillar 10B, to thereby be connected to a ground.

As illustrated in FIG. 14, the second pillar 10B includes a cylindrical first columnar portion 10B1 extending upwardly (in the positive Z-axis direction in the figure) from the main base 110, and includes a cylindrical second columnar portion 10B2 provided in an upright position (in the positive Z-axis direction in the figure), so as to be situated from an upper surface and central portion of the first columnar portion 10A1.

As illustrated in FIG. 14, the first columnar portion 10B1 has an outer diameter greater than an inner diameter of the though-hole 20h4 in the connection terminal 20h. Thus, the first columnar portion 10B1 does not pass through the through-hole 20h4. Also, the second columnar portion 10B2 has an outer diameter smaller than the inner diameter of the through-hole 20h4. Thus, the second columnar portion 10B2 passes through the through-hole 20h4.

For the second columnar portion 10B2, a screw hole 10B3 extending vertically (in the Z-axis direction in the figure) is formed in an interior of the second columnar portion 10B2. In such a manner, at the screw hole 10B3, the second columnar portion 10B2 can be screwed by a given substrate mounting screw 122.

Note that in the first embodiment, the second pillar 10B includes both the first columnar portion 10B1 and the second columnar portion 10B2. However, there is no limitation to the manner described above. The second pillar 10B includes only the first columnar portion 10B1, and the screw hole 10A3 may be formed in the first columnar portion 10B1. Note, however, that by providing the second columnar portion 10B2 in the second pillar 10B, a driven amount of a given substrate mounting screw 122 can be restricted. Thus, the connection terminal 20h can be prevented from breaking by being excessively pressed by the given substrate mounting screw 122.

As illustrated in FIG. 13 and FIG. 14, in the absolute encoder 100-1 according to the first embodiment, the height of the upper surface of the first pillar 10A (first columnar portion 10A1) is the same as the height of the upper surface of the second pillar 10B (first columnar portion 10B1), and a distance D1, at the first fixing portion 20A, from the lower surface 20-1 of the substrate 120 to the upper surface of the first pillar 10A (first columnar portion 10A1) is the same as a distance D2, at the second fixing portion 20B, from the lower surface 20-1 of the substrate 120 to the upper surface of the second pillar 10B (first columnar portion 10B1).

This is because at the first fixing portion 20A, the thickness (equivalent to the distance D1) of the resist layer 20g formed in the perimeter of the through-hole 20A1 at the lower surface 20-1 of the substrate 120 is the same as the thickness (equivalent to the distance D2) of the second exposed portion 20h2 of the connection terminal 20h at the second fixing portion 20B.

In other words, in the absolute encoder 100-1 according to the first embodiment, the resist layer 20g formed in the perimeter of the through-hole 20A1 at the lower surface 20-1 of the substrate 120 is referred to as an "adjustment portion 20C". By partially adjusting the thickness of the adjustment portion 20C, the distance D1 and the distance D2 are set to be the same.

For example, a given thickness of the resist layer 20g in a region surrounding the through-hole 20A1 at the lower surface 20-1 of the substrate 20 is set to be greater than a given thickness of the resist layer 20g in the other region of the lower surface 20-1 of the substrate 120, and subsequently, a surface of the resist layer 20g is polished or cut such that the thickness of the resist layer 20g becomes an appropriate thickness. Thus, the resulting thickness of the resist layer 20g can be set to be the same as the thickness of the second exposed portion 20h2 of the connection terminal 20h.

As a specific example, when the thickness of a given line layer 20f formed on the substrate 120 is "37 μm", and the thickness of a given resist layer 20g formed on the substrate 120 is "25 μm", the thickness of the second exposed portion 20h2 of the connection terminal 20h becomes "37 μm". In this case, on a portion of the lower surface 20-1 of the substrate 120 surrounding the through-hole 20A1, a given resist layer 20g of greater than or equal to "37 µm" is formed, and subsequently, a surface of the resist layer 20g is polished or cut such that the thickness of the resist layer 20g is set to "37 µm". Thus, the thickness of the resist layer 20g can be the same as the thickness of the second exposed portion 20h2 of the connection terminal 20h.

In such a manner, in the absolute encoder 100-1 according to the first embodiment, as illustrated in FIG. 14, when the substrate 120 is screwed and fixed to each first pillar 10A and the second pillar 10B, the height of the substrate 120 at each first fixing portion 20A is set to be the same as the height of the substrate 120 at the second fixing portion 20B. Thus, the substrate 120 becomes in a horizontal state.

As a result, in the absolute encoder 100-1 according to the first embodiment, as illustrated in FIG. 6, the detection surface of the magnetic sensor 40 provided on the substrate 120 and the upper surface of the permanent magnet 9 provided on the main spindle gear 101 are parallel to each other, and a given distance between their surfaces is maintained in a state of being at a fixed distance with high accuracy. Therefore, according to the absolute encoder 100-1 according to the first embodiment, reductions in detection accuracy of the magnetic sensor 40 can be mitigated.

<Modification of Substrate 120>

Hereafter, the modification of the substrate 120 will be described with reference to FIG. 15 and FIG. 16. In the following description, for the substrate 120 according to the modified embodiment, the differences from the substrate 120 illustrated in FIG. 13 and FIG. 14 will be mainly described. Note that for the substrate 120 illustrated in FIG. 15 and FIG. 16 according to the modified embodiment, constituent members that are the same as those of the substrate 120 illustrated in FIG. 13 and FIG. 14 are denoted by the same numerals used for the substrate 120 illustrated in FIG. 13 and FIG. 14, and detailed description thereof is omitted.

Figure 15:
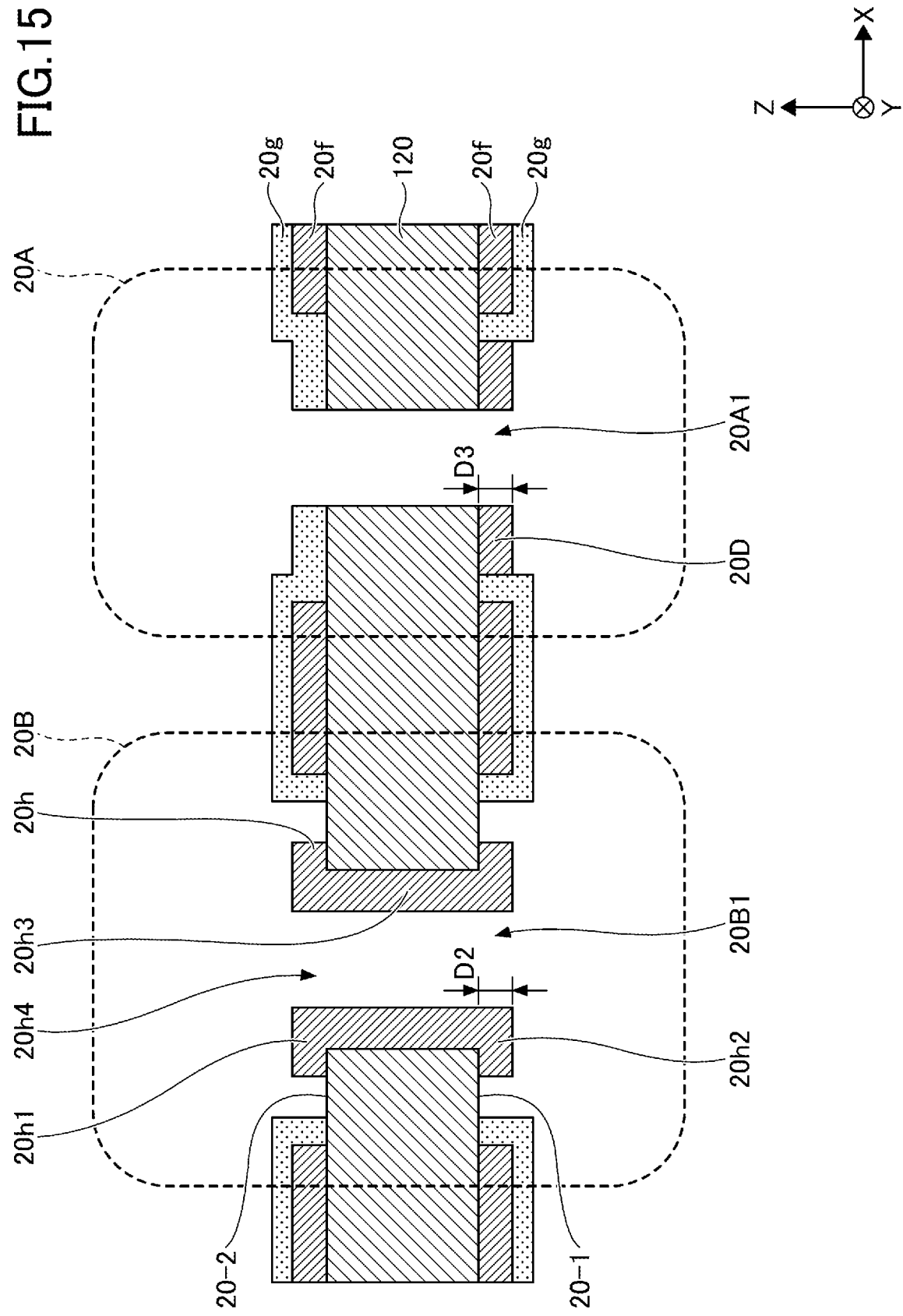
FIG. 15 is a schematic cross-sectional view of the substrate 120 illustrated in FIG. 13 according to a modified embodiment.

FIG. 15 is a schematic cross-sectional view of the substrate 120 illustrated in FIG. 13 according to the modified embodiment. FIG. 16 is a cross-sectional view of the substrate 120, as illustrated in FIG. 15, in a state of being fixed by the given first pillar 10A and the second pillar 10B.

As illustrated in FIG. 15, for the substrate 120 according to the present modification, the resist layer 20g is entirely formed with respect to the lower surface 20-1 of the substrate 120 at the first fixing portion 20A, other than a region of the lower surface surrounding the through-hole 20A1. Also, an adjustment portion 20D is formed in a region, surrounding the through-hole 20A1, of the lower surface 20-1 of the substrate 120, which differs from the substrate 120 illustrated in FIG. 13.

Figure 16:
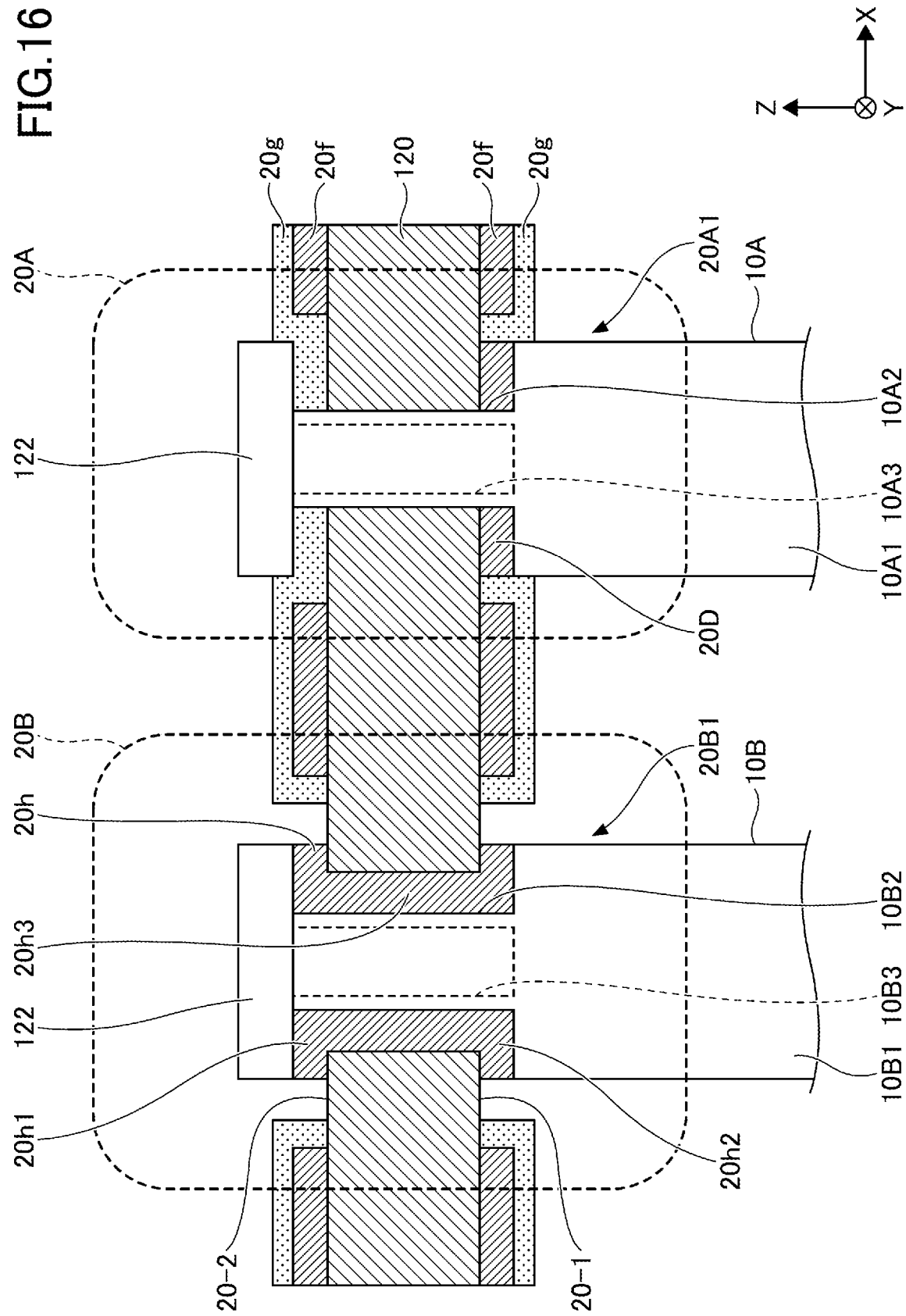
FIG. 16 is a cross-sectional view of the substrate 120, as illustrated in FIG. 15, in a state of being secured by the given first pillar 10A and the second pillar 10B.

As illustrated in FIG. 16, in the substrate 120 according to the present modification, at the first fixing portion 20A, a surface of the adjustment portion 20D formed to surround the through-hole 20A1 at the lower surface 20-1 of the substrate 120 contacts the upper surface of the first pillar 10A. Thus, the height of the first pillar 10A is determined, and in such a state, the first pillar 10A is screwed and fixed by a given substrate mounting screw 122 passing through the through-hole 20A1.

As illustrated in FIG. 15 and FIG. 16, in the absolute encoder 100-1 according to the present modification, the height of the upper surface of the first pillar 10A (first columnar portion 10A1) is the same as the height of the upper surface of the second pillar 10B (first columnar portion 10B1), and a distance D3, at the first fixing portion 20A, from the lower surface 20-1 of the substrate 120 to the upper surface of the first pillar 10A (first columnar portion 10A1) is the same as the distance D2, at the second fixing portion 20B, from the lower surface 20-1 of the substrate 120 to the upper surface of the second pillar 10B (first columnar portion 10B1).

This is because at the first fixing portion 20A, the thickness (equivalent to the distance D3) of the line layer 20f formed in the perimeter of the through-hole 20A1 at the lower surface 20-1 of the substrate 120 is set to be the same as the thickness (equivalent to the distance D2) of the second exposed portion 20h2 of the connection terminal 20h at the second fixing portion 20B.

In other words, in the absolute encoder 100-1 according to the present modification, a portion of the line layer 20f formed in the perimeter of the through-hole 20A1 at the lower surface 20-1 of the substrate 120 is referred to as the "adjustment portion 20D". By partially adjusting the thickness of the adjustment portion 20D, the distance D3 and the distance D2 are set to be the same. The adjustment portion 20D formed in the perimeter of the through-hole 20A1 at the lower surface 20-1 of the substrate 120 is a dummy line layer, which is not electrically connected to a given line layer 20f (i.e., line layer 20f forming a line pattern) that is entirely formed on the lower surface 20-1 of the substrate 120. In such a manner, in the absolute encoder 100-1 according to the present modification, the line pattern on the substrate 120 is set not to be connected to a ground at the adjustment portion 20D. Accordingly, noise from the adjustment portion 20D can be prevented from entering into the line pattern.

For example, in a region surrounding the through-hole 20A1 at the lower surface 20-1 of the substrate 120, a given line layer 20f of which the thickness is the same as the thickness of the second exposed portion 20h2 of the connection terminal 20h is directly formed, or alternatively, a given line layer 20f of which the thickness is greater than the thickness of the second exposed portion 20h2 of the connection portion 20h is formed, and subsequently, a surface of the given line layer 20f is polished or cut, and thus the resulting thickness of the given line layer 20f can be set to be the same as the thickness of the second exposed portion 20h2 of the connection terminal 20h.

As a specific example, when the thickness of a given line layer 20f formed on the substrate 120 is "37 µm", and the thickness of a given resist layer 20g formed on the substrate 120 is "25 µm", the thickness of the second exposed portion 20h2 of the connecting terminal 20h becomes "37 µm". In this case, on a portion of the lower surface 20-1 of the substrate 120 surrounding the through-hole 20A1, a given line layer 20f having a thickness of greater than or equal to "37 µm" is directly formed, or alternatively, a given resist layer 20g having a thickness of greater than or equal to "37 µm" is formed, and subsequently, a surface of the given line layer 20f is polished or cut such that the thickness of the given line layer 20f is set to "37 µm." Thus, the thickness of the given line layer 20f can be the same as the thickness of the second exposed portion 20h2 of the connection terminal 20h.

Note that for the adjustment portion 20D, instead of providing a given dummy line layer, a connection terminal that is the same as the connection terminal 20h in the through-hole 20B1 may be provided as a dummy connection terminal. In this case, the dummy line layer does not need to be provided. By forming a given connection terminal at the through-hole 20A1, heights of the substrate 120 at the through-holes 20A1 and 20B1 can be the same, as in the case with the through-hole 20B1.

In such a manner, in the absolute encoder 100-1 according to the present modification, as illustrated in FIG. 16, when the substrate 120 is screwed and fixed to each first pillar 10A and the second pillar 10B, the height of the substrate 120 at each first fixing portion 20A is set to be the same as the height of the substrate 120 at the second fixing portion 20B. Thus, the substrate 120 becomes in a horizontal state.

As a result, in the absolute encoder 100-1 according to the present modification, as illustrated in FIG. 6, the detection surface of the magnetic sensor 40 provided on the substrate 120 and the upper surface of the permanent magnet 9 provided on the main spindle gear 101 are parallel to each other, and a given distance between their surfaces is maintained in a state of being at a fixed distance with high accuracy. Therefore, according to the absolute encoder 100-1 according to the present modification, reductions in detection accuracy of the magnetic sensor 40 can be mitigated.

Second Embodiment

Figure 17:
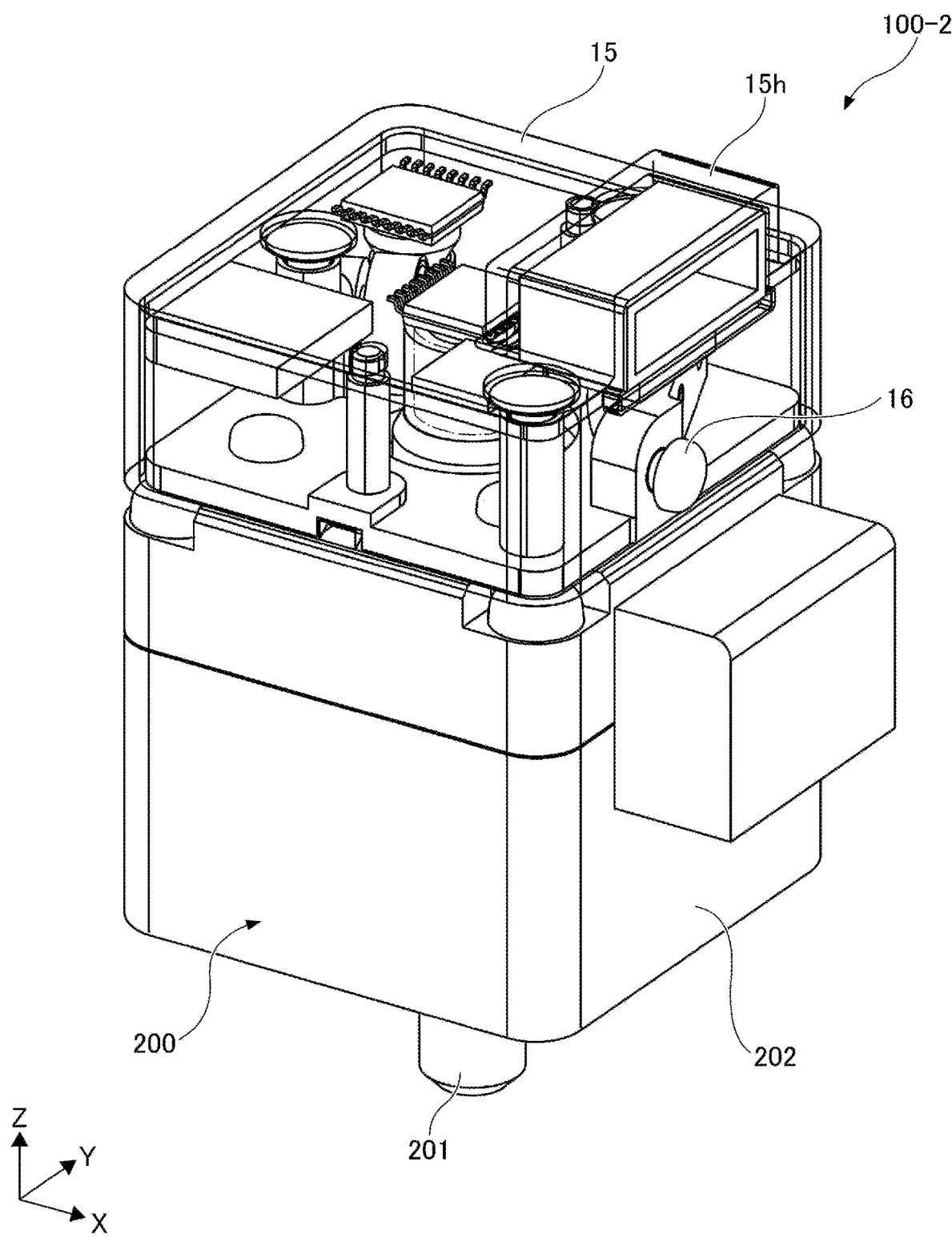
FIG. 17 is a perspective view of an absolute encoder 100-2 attached to the motor 200 according to a second embodiment of the present invention.

FIG. 17 is a perspective view of an absolute encoder 100-2 attached to the motor 200 according to a second embodiment of the present invention. In the following description, an XYZ orthogonal coordinate system is employed, as in the first embodiment. An X-axis direction corresponds to a horizontal right-left direction, a Y-axis direction corresponds to a horizontal back-front direction, and a Z-axis direction corresponds to a vertical up-down direction. The Y-axis direction and Z-axis direction are each perpendicular to the X-axis direction. The X-axis direction may be expressed by using the word of leftward or rightward, the Y-axis direction may be expressed by using the word of forward or backward, and the Z-axis direction may be expressed by using the word of upward or downward. In FIG. 17, a state of the absolute encoder viewed from above in the Z-axis direction is referred to as a plan view, a state of the absolute encoder viewed from the front in the Y-axis direction is referred to as a front view, and a state of the absolute encoder viewed from the side in the X-axis direction is referred to as a side view. Description for the above directions is not intended to limit an applicable pose of the absolute encoder 100-2, and the absolute encoder 100-2 may be used in any pose. In FIG. 17, components provided within the case 15 of the absolute encoder 100-2 are illustrated transparently. Note that illustration of the tooth shape is omitted in the drawings.

Figure 18:
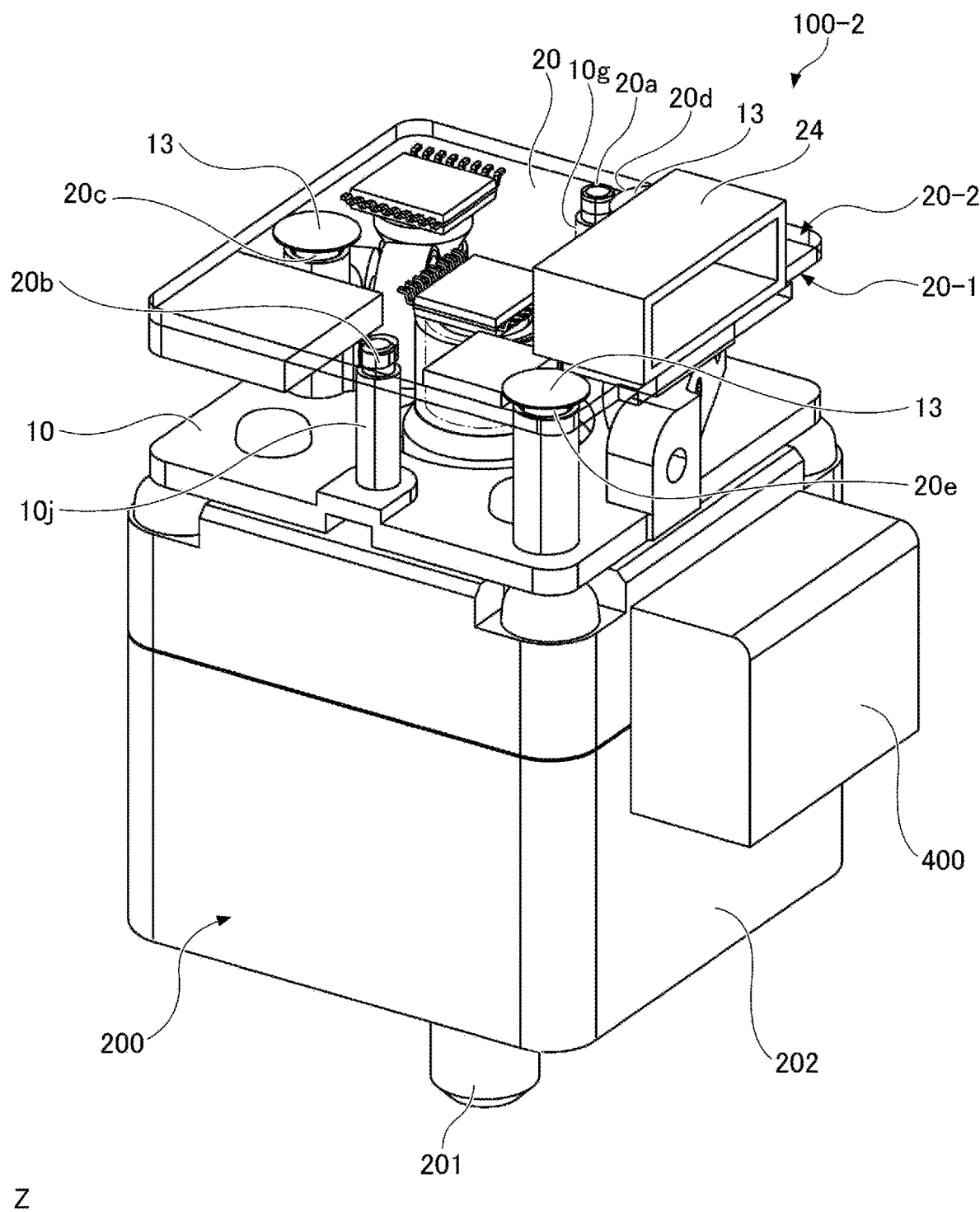
FIG. 18 is a perspective view of the absolute encoder 100-2, as illustrated in FIG. 17, from which a case 15 and a mounted screw 16 are removed.
Figure 19:
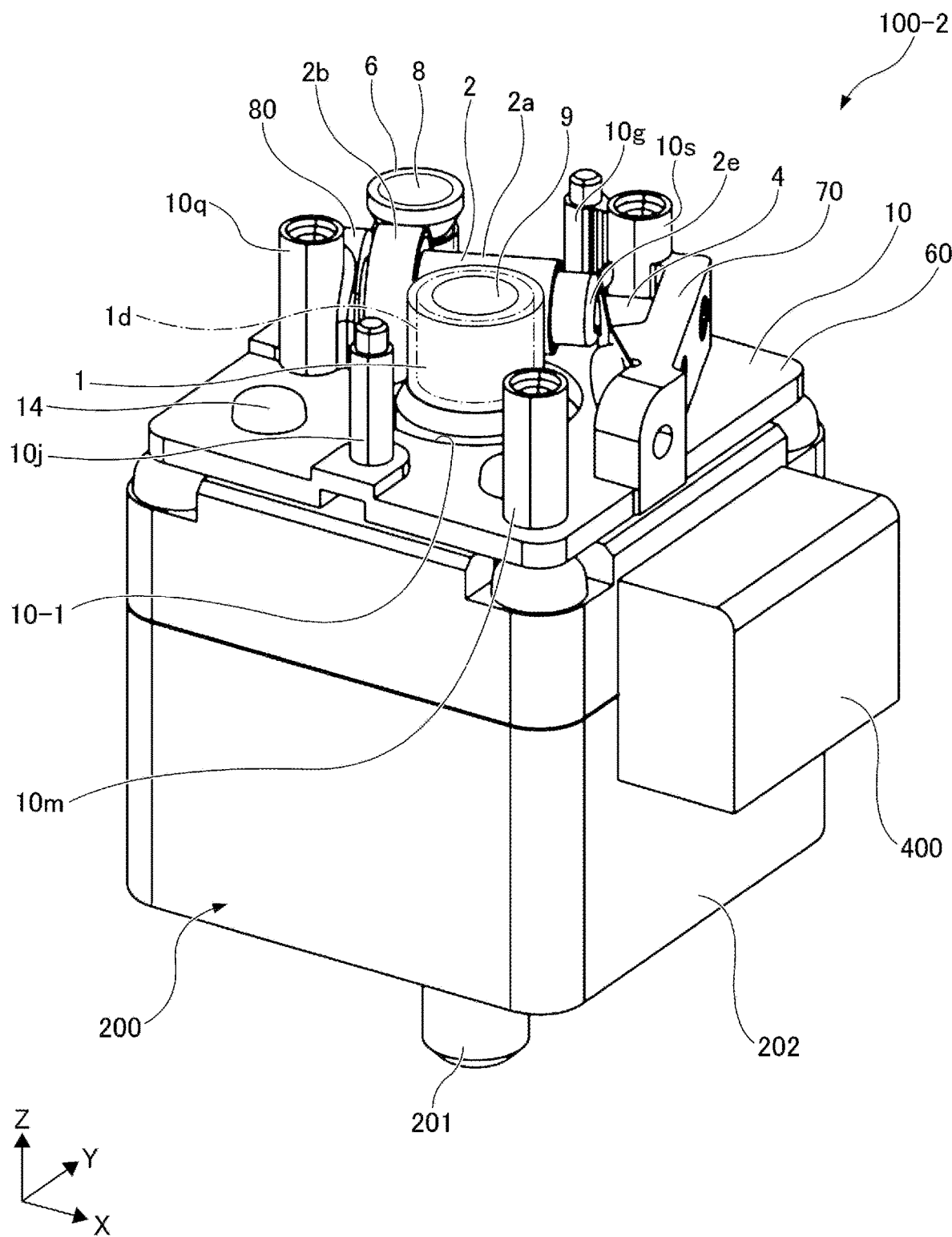
FIG. 19 is a perspective view of the absolute encoder 100-2, as illustrated in FIG. 18, from which a substrate 20 and substrate mounting screws 13 are removed.
Figure 20:
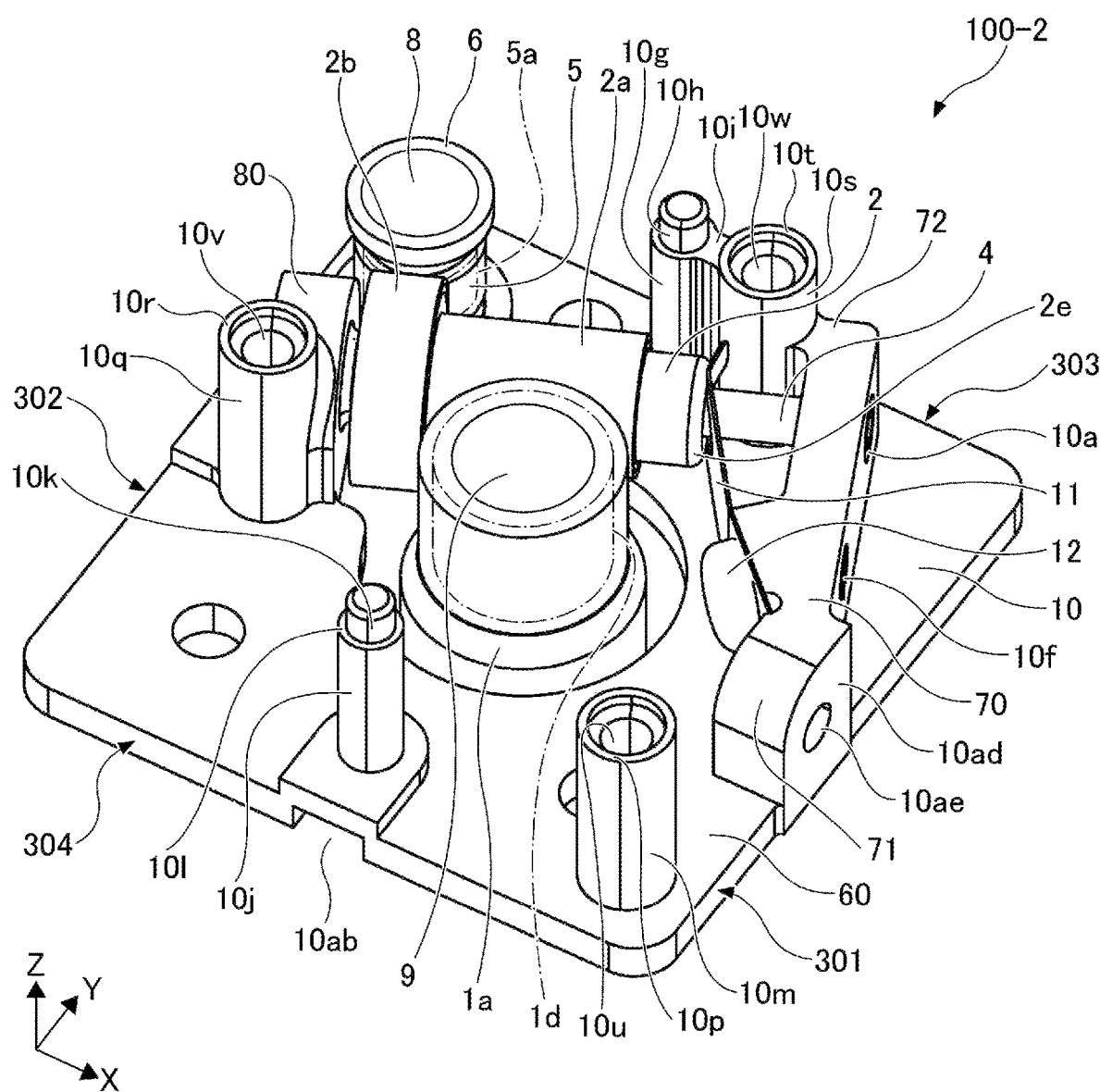
FIG. 20 is a perspective view of the absolute encoder 100-2 attached to the motor 200, as illustrated in the perspective view in FIG. 19, where the motor 200 and screws 14 are removed.
Figure 21:
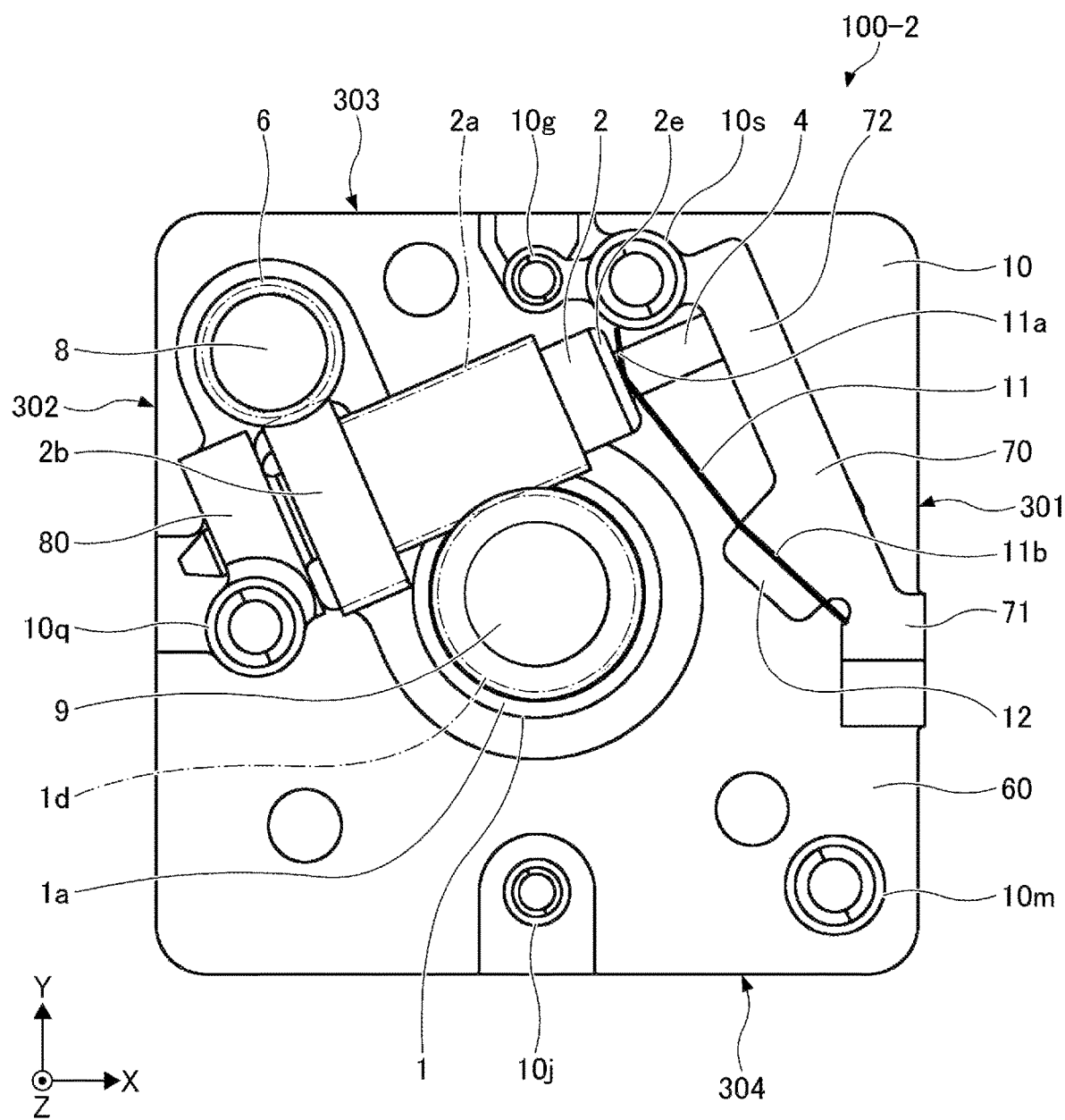
FIG. 21 is a plan view of the main base 10, the intermediate gear 2 and the like as illustrated in FIG. 20.
Figure 22:
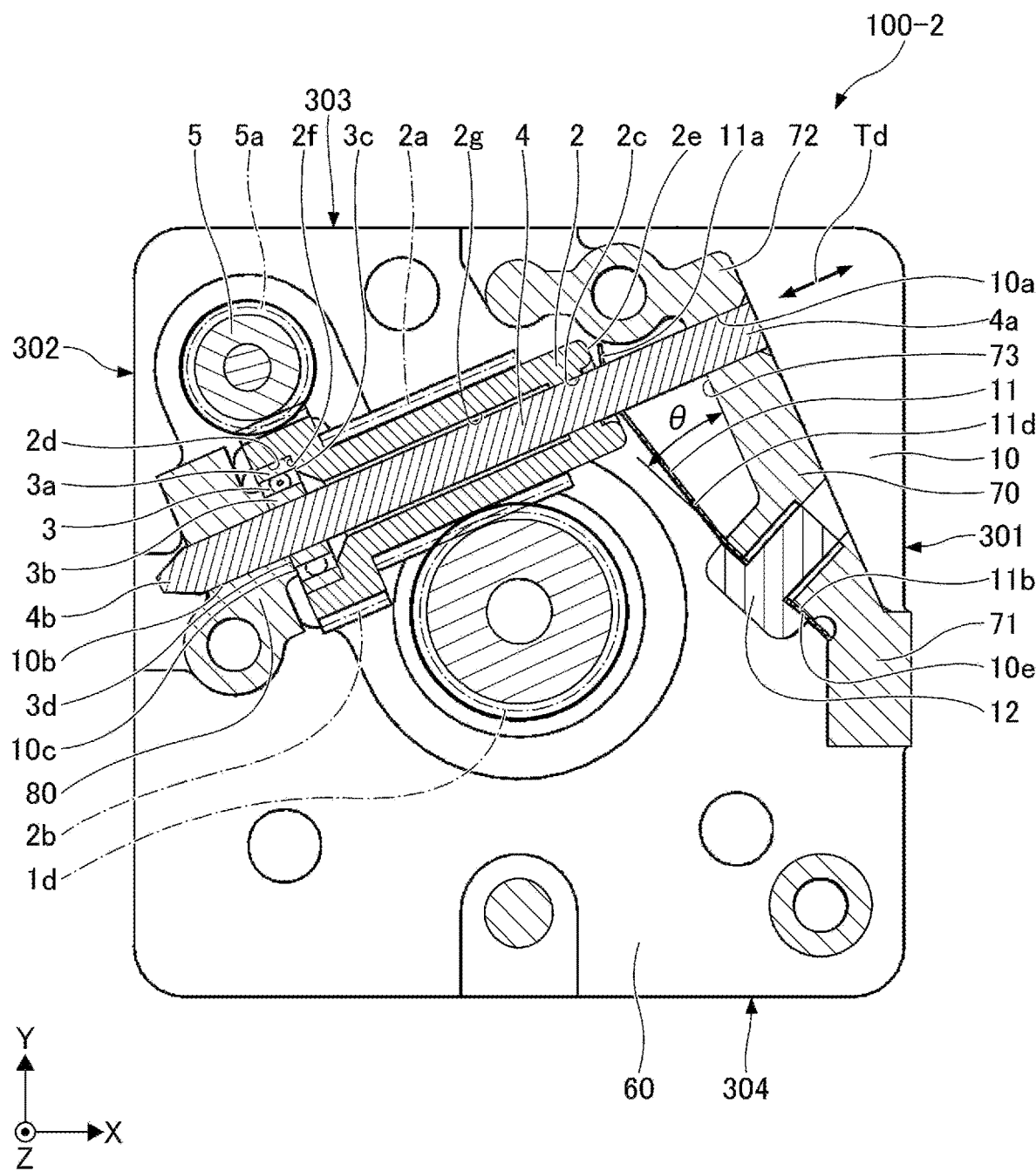
FIG. 22 is a cross-sectional view of the absolute encoder 100-2, as illustrated in FIG. 21, taken along a plane that passes through the center of the intermediate gear 2 and is parallel to the X-Y plane.

FIG. 18 is a perspective view of the absolute encoder 100-2, as illustrated in FIG. 17, from which a case 15 and a mounted screw 16 are removed. In FIG. 18, components provided on the lower surface 20-1 of the substrate 20 are illustrated transparently. FIG. 19 is a perspective view of the absolute encoder 100-2, as illustrated in FIG. 18, from which the substrate 20 and substrate mounting screws 13 are removed. FIG. 20 is a perspective view of the absolute encoder 100-2 attached to the motor 200, as illustrated in the perspective view in FIG. 19, where the motor 200 and screws 14 are removed. FIG. 21 is a plan view of the main base 10, the intermediate gear 2 and the like as illustrated in FIG. 20. In FIG. 21, arrangement of main components, among multiple components provided in the absolute encoder 100-2, is illustrated. FIG. 22 is a cross-sectional view of the absolute encoder 100-2, as illustrated in FIG. 21, taken along a plane that passes through the center of the intermediate gear 2 and is parallel to the X-Y plane.

Figure 23:
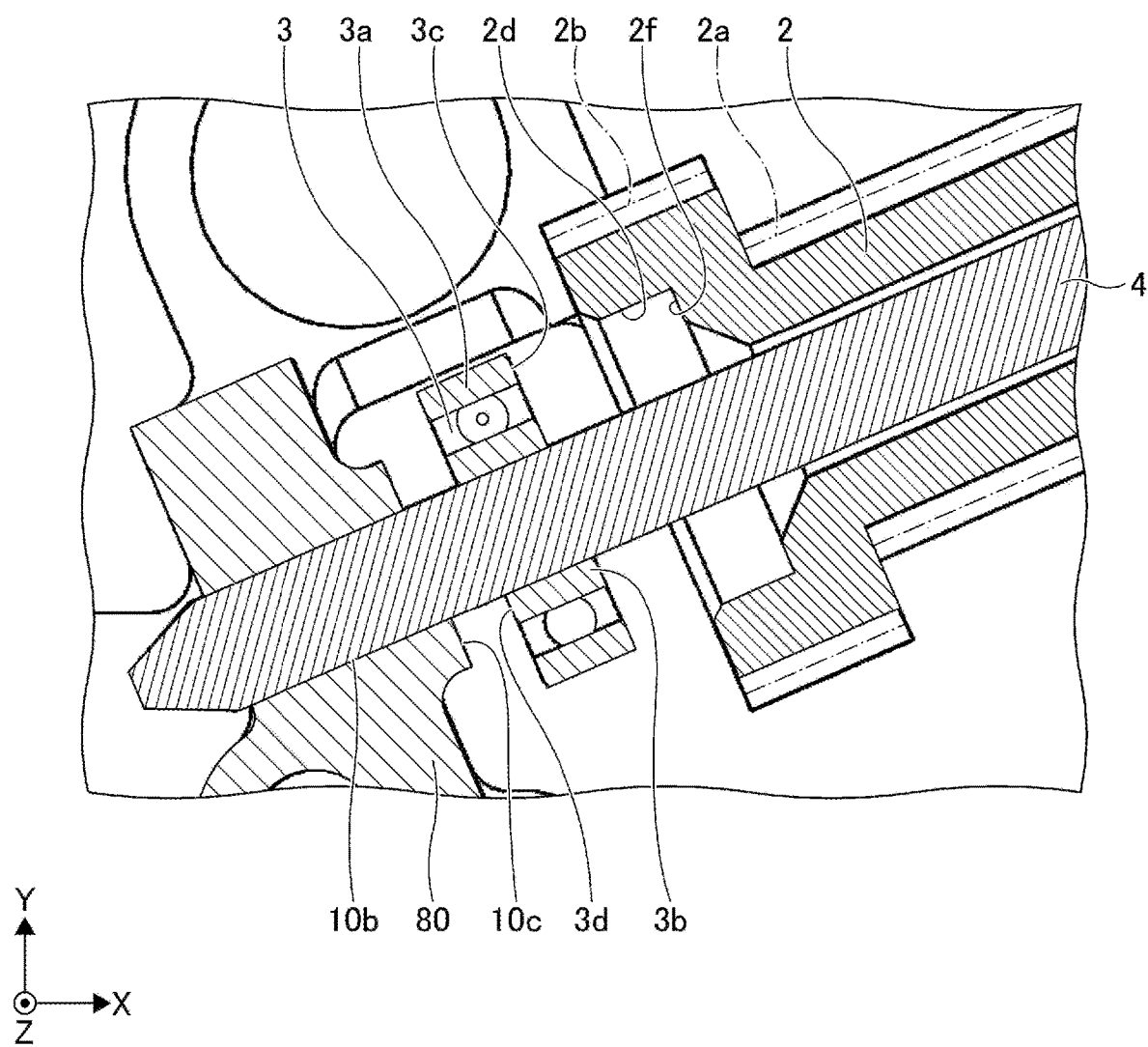
FIG. 23 is an enlarged partial cross-sectional view of a bearing 3 illustrated in FIG. 22 that is disconnected from the intermediate gear 2.

FIG. 23 is an enlarged partial cross-sectional view of a bearing 3 illustrated in FIG. 22 that is disconnected from the intermediate gear 2. In FIG. 23, in order to facilitate the understanding of the positional relationship between the bearing 3 and a press-fit portion 2d formed in the intermediate gear 2, the bearing 3 is separated from the press-fit portion 2d of the intermediate gear 2. Also, in FIG. 23, in order to facilitate the understanding of the positional relationship between the bearing 3 and a wall 80 provided on a base 60 of the main base 10, the bearing 3 is separated from the wall 80.

Figure 24:
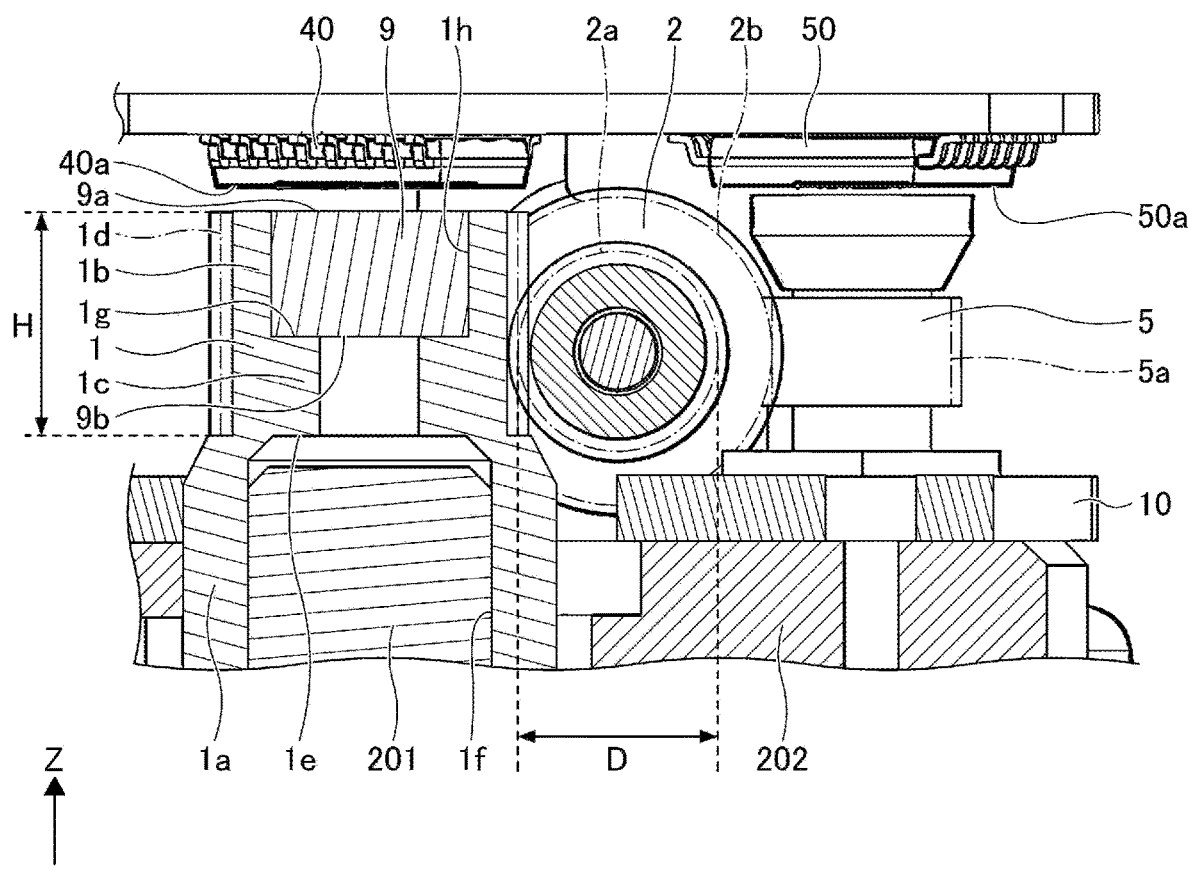
FIG. 24 is a cross-sectional view of the absolute encoder 100-2, as illustrated in FIG. 18, taken along a plane that passes through the center of a main spindle gear 1 illustrated in FIG. 21 and that is perpendicular to a centerline of the intermediate gear 2, where the substrate 20 and a magnetic sensor 40 are not illustrated in cross section.

FIG. 24 is a cross-sectional view of the absolute encoder 100-2, as illustrated in FIG. 18, taken along a plane that passes through the center of a main spindle gear 1 illustrated in FIG. 21 and that is perpendicular to a centerline of the intermediate gear 2, where the substrate 20 and a magnetic sensor 40 are not illustrated in the cross section. In FIG. 24, an attached state of a permanent magnet 9 to the main spindle gear 1, and an attached state of the main spindle gear 1 to a motor shaft 201 are illustrated. Further, in FIG. 24, a state where a worm gear 1d of the main spindle gear 1 and a worm wheel 2a of the intermediate gear 2 are engaged with each other is illustrated. From FIG. 24, it is understood that an upper surface 9a of the permanent magnet 9 provided for the main spindle gear 1 is located at a fixed distance from the magnetic sensor 40, in the Z-axis direction.

Figure 25:
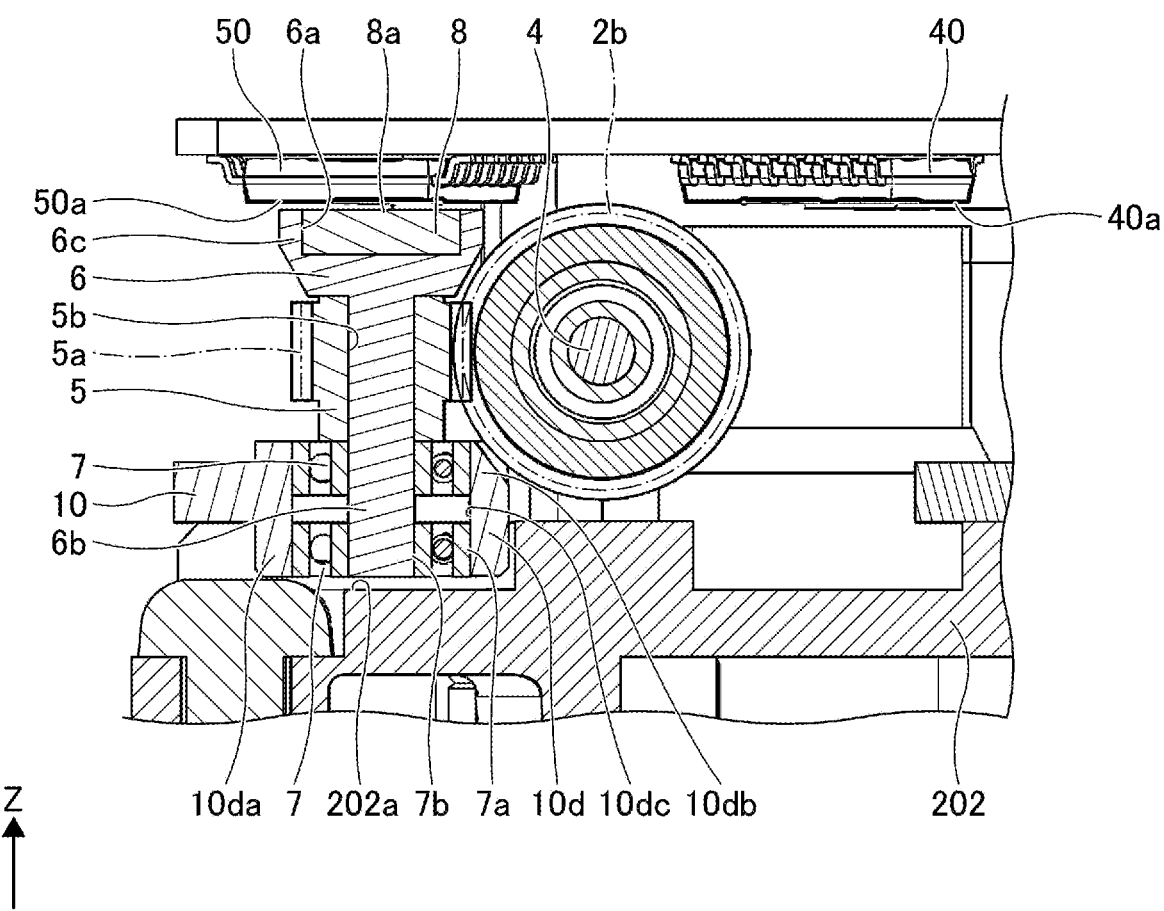
FIG. 25 is a cross-sectional view of the absolute encoder 100-2, as illustrated in FIG. 18, taken along a plane that passes through the center of a layshaft gear 5 illustrated in FIG. 22 and that is perpendicular to the centerline of the intermediate gear 2, where the substrate 20 and a magnetic sensor 50 are not illustrated in cross section.

FIG. 25 is a cross-sectional view of the absolute encoder 100-2, as illustrated in FIG. 18, taken along a plane that passes through the center of a layshaft gear 5 illustrated in FIG. 22 and that is perpendicular to the centerline of the intermediate gear 2, where the substrate 20 and a magnetic sensor 50 are not illustrated in the cross section. In FIG. 25, a state in which a worm wheel 5a and a worm gear 2b are engaged with each other is illustrated. Further, in FIG. 25, a state where a shaft 6b of a magnet holder 6 is held by two bearings 7, and a state where the permanent magnet 8 is held by the magnet holder 6 are illustrated. Moreover, in FIG. 25, a state where a radially outer surface of a head 6c provided in the magnet holder 6 is separated from an addendum circle of the worm gear 2b is illustrated. From FIG. 25, it is understood that a surface 8a of the permanent magnet 8 provided at the magnet holder 6 is located at a fixed distance from the magnetic sensor 50, in the Z-axis direction. FIG. 25 also illustrates a cross-sectional shape of a bearing holder 10d of the main base 10.

Figure 26:
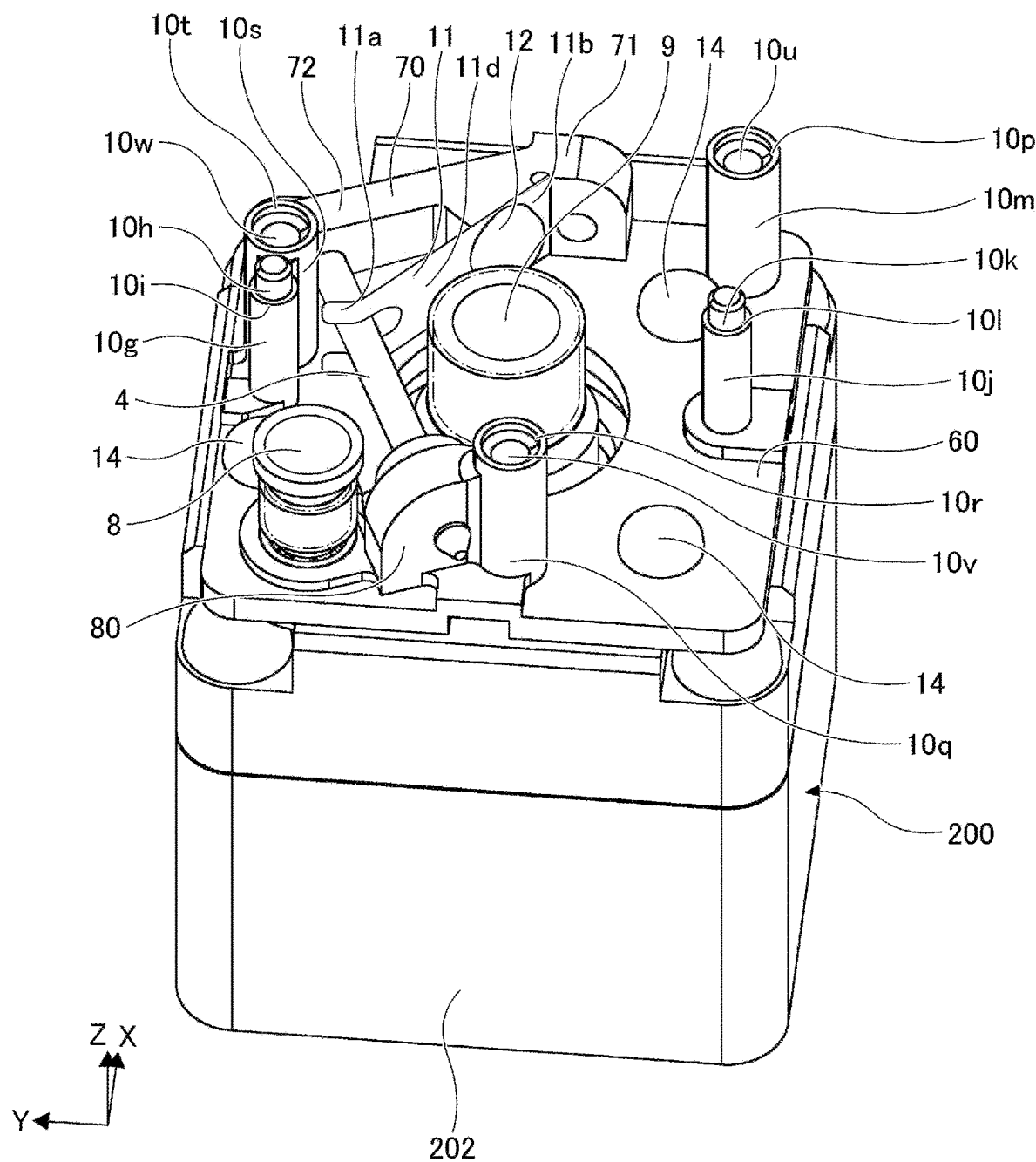
FIG. 26 is a perspective view of multiple components, as illustrated in FIG. 19, from which the intermediate gear 2 is removed.
Figure 27:
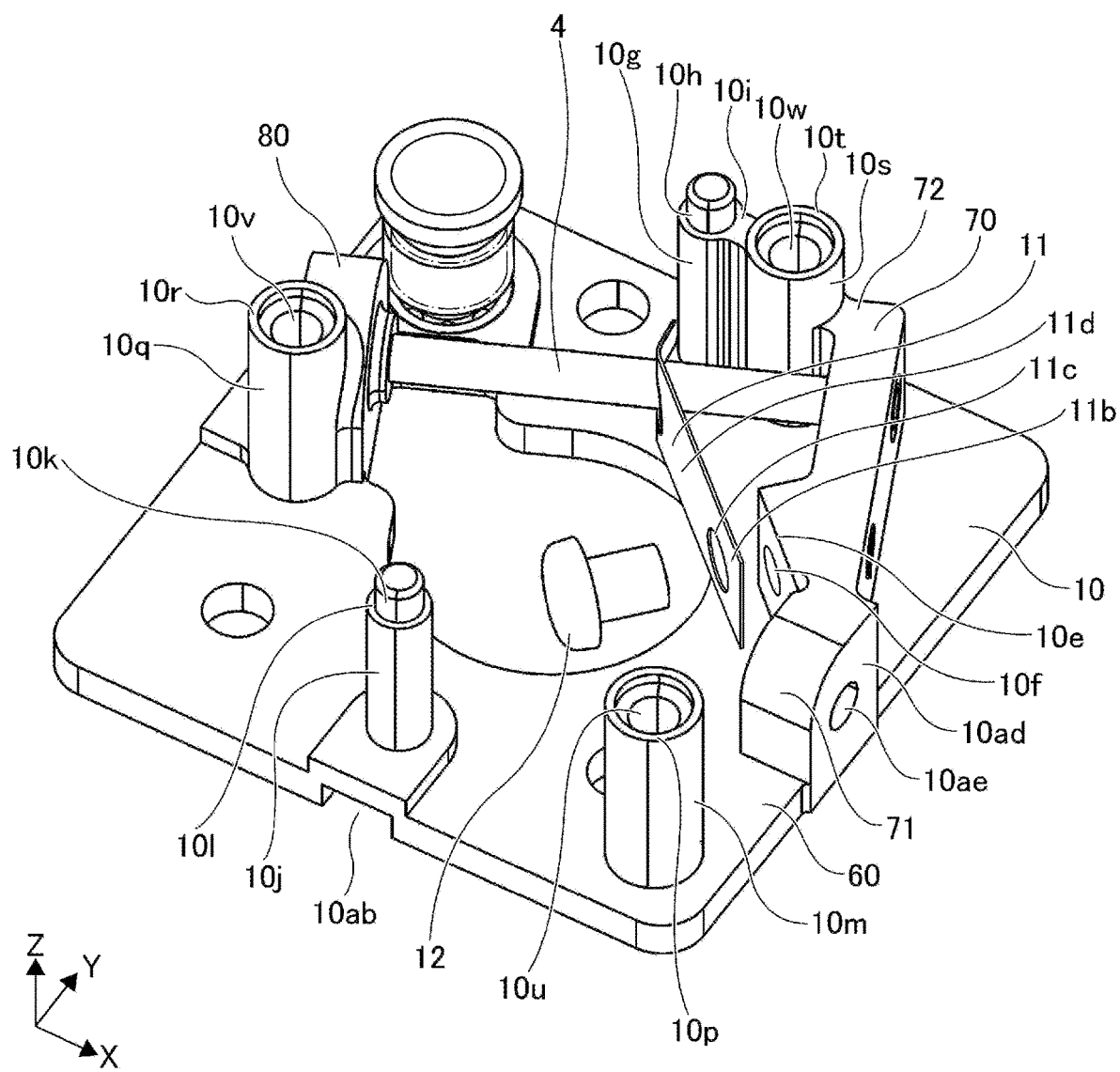
FIG. 27 is a perspective view of a wall 70, as illustrated in FIG. 26, from which a screw 12 is removed, a leaf spring 11 after the screw 12 is removed, and the wall 70 with a leaf-spring mounting surface 10e facing the leaf spring 11, where the motor 200 and the main spindle gear 1 are not illustrated.

FIG. 26 is a perspective view of multiple components, as illustrated in FIG. 19, from which the intermediate gear 2 is removed. FIG. 27 is a perspective view of a wall 70, as illustrated in FIG. 26, from which a screw 12 is removed, a leaf spring 11 after the screw 12 is removed, and the wall 70 with a leaf-spring mounting surface 10e facing the leaf spring 11, where the motor 200 and the main spindle gear 1 are not illustrated.

Figure 28:
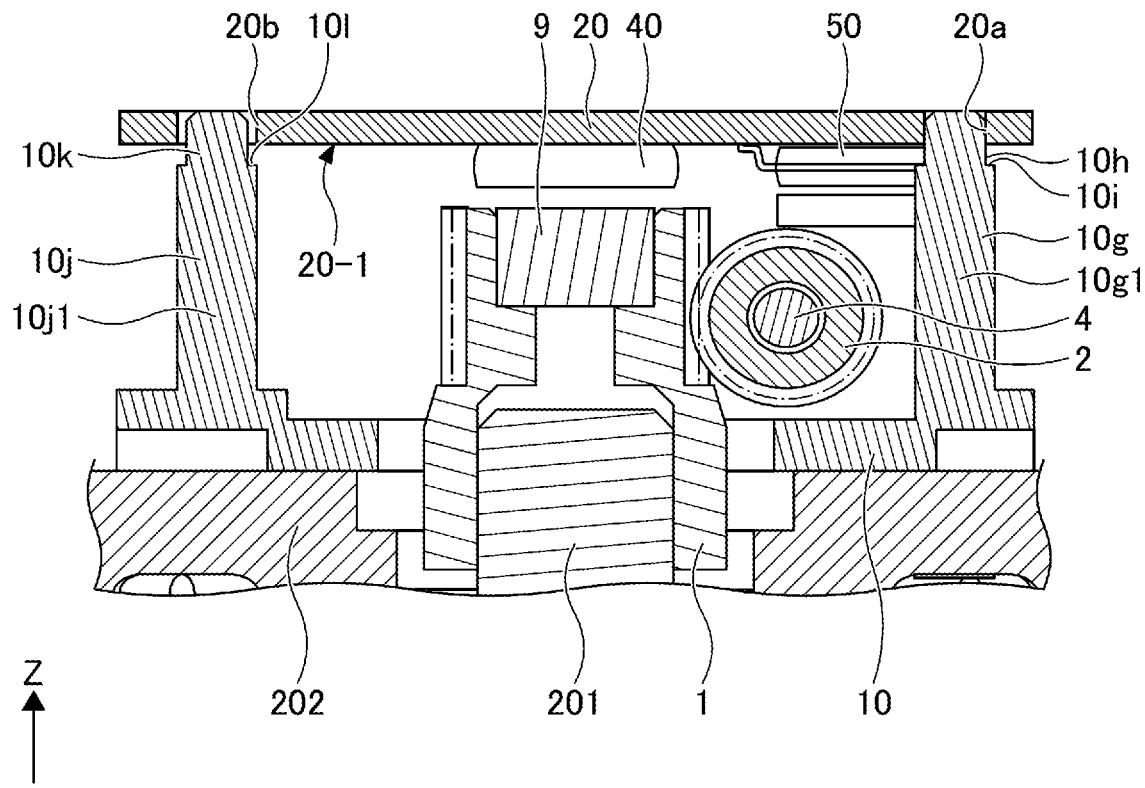
FIG. 28 is a cross-sectional view of the absolute encoder 100-2, as illustrated in FIG. 18, taken along a plane that passes through the center of a substrate positioning pin 10g and the center of a substrate positioning pin 10j, as illustrated in FIG. 21, and that is parallel to a Z-axis direction, where a magnetic sensor 40 is not illustrated in the cross section.

FIG. 28 is a cross-sectional view of the absolute encoder 100-2, as illustrated in FIG. 18, taken along a plane that passes through the center of a substrate positioning pin 10g and the center of a substrate positioning pin 10j, as illustrated in FIG. 21, and that is parallel to a Z-axis direction, where a magnetic sensor 40 is not illustrated in the cross section.

Figure 29:
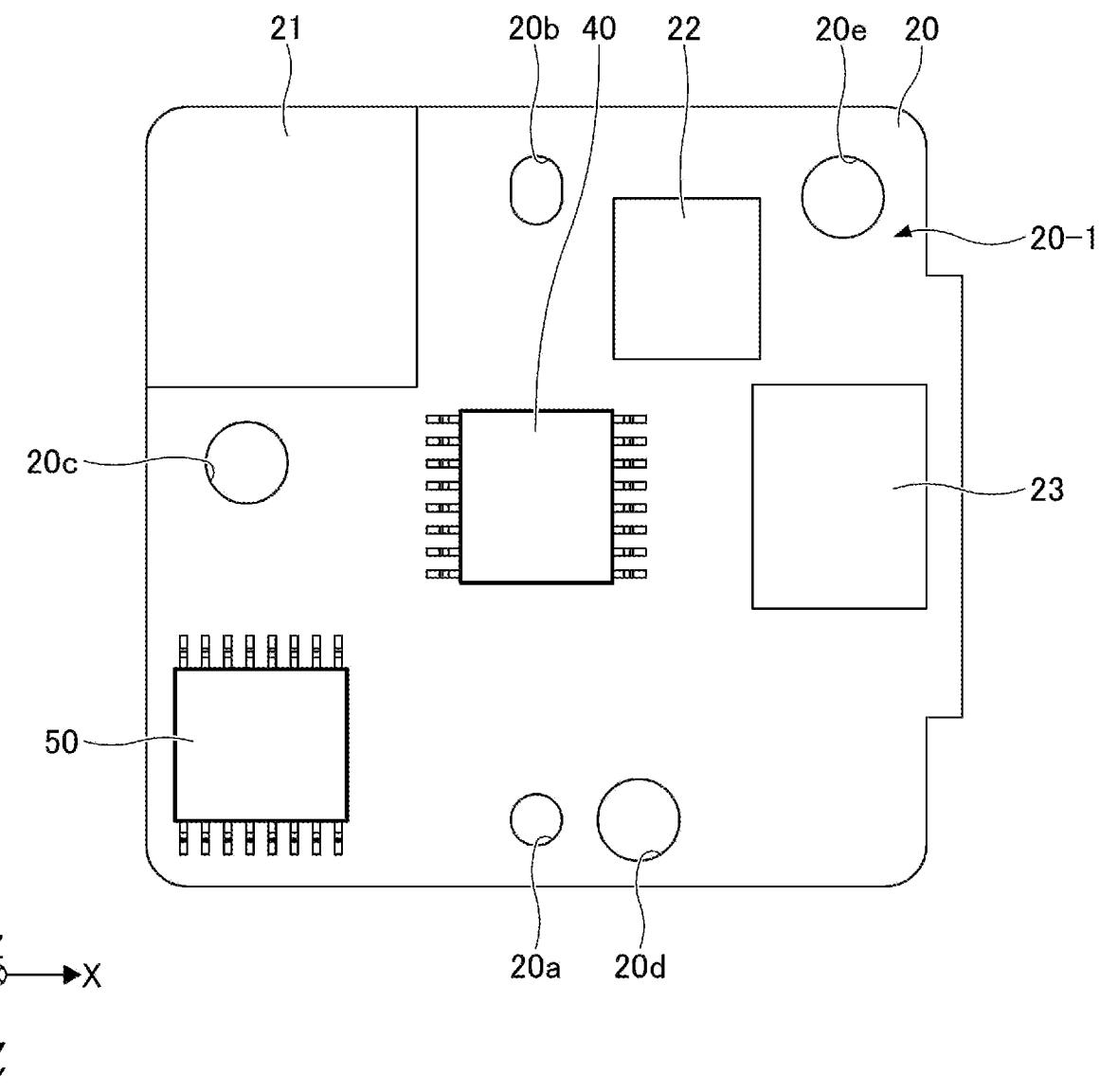
FIG. 29 is a view of the substrate 20 illustrated in FIG. 18 when viewed from a lower surface 20-1 thereof.
Figure 30:
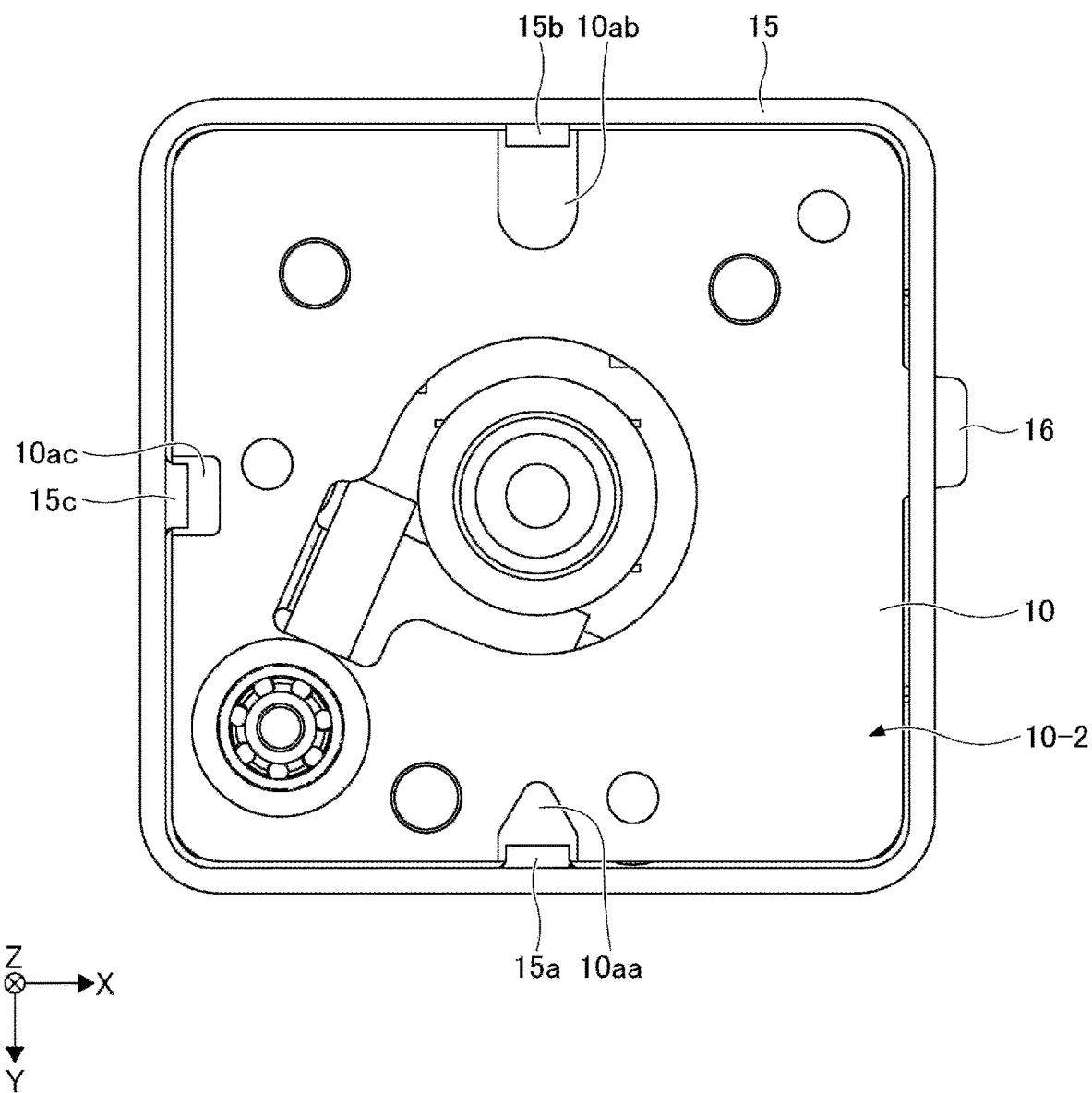
FIG. 30 is a view of the absolute encoder in FIG. 17 from which the motor 200 is removed and that is illustrated when viewed from a lower surface 10-2 of the main base 10.
Figure 31:
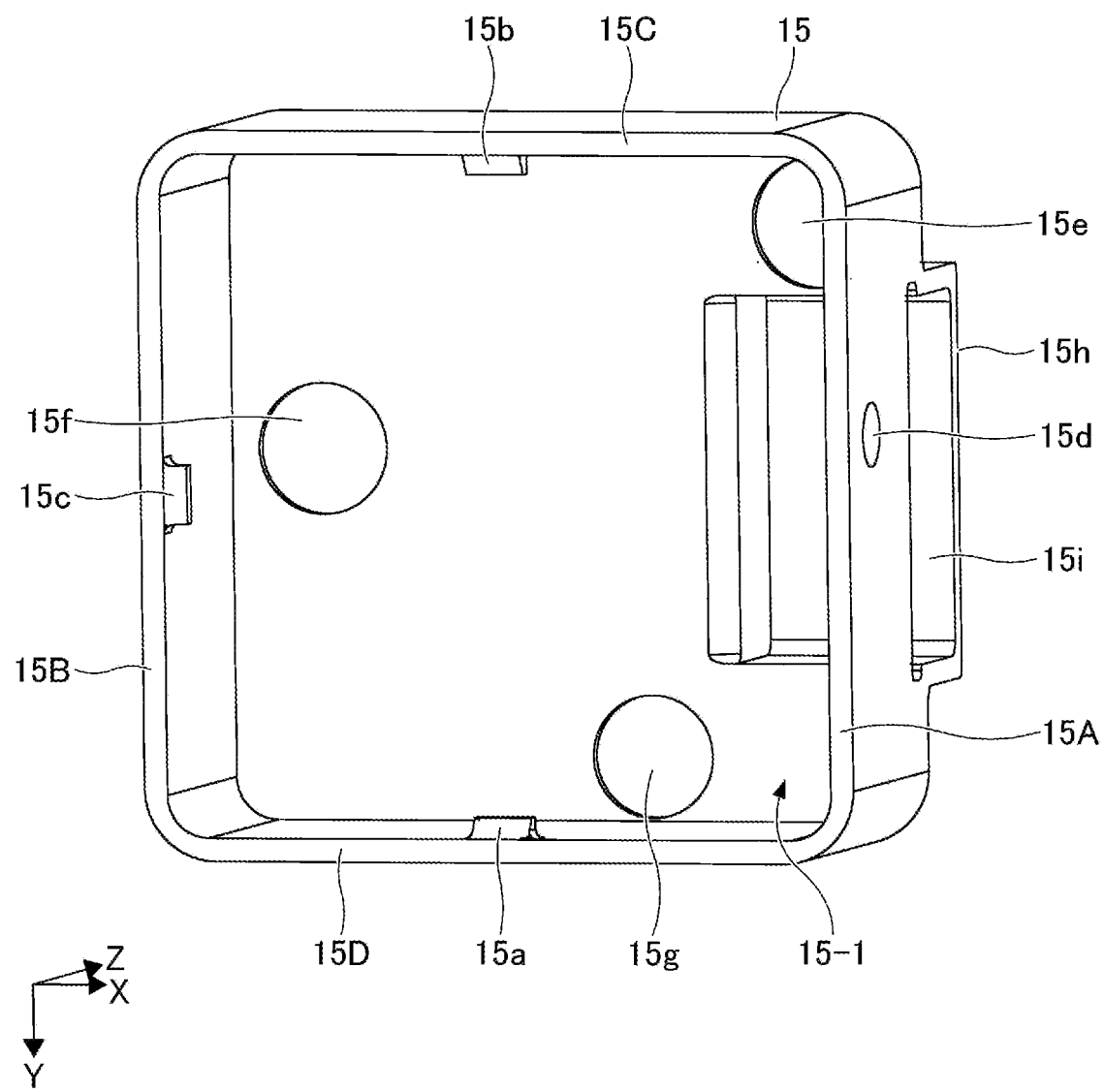
FIG. 31 is a perspective view of the case 15 illustrated in FIG. 17.

FIG. 29 is a view of the substrate 20 illustrated in FIG. 18 when viewed from a lower surface 20-1 thereof. FIG. 30 is a view of the absolute encoder in FIG. 17 from which the motor 200 is removed and that is illustrated when viewed from a lower surface 10-2 of the main base 10. The lower surface 10-2 of the main base 10 is a surface opposite to the upper surface of the main base 10 illustrated in FIG. 27. The lower surface 10-2 of the main base 10 is also a surface facing the motor 200. FIG. 31 is a perspective view of the case 15 illustrated in FIG. 17.

Figure 32:
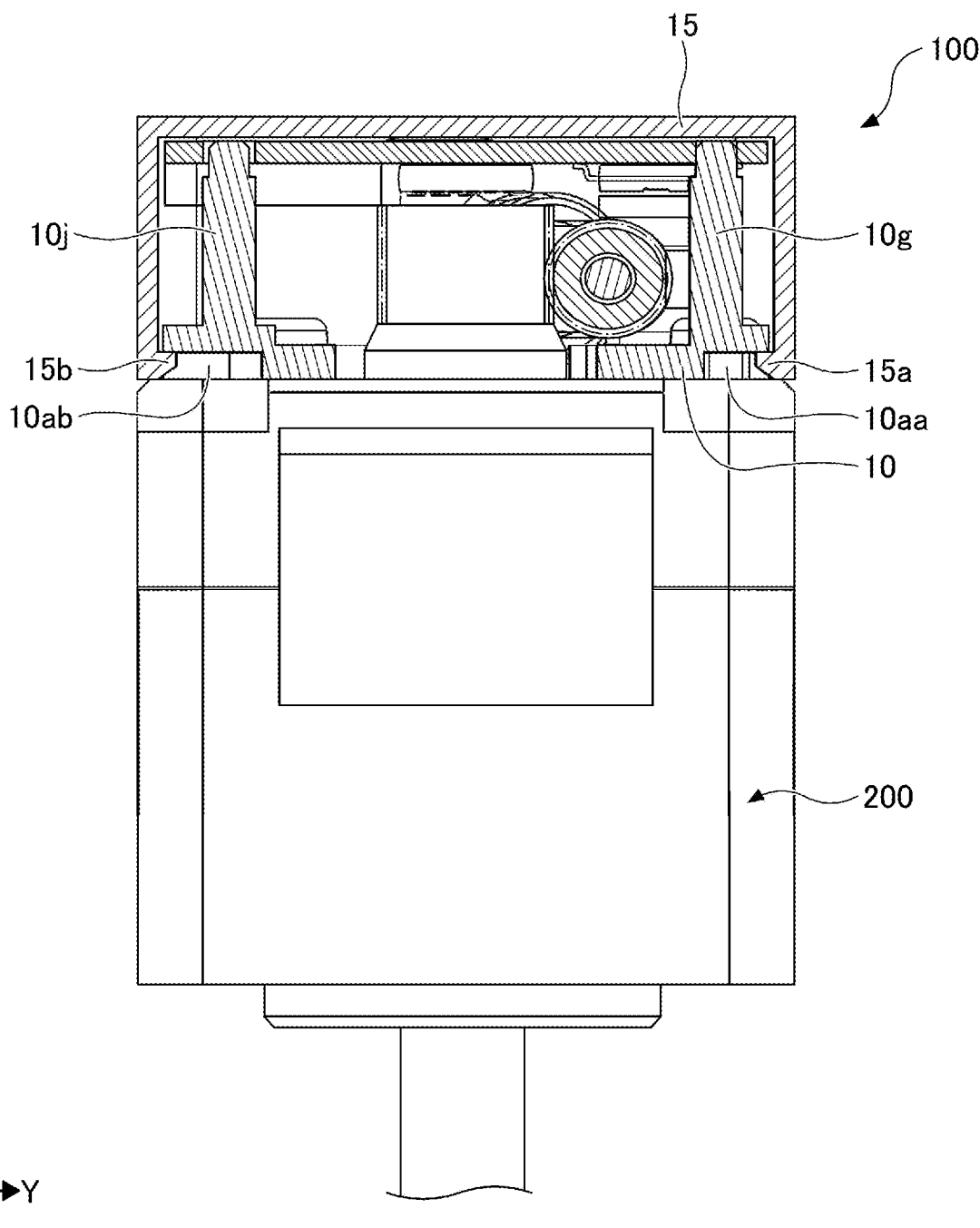
FIG. 32 is a cross-sectional view of the absolute encoder 100-2, as illustrated in FIG. 17, taken along a plane that passes through the center of the substrate positioning pin 10g and the center of the substrate positioning pin 10j, as illustrated in FIG. 17, and that is parallel to the Z-axis direction, where the motor 200 and the main spindle gear 1 are not illustrated in cross section.
Figure 36:
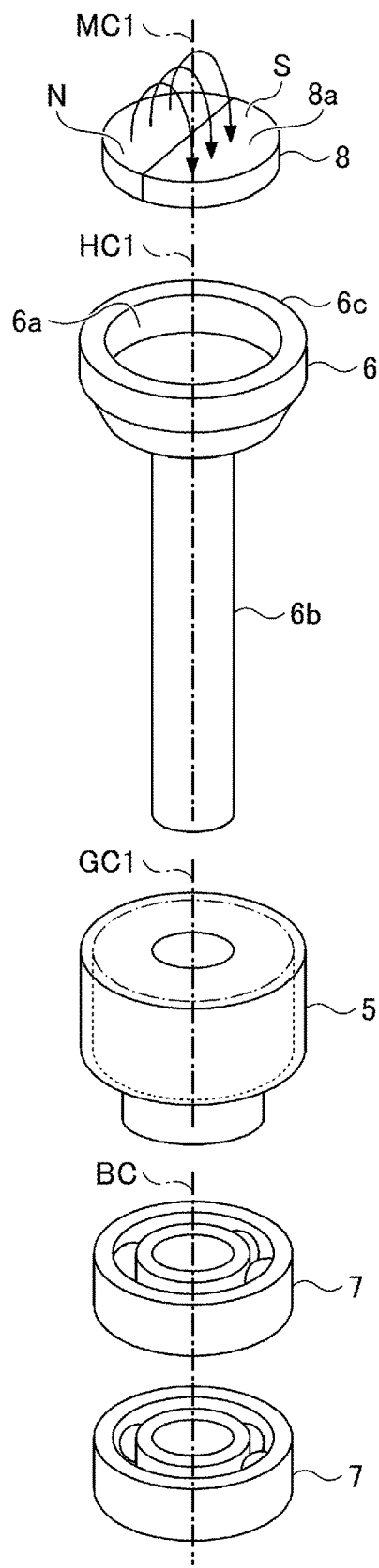
FIG. 36 is an exploded perspective view of a permanent magnet 8, a magnet holder 6, the layshaft gear 5, and bearings 7 as illustrated in FIG. 25.
Figure 37:
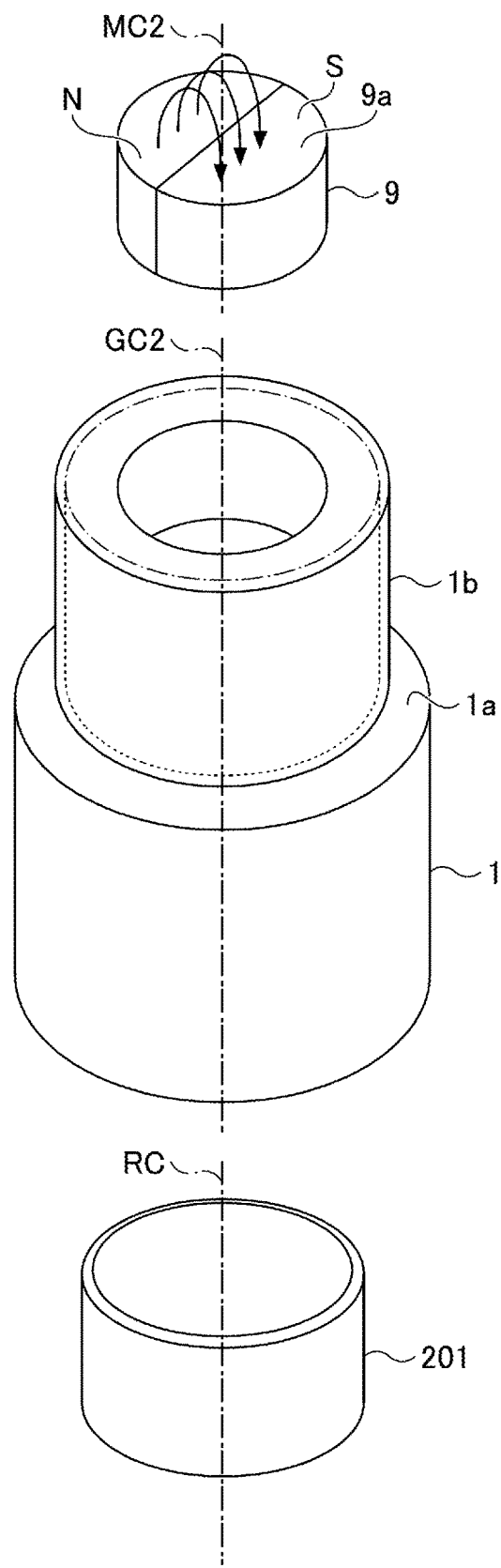
FIG. 37 is an exploded perspective view of a permanent magnet 9, the main spindle gear 1, and a motor shaft 201 as illustrated in FIG. 24.

FIG. 32 is a cross-sectional view of the absolute encoder 100-2, as illustrated in FIG. 17, taken along a plane that passes through the center of the substrate positioning pin 10g and the center of the substrate positioning pin 10j, as illustrated in FIG. 19, and that is parallel to the Z-axis direction, where the motor 200, the main spindle gear 1, and a magnetic sensor 40 are not illustrated in cross section. In FIG. 32, a state where a tab 15a provided in the case 15 is engaged with a recessed portion 10aa provided in the main base 10, and a state where a tab 15b provided in the case 15 is engaged with a recessed portion 10ab provided in the main base 10, are illustrated. FIG. 36 is an exploded perspective view of the permanent magnet 8, the magnet holder 6, the layshaft gear 5, and the bearings 7 as illustrated in FIG. 25. FIG. 37 is an exploded perspective view of the permanent magnet 9, the main spindle gear 1, the motor shaft 201 as illustrated in FIG. 24.

Hereinafter, the configuration of the absolute encoder 100-2 will be described in detail with reference to FIGS. 17 to 37. The absolute encoder 100-2 includes the main spindle gear 1, the intermediate gear 2, the bearing 3, the shaft 4, the layshaft gear 5, the magnet holder 6, the bearings 7, the permanent magnet 8, and the permanent magnet 9. The absolute encoder 100-2 includes the main base 10, the leaf spring 11, the screw 12, the substrate mounting screw 13, the screw 14, the case 15, the mounting screw 16, the substrate 20. The absolute encoder 100-2 includes the microcomputer 21, a bidirectional driver 22, a line driver 23, a connector 24, the magnetic sensor 40, and the magnetic sensor 50.

The motor 200 may be, for example, a stepping motor, a DC brushless motor, or the like. For example, the motor 200 is used as a drive source that drives a robot such as an industrial robot, via a deceleration mechanism such as strain wave gearing. The motor 200 includes the motor shaft 201. As illustrated in FIG. 24, one end of the motor shaft 201 protrudes from the housing 202 of the motor 200 in the Z-axis positive direction. As illustrated in FIG. 17, one end of the motor shaft 201 protrudes from the housing 202 of the motor 200 in the negative Z-axis direction. The motor shaft 201 is an example of a main shaft.

The outline shape of the motor 200 in a plan view is, for example, a square shape. Each of four sides corresponding to the appearance of the motor 200 has a length of 25 mm. Among the four sides corresponding to the outline of the motor 200, each of a first side and a second side parallel to the first side is parallel to the Y-axis. Among the four sides, each of a third side adjacent to the first side and a fourth side parallel to the third side is parallel to the X-axis. Also, the absolute encoder 100-2 provided for the motor 200 is a 25 mm per side square, corresponding to the outline shape of the motor 200, which is a 25 mm per side square in a plan view.

Hereafter, each of the components provided in the absolute encoder 100-2 will be described.

As illustrated in FIG. 24, the main spindle gear 1 is a cylindrical member that is coaxially provided with the motor shaft 201. The main spindle gear 1 includes a first cylindrical portion 1a being cylindrical, and a second cylindrical portion 1b being cylindrical and being coaxially provided with the first cylindrical portion 1a, toward the positive Z-axis direction of the first cylindrical portion 1a. The main spindle gear 1 includes a communicating portion 1c that connects the first cylindrical portion 1a, which is provided inwardly in a radial direction of the second cylindrical portion 1b, and includes the second cylindrical portion 1b and a worm gear 1d provided outwardly in the radial direction of the second cylindrical portion 1b. In such a manner, by forming the communicating portion 1c, the communicating portion 1c serves as a path for escaping the air when the main spindle gear 1 is press-fitted into the motor shaft 201. An inner diameter of the communicating portion 1c is smaller than an inner diameter of each of the first cylindrical portion 1a and an inner diameter of the second cylindrical portion 1b. A space surrounded by a bottom 1e of the communicating portion 1c, which is an end surface thereof in the negative Z-axis direction, and an inner peripheral surface of the first cylindrical portion 1a, is defined as a press-fit portion 1f for securing the main spindle gear 1 to an end of the motor shaft 201. The press-fit portion 1f is a recessed portion to recess the end portion of the first cylindrical portion 1a, from the negative Z-axis direction toward the positive Z-axis direction. The motor shaft 201 is press-fitted into the press-fit portion 1f, and the main spindle gear 1 rotates integrally with the motor shaft 201. The worm gear 1d is a gear of the main spindle gear 1.

A space surrounded by a bottom 1g, which is an end surface of the communicating portion 1c in the positive Z-axis, and an inner peripheral surface of a second cylindrical portion 1b, is defined as a magnet holding portion 1h for securing the permanent magnet 9. The magnet holding portion 1h is a recessed portion to recess the end portion of the second cylindrical portion 1b, from the positive Z-axis toward the negative Z-axis direction. The permanent magnet 9 is press-fitted into the magnet holding portion 1h. The outer peripheral surface of the permanent magnet 9 press-fitted into the magnet holding portion 1h contacts the inner peripheral surface of the second cylindrical portion 1b, and the lower surface 9b of the permanent magnet 9 contacts the bottom 1g of the second cylindrical portion 1b. In such a manner, the permanent magnet 9 is positioned in an axial direction and is positioned in the direction perpendicular to the axial direction. The axial direction of the permanent magnet 9 corresponds to the central axis direction of the motor shaft 201.

As illustrated in FIGS. 20 to 22 and 24, the worm gear 1d is composed of helically formed teeth, and engages with the worm wheel 2a of the intermediate gear 2. The worm wheel 2a is a gear of the intermediate gear 2. In FIG. 24, illustration of the teeth shape is omitted. The worm gear 1d is formed of, for example, a polyacetal resin. The worm gear 1d is an example of a first drive gear.

As illustrated in FIGS. 20 to 23, and the like, the intermediate gear 2 is rotatably supported by the shaft 4, above the upper surface of the main base 10. The central axis of the intermediate gear 2 is parallel to the X-Y plane. The central axis of the intermediate gear 2 is not parallel to each of the X axis and Y axis in a plan view. In other words, the central axis direction of the intermediate gear 2 is oblique to an extending direction of each of the X axis and Y axis. When the central axis direction of the intermediate gear 2 is oblique to the extending direction of each of the X axis and Y axis, it means that the central axis of the intermediate gear 2 extends obliquely with respect to each of four sides of the main base 10. As illustrated in FIGS. 20 and 21, the four sides of the main base 10 are composed of a first side 301 parallel to the Y-Z plane, a second side 302 parallel to the first side 301, a third side 303 that is parallel to the X-Z plane and that is adjacent to the first side 301, and a fourth side 304 parallel to the third side 303. The first side 301 is a side of the main base 10 provided toward the positive X-axis direction. The second side 302 is a side of the main base 10 provided toward the negative X-axis direction. The third side 303 is a side of the main base 10 provided toward the positive Y-axis direction. The fourth side 304 is a side of the main base 10 provided toward the negative Y-axis direction.

As an example, the dimensions of the absolute encoder 100-2 in a plan view are adjusted to correspond to the dimensions of the motor 200 that is a square of 25 mm sides. In such a manner, the intermediate gear 2 disposed parallel to the X-Y plane is provided so as to extend obliquely with respect to each of the four sides of the main base 10, and thus the dimensions of the absolute encoder 100-2 can be reduced in a horizontal direction. The horizontal direction corresponds to a direction perpendicular to the central axis of the motor shaft 201, and corresponds to a direction parallel to the X-Y plane.

As illustrated in FIGS. 19 to 23, and the like, the intermediate gear 2 includes the worm wheel 2a, the worm gear 2b, a shaft receiving portion 2c, the press-fit portion 2d, a sliding portion 2e, a bottom 2f, and a through-hole 2g. The intermediate gear 2 is a cylindrical member in which the shaft 4 is inserted into the through-hole 2g, through which the member is provided along a central axis of the intermediate gear 2. The through-hole 2g defines a space surrounded by the inner peripheral surface of the intermediate gear 2. The intermediate gear 2 is a member integrally formed of metal, resin, or the like. In this description, as an example, the intermediate gear 2 is formed of a polyacetal resin.

The worm wheel 2a is a gear that the worm gear 1d of the main spindle gear 1 engages with. The worm wheel 2a is an example of a first driven gear and is a gear of the intermediate gear 2. The worm wheel 2a is axially provided at a location near a middle portion of the intermediate gear 2, in an axial direction of the intermediate gear 2. The worm wheel 2a is configured with a plurality of teeth that are provided on the outer periphery of a given cylindrical portion of the intermediate gear 2.

The outer diameter of the worm wheel 2a is smaller than the outer diameter of the worm gear 1d. The central axis of the worm wheel 2a is parallel to the top surface of the main base 10, and when the outer diameter of the worm wheel 2a is decreased, the size of the absolute encoder 100-2 can be reduced in the Z-axis direction (height direction).

The worm gear 2b is configured with helically formed teeth, and is provided adjacently and coaxially with the worm wheel 2a. The worm gear 2b is provided on the outer periphery of a given cylindrical portion of the intermediate gear 2. When the worm gear 2b engages with the worm wheel 5a provided in the layshaft gear 5, a rotating force of the intermediate gear 2 is transmitted to the layshaft gear 5. The worm gear 2b is an example of a second drive gear, and is a gear of the intermediate gear 2. The worm wheel 5a is a gear of the layshaft gear 5. When viewed from a direction that is both perpendicular to the centerline of the worm wheel 5a and perpendicular to the centerline of the worm gear 2b, the centerline of the worm wheel 5a and perpendicular to the centerline of the worm gear 2b intersect each other.

A smaller value for the outer diameter of the worm gear 2b is set to the extent possible, in order to allow for the reduced size of the absolute encoder 100-2 in the Z-axis direction (height direction).

As illustrated in FIG. 22, the shaft receiving portion 2c is provided on the side of the intermediate gear 2 opposite the press-fit portion 2d. That is, on the sliding portion 2e-side of the intermediate gear 2, the shaft receiving portion 2c is provided radially and inwardly on the inner peripheral surface of the intermediate gear 2. The shaft 4 capable of sliding is inserted through the shaft receiving portion 2c, and the intermediate gear 2 is rotatably supported by the shaft 4.

The press-fit portion 2d is a recessed portion inside the worm gear 2b to recess, in the axial direction Td, an end surface of the intermediate gear 2 toward a middle portion of the intermediate gear 2, and communicates with the through-hole 2g. The press-fit portion 2d can be defined as a portion of the through-hole 2g, where an opening diameter at an end portion of the through-hole 2g is increased. An outer ring 3a of the bearing 3 is press-fitted into and secured to the press-fit portion 2d.

As illustrated in FIGS. 20 to 22, FIG. 26, FIG. 27, and the like, the sliding portion 2e of the intermediate gear 2 is provided at one end of the intermediate gear 2. That is, the sliding portion 2e is provided opposite the worm gear 2b with respect to the axial direction Td on the side of the intermediate gear 2. The sliding portion 2e of the intermediate gear 2 contacts a sliding portion 11a of the leaf spring 11. The leaf spring 11 is an example of an elastic member and is, for example, made of metal. The sliding portion 11a of the leaf spring 11 is configured with two bifurcated portions each of which is branched from a base 11d of the leaf spring 11. The base 11d of the leaf spring 11 is a plate-shaped member provided between a mounting portion 11b and the sliding portion 11a in the entire leaf spring 11.

A space defining a greater diameter than the shaft 4 is formed between the two bifurcated portions that constitute the sliding portion 11a of the leaf spring 11. In such a manner, each of the two bifurcated portions extends across the shaft 4, and the mounting portion 11b of the leaf spring 11 is secured to the leaf-spring mounting surface 10e with the screw 12, so as not to contact the shaft 4, where the leaf-spring mounting surface 10e is disposed on a wall 72 of the main base 10.

After the intermediate gear 2 is assembled, the sliding portion 11a of the leaf spring 11 is disposed at a location facing the sliding portion 2e of the intermediate gear 2. The sliding portion 2e of the intermediate gear 2 contacts the sliding portion 11a of the leaf spring 11, and when the sliding portion 2e is pressed by the sliding portion 11a, the sliding portion 2e is preloaded in a direction from one end 4a of the shaft 4 to the other end 4b of the shaft 4, along the central axis of the shaft 4. In such a state, when the intermediate gear 2 rotates, the sliding portion 2e of the intermediate gear 2 slides, while contacting the sliding portion 11a of the leaf spring 11.

The bottom 2f of the intermediate gear 2 is positioned next to the press-fit portion 2d and contacts a side surface 3c of the outer ring 3a of the bearing 3. The outer ring 3a is press-fitted into the press-fit portion 2d until the side surface 3c of the outer ring 3a contacts the bottom 2f.

The through-hole 2g of the intermediate gear 2 passes through the intermediate gear 2 along the central axis of the intermediate gear, from the shaft receiving portion 2c toward the press-fit portion 2d, and is disposed coaxially with the shaft 4. The inner diameter of the through-hole 2g is greater than the outer diameter of the shaft 4, and thus a given space is secured between the through-hole 2g and the outer peripheral surface of the shaft 4.

As illustrated in FIG. 22 and FIG. 23, the bearing 3 includes the outer ring 3a, an inner ring 3b, the side surface 3c, and a side surface 3d. The side surface 3c of the bearing 3 is a side surface of the outer ring 3a in the axial direction Td of the shaft 4, as represented by the arrow in FIG. 22, and the side surface 3d of the bearing 3 is a side surface of the inner ring 3b in such an axial direction. Note that in the embodiment of the present invention, the (central) axial direction of each of the intermediate gear 2 and the shaft 4 is represented by Td.

The outer ring 3a of the bearing 3 is press-fitted into and secured to the press-fit portion 2d, and the side surface 3c contacts the bottom 2f and thus is secured. The shaft 4 is inserted into the inner ring 3b. As illustrated in FIG. 22, the side surface 3d of the inner ring 3b contacts a contact surface 10c of the wall 80 of the main base 10. With the contact surface 10c, a location of the intermediate gear 2 in the axial direction Td is determined. As described above, the intermediate gear 2 is preloaded by the leaf spring 11, in the axial direction Td from one end 4a of the shaft 4 toward the other end 4b of the shaft 4, and thus the side surface 3c of the outer ring 3a of the bearing 3 in contact with the bottom 2f of the intermediate gear 2 is also preloaded in the same direction as the axial direction. Accordingly, the inner ring 3b of the bearing 3 is also preloaded in the same direction as the above direction, so that the side surface 3d of the inner ring 3b of the bearing 3 becomes in contact with the contact surface 10c of the wall 80. As a result, a given preloading force is transferred to the contact surface 10c of the wall 80, and the intermediate gear 2 is stably supported in the axial direction Td of the shaft 4. The preloading force will be described below in detail.

The outer ring 3a of the bearing 3 is rotatably provided with respect to the inner ring 3b. In such a manner, the intermediate gear 2 is rotatably supported by the shaft 4, at two locations of the shaft receiving portion 2c of the intermediate gear 2 and the bearing 3, as illustrated in FIG. 22. Note that the shaft 4 is formed, for example, of stainless steel.

As illustrated in FIG. 22, each of the wall 70 and the wall 80 is an example of a holding portion to rotatably hold the intermediate gear 2 through the shaft 4. The wall 80 is integrally provided on the upper surface of the base 60, so as to form a pair with the wall 70, and extends from the upper surface of the base 60, toward the positive Z-axis direction. In the entire upper surface of the base 60, the wall 80 is provided in a plan view, in a region that is toward the second side 302 in the X-axis direction with respect to the middle portion of the base 60 and that is toward the third side 303 in the Y-axis direction with respect to the middle portion of the base 60. In the region described above, the wall 80 is also provided at a location near the second side 302 and is provided near the middle portion of the base 60 in the Y-axis direction. The wall 70, the wall 80, and the shaft 4 serve as a holding portion to rotatably hold the intermediate gear 2. The shaft 4 is a cylindrical member and has one end 4a and the other end 4b. The other end 4b of the shaft 4 is press-fitted into and secured to a hole 10b formed in the wall 80 of the main base 10. In contrast, the one end 4a of the shaft 4 is inserted into and positioned in a hole 10a formed in the wall 70. It is not necessary for the one end 4a of the shaft 4 to be pressed-fitted into the hole 10a. As described above, the one end 4a of the shaft 4 is inserted into the hole 10a without being press-fitted into the hole 10a, thereby facilitating assembly of the shaft 4, in comparison to a case where the one end 4a of the shaft 4 is pressed-fitted into the hole 10a.

As illustrated in FIG. 21 and the like, in the absolute encoder 100-2, the layshaft gear 5 is provided on the side opposite the main spindle gear 1 with respect to the intermediate gear 2. For example, the layshaft gear 5 is disposed in a region near a given corner of the main base 10, in a region surrounded by the four sides of the main base 10. The given corner is, for example, a portion at which the second side 302 and the third side 303, as illustrated in FIG. 21, meet. In such a manner, the layshaft gear 5 and the main spindle gear 1 utilizes a limited region of the main base 10 to be arranged in a manner of sandwiching the intermediate gear 2. Thus, in comparison to a case where the layshaft gear 5 and the main spindle gear 1 are disposed adjacent to each other without sandwiching the intermediate gear 2, a distance from the layshaft gear 5 to the main spindle gear 1 can be increased.

The magnetic sensor 40 detects changes in magnetic flux that is induced through the permanent magnet 9 in accordance with rotation of the permanent magnet 9, which rotates together with the main spindle gear 1. In such a manner, the magnetic sensor 40 can detect a corresponding rotation angle of the main spindle gear 1. In contrast, the magnetic sensor 50 detects changes in magnetic flux that is induced through the permanent magnet 8 in accordance with rotation of the permanent magnet 8, which rotates together with the layshaft gear 5. In such a manner, the magnetic sensor 50 can detect a corresponding rotation angle of the layshaft gear 5.

Hereafter, magnetic interference will be described, where for example, if the main spindle gear 1 and the layshaft gear 5 are disposed adjacent to each other, a portion of magnetic flux induced through each of the permanent magnet 8 and the permanent magnet 9 might influence a magnetic sensor that does not correspond to a given permanent magnet among the permanent magnet 8 and the permanent magnet 9.

FIG. 10 is a diagram illustrating a manner of a waveform (A) of magnetic flux that is from the permanent magnet 9 provided with respect to the main spindle gear 1 and that is detected by the magnetic sensor 40, a waveform (B) of magnetic flux that is from the permanent magnet 8 provided with respect to the layshaft gear 5 and that is detected by the magnetic sensor 50, and a magnetically interfering waveform (C) of the magnetic flux, from the permanent magnet 9, on which a portion of the magnetic flux from the permanent magnet 8 is superimposed as leakage magnetic flux, where the magnetically interfering waveform (c) is detected by the magnetic sensor 40. The vertical axis represents the magnetic flux, and the horizontal axis represents the rotation angle of the main spindle gear 1. In such a manner, the magnetic sensor 40 desirably detects the waveform (A) above. However, if magnetic interference occurs, the waveform illustrated in (C) above is produced, and thus the waveform could not be detected accurately.

Likewise, FIG. 11 is a diagram illustrating a concept of a waveform (A) of magnetic flux that is from the permanent magnet 8 provided with respect to the layshaft gear 5 and that is detected by a magnetic sensor 50, a waveform (B) of magnetic flux that is from the permanent magnet 9 provided with respect to the main spindle gear 1 and that is detected by the magnetic sensor 40, and a magnetically interfering waveform (C) of the magnetic flux, from the permanent magnet 8, on which a portion of the magnetic flux from the permanent magnet 9 is superimposed as leakage magnetic flux, where the magnetically interfering waveform (c) is detected by the magnetic sensor 50. The vertical axis represents the magnetic flux, and the horizontal axis represents the rotation angle of the layshaft gear 5. In such a manner, the magnetic sensor 50 desirably detects the waveform (A) above. However, if magnetic interference occurs, the waveform illustrated in (C) above is produced, and thus the waveform could not be detected accurately.

Accordingly, in the absolute encoder 100-2 according to the second embodiment, the main spindle gear 1 and the permanent magnet 9 are each disposed at a distance from the layshaft gear 5 and the permanent magnet 8, such that the intermediate gear 2 is provided between a pair of the main spindle gear 1 and the permanent magnet 9 and a pair of the layshaft gear 5 and the permanent magnet 8. Thus, the occurrence of the magnetic interference, in which a portion of the magnetic flux induced through each of the permanent magnet 8 and the permanent magnet 9 influences a given magnetic sensor that does not correspond to a given permanent magnet among the permanent magnet 8 and the permanent magnet 9, can be reduced. For example, in the magnetic sensor 50, which is provided for primary purposes of detecting changes in magnetic flux that is induced through the permanent magnet 8 provided with respect to the layshaft gear 5, interference of a portion of magnetic flux to be induced, as leakage magnetic flux, through the permanent magnet 9 provided with respect to the main spindle gear 1 can be mitigated. Also, in the magnetic sensor 40, which is provided for primary purposes of detecting changes in magnetic flux that is induced through the permanent magnet 9, interference of a portion of magnetic flux to be induced, as leakage magnetic flux, through the permanent magnet 8 provided with respect to the layshaft gear 5 can be mitigated.

As described above, in the absolute encoder 100-2 according to the second embodiment, decreases in accuracy of the magnetic sensor 50 to detect the rotation angle or the rotation amount of the layshaft gear 5 can be prevented, as well as relatively reducing the size of the absolute encoder 100-2 in a plan view. Further, in the absolute encoder 100-2, decreases in accuracy of the magnetic sensor 40 to detect the rotation angle or the rotation amount of the main spindle gear 1 can be prevented, as well as relatively reducing the size of the absolute encoder 100-2 in a plan view.

As illustrated in FIG. 25, the layshaft gear 5 is a cylindrical member that is press-fitted into and secured to the shaft 6b of the magnet holder 6. The layshaft gear 5 includes the worm wheel 5a and a through-hole 5b. The layshaft gear 5 is a member integrally molded from metal or resin. In this description, the layshaft gear 5 is formed of a polyacetal resin, as an example.

The worm wheel 5a is a gear that engages with the worm gear 2b. The worm wheel 5a is an example of a second driven gear. The worm wheel 5a is configured with a plurality of teeth that are provided on the outer periphery of a given cylindrical portion of the layshaft gear 5. In FIG. 20, when the intermediate gear 2 rotates, a rotating force of the intermediate gear 2 is transferred to the layshaft gear 5 through the worm gear 2b and the worm wheel 5a.

The through-hole 5b is a hole through the cylindrical layshaft gear 5 along the central axis thereof. The shaft 6b of the magnet holder 6 is press-fitted into the through-hole 5b, and the layshaft gear 5 rotates together with the magnet holder 6.

As illustrated in FIG. 25 and FIG. 36, the magnet holder 6 includes the magnet holding portion 6a, the shaft 6b, and a head 6c. The magnet holder 6 is a member integrally molded from metal or resin. In this description, the magnet holder 6 is formed of non-magnetic stainless steel, as an example.

Outer rings 7a of the two bearings 7 are press-fitted into an inner peripheral surface 10dc of the bearing holder 10d formed in the main base 10. Note that each of the two bearings 7 has a given outer ring 7a and a given inner ring 7b.

The shaft 6b of the magnet holder 6 is a cylindrical member and is press-fitted into the through-hole 5b of the layshaft gear 5. A lower portion of the shaft 6b is inserted into the inner rings 7b of the two bearings 7. In such a manner, the magnet holder 6 is pivoted by the two bearings 7, with respect to the main base 10, and rotates together with the layshaft gear 5.

The head 6c is provided at the upper end of the magnet holder 6. The head 6c is a cylindrical member with a bottom. The magnet holding portion 6a is formed at the head 6c. The magnet holding portion 6a is a recessed portion to downwardly recess the upper end surface of the head 6c. The outer peripheral surface of the permanent magnet 8 disposed in the magnet holding portion 6a contacts the inner peripheral surface of the head 6c. Thus, the permanent magnet 8 is secured to the magnet holding portion 6a of the head 6c.

The shaft 6b of the magnet holder 6 is pivoted by the two bearings 7 disposed at the bearing holder 10d that is formed in the main base 10, and thus inclination of the magnet holder 6 can be prevented. In such a manner, if the two bearings 7 are disposed to the extent possible to be apart from each other in the axial direction of the shaft 6b, effects of preventing the inclination of the magnet holder 6 are obtained.

As illustrated in FIG. 25, an upper portion 10db of the bearing holder 10d is in an upper-side region of the bearing holder 10d in the Z-axis direction, in the entire bearing holder 10d. One bearing 7 is provided inside an upper portion 10db of the bearing holder 10d. A lower portion 10da of the bearing holder 10d is in a lower-side region of the bearing holder 10d in the Z-axis direction, in the entire bearing holder 10d. Another bearing 7 is provided inside the lower portion 10da of the bearing holder 10d.

As illustrated in FIG. 25, a cut-out portion 202a is provided in a portion of the housing 202 of the motor 200. The cut-out portion 202a is a recessed portion recessed toward the negative Z-axis direction. The lower portion 10da of the bearing holder 10d is provided to protrude, in the main base 10. In such a manner, by providing the cut-out portion 202a in the housing 202 of the motor 200, interference of the bearing holder 10d with the motor 200 is avoided. The lower portion 10da of the bearing holder 10d is in the lower-side region of the bearing holder 10d in the Z-axis direction, in the entire bearing holder 10d. The one bearing 7 is provided inside the lower portion 10da of the bearing holder 10d. In such a manner, by providing the cut-out portion 202a in the housing 202 of the motor 200, a longer distance between the two bearings 7 to be separated in the Z-axis direction can be set in comparison to a case where the cut-out portion 202a is not provided. The upper portion 10db of the bearing holder 10d is in the upper-side region of the bearing holder 10d in the Z-axis direction, in the entire bearing holder 10d.

When each bearing 7 is disposed in the axial direction of the shaft 6b of the magnet holder 6, at a location closer to the magnet holding portion 6a and the permanent magnet 8, shaft deflection can be reduced during rotation of the magnet holder 6 and the permanent magnet 8. Further, the outer diameter side of the upper portion 10db of the bearing holder 10d is proximal to the intermediate gear 2. Thus, when a slope is formed on the upper portion 10db of the bearing holder 10d, interference with an addendum circle of the intermediate gear 2 is avoided, while each bearing 7 can be provided at a location closer to the magnet holding portion 6a and the permanent magnet 8.

By detecting changes in magnetic flux that is induced through the permanent magnet 9 in accordance with rotation of the permanent magnet 9, which rotates together with the main spindle gear 1, the magnetic sensor 40 can detect a corresponding rotation angle of the main spindle gear 1. By detecting changes in magnetic flux that is induced through the permanent magnet 8 in accordance with rotation of the permanent magnet 8, which rotates together with the layshaft gear 5, the magnetic sensor 50 can detect a corresponding rotation angle of the layshaft gear 5.

As illustrated in FIG. 25 and FIG. 36, the permanent magnet 8 has a surface 8a. The permanent magnet 8 is approximately cylindrical, and a central axis MC1 (an axis representing the center of the permanent magnet 8, or an axis through the center of an interface between magnetic poles) of the permanent magnet 8 coincides with each of a central axis HC1 of the magnet holder 6, a central axis GC1 of the layshaft gear 5, and a central axis BC of the bearing 7. The surface 8a of the permanent magnet 8 faces the surface 50a of the magnetic sensor 50, at a fixed distance from the surface 50a of the magnetic sensor 50. By matching the central axes in such a manner, a given rotation angle or rotation amount can be detected with higher accuracy.

Note that in the present embodiment, as illustrated in FIG. 36, two magnetic poles (NIS) of the permanent magnet 8 are formed adjacent to each other at a plane (X-Y plane) perpendicular to the central axis MC1 of the permanent magnet 8. In other words, in the central axis MC1, the center of rotation of the permanent magnet 8 desirably coincides with the center of the interface between the magnetic poles. Thus, accuracy for detecting a given rotation angle or rotation amount can be further improved.

As illustrated in FIG. 24 and FIG. 37, the permanent magnet 9 is a approximately cylindrical permanent magnet that is press-fitted into the magnet holding portion 1h of the main spindle gear 1, and has the upper surface 9a and a lower surface 9b. The upper surface 9a of the magnet faces a surface 40a of the magnetic sensor 40, at a fixed distance from the surface 40a of the magnetic sensor 40. The lower surface 9b of the magnet contacts the bottom 1g of the magnet holding portion 1h of the main spindle gear 1, and with the lower surface 9b of the magnet, a location (location in the Z-axis direction) of the main spindle gear 1 in a central axis GC2-direction is determined. The central axis MC2 (an axis representing the center of the permanent magnet 9 or an axis through the center of an interface between magnetic poles) of the permanent magnet 9 coincides with each of the central axis GC2 of the main spindle gear 1 and a central axis RC of the motor shaft 201. By matching the central axes in such a manner, the rotation angle or rotation amount can be detected with higher accuracy.

Note that in the present embodiment, as illustrated in FIG. 37, it is desirable that the two magnetic poles (N/S) of the permanent magnet 9 are formed adjacent to each other in a plane (X-Y plane) perpendicular to the central axis MC2 of the permanent magnet 9. Thus, accuracy in detecting a given rotation angle or rotation amount is further increased.

Note that each of the permanent magnet 8 and the permanent magnet 9 is formed of a magnetic material such as a ferrite-type or Nd (neodymium)-Fe (iron)-B (boron). Each of the permanent magnet 8 and the permanent magnet 9 may be, for example, a rubber magnet including a resin binder, a bond magnet, or the like.

In FIG. 29, a positioning hole 20a, a positioning hole 20b, a hole 20c, a hole 20d, and a hole 20e, which are multiple through-holes formed in the substrate 20, are illustrated. The shape of a wall surface forming the positioning hole 20a is a circle, for example. The shape of a wall surface forming the positioning hole 20b is an ellipse, for example. Each of the hole 20c, the hole 20d, and the hole 20e is a through-hole for securing the substrate 20 to the main base 10 with the substrate-mounting screws 13, as illustrated in FIG. 18. The shape of the wall surface forming each of the hole 20c, the hole 20d, and the hole 20e is a circle, for example. The diameter of the wall surface forming each of the hole 20c, the hole 20d, and the hole 20e is greater than a diameter of an external thread of each substrate-mounting screw 13 and is smaller than a diameter of a head of each substrate-mounting screw 13.

As illustrated in FIG. 19 to FIG. 22, FIG. 26 to FIG. 28, and the like, the main base 10 includes the hole 10a, the hole 10b, the contact surface 10c, the bearing holder 10d, a leaf-spring mounting surface 10e, the base 60, the wall 70, the wall 80, an opening 10-1, and a screw hole 10f. The main base 10 includes the substrate positioning pin 10g, the substrate positioning pin 10j, a distal end 10h, a distal end 10k, a pillar 10m, a pillar 10q, a pillar 10s, a screw hole 10u, a screw hole 10v, and a screw hole 10w. The substrate positioning pin 10g, the substrate positioning pin 10j, the pillar 10m, the pillar 10q, and the pillar 10s are examples of pillar members. A stepped portion 10i is formed between the distal end 10h of the substrate positioning pin 10g, which extends in the Z-axis direction from the main base 10, and a base 10g1 of the substrate positioning pin 10g. When the distal end 10h of the substrate positioning pin 10g is inserted into the positioning hole 20a formed in the substrate 20, a space is formed between the lower surface 20-1 of the substrate 20 and the stepped portion 10i. Likewise, a stepped portion 10l is formed between the distal end 10k of the substrate positioning pin 10j, which extends in the Z-axis direction from the main base 10, and a base 10j1 of the substrate positioning pin 10j. When the distal end 10k of the substrate positioning pin 10j is inserted into the positioning hole 20b formed in the substrate 20, a space is formed between the lower surface 20-1 of the substrate 20 and the stepped portion 10l. In such a manner, when the two substrate positioning pins 10g and 10j are used, the location of the substrate 20 in the direction perpendicular to the Z-axis direction is determined. However, because a given space is formed between each of the stepped portion 10i and the stepped portion 10l, and the substrate 20, the location of the substrate 20 in the Z-axis direction is not determined by the two substrate positioning pins 10g and 10j.

The base 60 of the main base 10 is, for example, an integrally molded aluminum die cast member, and is a plate-like member that is approximately square in a plan view. The base 60 is an example of a plate. The base 60 is mounted on the upper surface of the motor 200.

The opening 10-1 illustrated in FIG. 19 passes through the base 60 in a thickness direction (Z-axis direction). The main spindle gear 1 is inserted through the opening 10-1. The opening 10-1 is an example of a first through-hole.

As illustrated in FIG. 20, FIG. 21, FIG. 26, FIG. 27, and the like, the wall 70 has a wall 71 and a wall 72. The wall 70 serves to support the shaft 4 and secure the leaf spring 11. The wall 71 is integrally provided on the upper surface of the base 60 and extends in the positive Z-axis direction from the base 60. The wall 70 is provided in a plan view in a region that is toward the first side 301 with respect to the middle portion of the base 60 in the X-axis direction and that is toward the fourth side 304 with respect to the middle portion of the base 60 in the Y-axis direction, in the entire upper surface of the base 60. The wall 71 has a mounting surface 10ad positioned toward the positive X-axis direction, and has a screw hole 10ae through the wall 71 in the positive X-axis direction. As illustrated in FIG. 17, FIG. 30, and FIG.

31, the mounted screw 16 is inserted through a hole 15d of the case 15 to be screwed into the screw hole 10ae. Thus, the inner surface of the case 15 is secured by contact with the mounting surface 10ad of the wall 71.

As illustrated in FIG. 21, the wall 72 is provided in a plan view, in a region that is toward the first side 301 with respect to the middle portion of the base 60 in the X-axis direction and that is toward the third side 303 with respect to the middle portion of the base 60 in the Y-axis direction, in the entire upper surface of the base 60. The wall 72 is connected to the wall 71 and extends from the wall 71 toward the proximity of the middle portion of the third side 303. An end portion of the wall 72 toward the third side 303 is connected to the pillar 10s. The pillar 10s connected to the wall 72 is provided at a location near the middle portion of the main base 10 in the X-axis direction, as well as being situated at a location near the third side 303 of the main base 10. In such a manner, the wall 72 extends from the wall 71 toward the pillar 10s. In other words, the wall 72 extends obliquely with respect to each of the X-axis and Y-axis, in a plan view.

As illustrated in FIG. 27, the screw 12 is inserted through a hole 11c formed in the mounting portion 11b of the leaf spring 11, and is screwed into a screw hole 10f formed in the wall 72 of the main base 10. In such a manner, the mounting portion 11b of the leaf spring 11 contacts the leaf-spring mounting surface 10e formed in the wall 72, and the leaf spring 11 is thereby secured to the wall 72. The wall 72 serves as a securing portion for the leaf spring 11 to be secured. At this time, as illustrated in FIG. 21 and FIG. 22, the sliding portion 11a of the leaf spring 11 contacts the sliding portion 2e of the intermediate gear 2 into which the shaft 4 is inserted.

A mounting angle θ illustrated in FIG. 22 will be described. The worm gear 1d of the main spindle gear 1 is engaged with the worm wheel 2a, and in accordance with rotation of the worm gear 1d of the main spindle gear 1, a first thrust force against the intermediate gear 2 is generated in the direction from the other end 4b of the shaft 4 to one end 4a of the shaft 4, or the direction from one end 4a of the shaft 4 to the other end 4b of the shaft 4. Further, by engagement of the worm gear 2b with the worm wheel 5a of the layshaft gear 5, a second thrust force against the intermediate gear 2 is also generated in the direction from the other end 4b of the shaft 4 toward one end 4a of the shaft 4, or the direction from one end 4a of the shaft 4 toward the other end 4b of the shaft 4. In such a manner, even when the first thrust force and the second thrust force are generated, in order to accurately transmit a rotation amount of the worm gear 1d of the main spindle gear 1 to the worm wheel 5a of the layshaft gear 5, movement of the intermediate gear 2 in the axial direction Td of the shaft 4 needs to be restricted. The leaf spring 11 applies a preloading force to the intermediate gear 2, in the direction from one end 4a of the shaft 4 toward the other end 4b of the shaft 4. A greater preloading force applied by the leaf spring 11 is set in comparison to the sum of the first thrust force and second thrust force in the direction from the other end 4b of the shaft 4 toward one end 4a of the shaft 4.

In FIG. 22, in a state where the intermediate gear 2 is not inserted into the shaft 4, the mounting angle θ is the same as an angle between the base 11d of the leaf spring 11, which is secured to the wall 72 of the main base 10, and the side surface 73 of the wall 72 that is toward the intermediate gear 2 and that is among surfaces of the wall 72, where the hole 10a through which the one end 4a of the shaft 4 is inserted is formed at the surfaces of the wall 72. Note that the side surface 73 and the shaft 4 according to the present embodiment are set at a right angle, but may not be limited to the example described above. When the intermediate gear 2 is incorporated into the shaft 4, the sliding portion 11a of the leaf spring 11 comes into contact with the sliding portion 2e of the intermediate gear 2, and thus the leaf spring 11 is deflected at a predetermined amount. In such a manner, the mounting angle θ is set to be an angle that causes a force to preload the intermediate gear 2 to be appropriately applied in the axial direction Td of the shaft 4. Thus, the leaf spring 11 preloads the intermediate gear 2 in a given direction from the one end 4a of the shaft 4 to the other end 4b of the shaft 4. Accordingly, movement of the intermediate gear 2 due to a total force for the first thrust force and the second thrust force in the direction from the other end 4b of the shaft 4 to the one end 4a of the shaft 4 can be restricted. As a result, decreases in rotation accuracy of the layshaft gear 5 can be avoided. Note that the increased preloading force results in an increase in sliding resistance while the intermediate gear 2 illustrated in FIG. 22 is rotating. For this reason, the mounting angle θ is desirably set to an appropriate value that causes a sufficient preloading force allowing restriction of the movement of the intermediate gear 2 through a given thrust force, as well as minimizing the sliding resistance during rotation of the intermediate gear 2. In order to set the mounting angle θ to such an appropriate value, it is necessary to increase surface accuracy of the leaf-spring mounting surface 10e on which the leaf spring 11 is mounted, and to reduce an error of the mounting angle of the base 60 relative to the wall 70.

In the absolute encoder 100-2 according to the second embodiment, the main base 10 is formed from die-cast aluminum, and for example, a smaller error margin of the mounting angle of the wall 70 relative to the base 60 can be set in comparison to a case where an individually fabricated base 60 and the wall 70 are combined with each other by sheet metal. Thus, surface accuracy of the leaf-spring mounting surface 10e can be increased. As a result, the error margin of the mounting angle θ of the wall 72 relative to the leaf spring 11 is decreased and thus the control of the preloading force is facilitated.

As illustrated in FIG. 26, the main base 10 is secured with three screws 14 that are inserted through three holes formed in the main base 10 and that are screwed into screw holes formed in the motor 200. A screw hole 10v, a screw hole 10u, and a screw hole 10w are respectively formed in the positive Z-axis direction, on tip sides of the pillar 10q, the pillar 10m, and the pillar 10s each of which extends from the main base 10 in the positive Z-axis direction. The respective substrate mounting screws 13 inserted into the hole 20c, the hole 20e, and the hole 20d in the substrate 20, as illustrated in FIG. 18, are screwed into the screw hole 10v, the screw hole 10u, and the screw hole 10w. In such a manner, an upper end surface 10r of the pillar 10q, an upper end surface 10p of the pillar 10m, and an upper end surface 10t of the pillar 10s contact the lower surface 20-1 of the substrate 20 as illustrated in FIG. 28. The lower surface 20-1 of the substrate 20 is a surface that faces the main base 10 and that is among two substrate surfaces of the substrate 20 in the Z-axis direction. As a result, the location of the substrate 20 in the Z-axis direction is determined.

As illustrated in FIG. 17, FIG. 30 to FIG. 32, and the like, the case 15 has a top portion 15-1, a first side portion 15A, a second side portion 15B, a third side portion 15C, and a fourth side portion 15D, and is a box-shaped member of which one side is open. For example, the case 15 is made of resin and is a integrally molded member. The top portion 15-1 corresponds to a bottom of a given box-shaped member. The top portion 15-1 has a surface facing the upper surface 20-2 of the substrate 20 illustrated in FIG. 18. The upper surface 20-2 of the substrate 20 is a substrate surface opposite the lower surface 20-1 of the substrate 20. The first side portion 15A is a plate-shaped member extending from a given side of the top portion 15-1 in the positive X-axis direction, toward the negative Z-axis direction. The second side portion 15B is a plate-shaped member extending from a given side of the top portion 15-1 in the negative X-axis direction, toward the negative Z-axis direction. The third side portion 15C is a plate-shaped member extending from a given side of the top portion 15-1 in the negative Y-axis direction, toward the negative Z-axis direction. The fourth side portion 15D is a plate-shaped member extending from a given side of the top portion 15-1 in the positive Y-axis direction, toward the negative Z-axis direction. The shape of the case 15 in a plan view is a rectangular shape corresponding to the shape of the motor 200 in a plan view. A plurality of components provided in the absolute encoder 100-2 are accommodated in a given space in the case 15.

As illustrated in FIG. 31, the case 15 includes a tab 15a, a tab 15b, a tab 15c, a hole 15d, a recessed portion 15e, a recessed portion 15f, a recessed portion 15g, a connector case 15h, and an opening 15i. The tab 15a is provided near an end portion of the fourth side portion 15D in the negative Z-axis direction. The tab 15a extends from the fourth side portion 15D toward the negative Y-axis direction so as to face the third side portion 15C. The tab 15a is engaged with the recessed portion 10aa provided in the main base 10, as illustrated in FIG. 30. The tab 15b is provided near an end portion of the third side portion 15C in the negative Z-axis direction. The tab 15b extends from the third side portion 15C toward the positive Y-axis direction so as to face the fourth side portion 15D. The tab 15b is engaged with a recessed portion 10ab provided in the main base 10, as illustrated in FIG. 30. The tab 15c is provided near an end portion of the second side portion 15B in the negative Z-axis direction. The tab 15c extends from the second side portion 15B toward the negative X-axis direction so as to face the first side portion 15A. The tab 15c is engaged with a recessed portion 10ac provided in the main base 10, as illustrated in FIG. 30.

The recessed portion 15e, the recessed portion 15f, and the recessed portion 15g, as illustrated in FIG. 31, are recessed portions each of which recesses a portion of a top 5-1 of the case 15 toward the positive Z-axis direction, in order to avoid interference with a head of a given substrate mounting screw among the three substrate mounting screws 13 illustrated in FIG. 18.

The connector case 15h is a recessed portion to recess a portion of the top 5-1 of the case 15 toward the positive Z-axis direction, in order to cover the connector 24 illustrated in FIG. 18. The bottom shape of the connector case 15h is rectangular in a plan view. The connector case 15h is provided in a given region that is toward the first side portion 15A with respect to a middle portion of the top 15-1 in the X-axis direction and that is proximal to the middle portion of the top 15-1 in the Y-axis direction, in the top 15-1 of the case. The connector case 15h is provided at a portion near the first side portion 15A, in the given region described above.

The opening 15i is formed between the bottom of the connector case 15h and the first side portion 15A. The connector 24 illustrated in FIG. 18 is disposed so as to face the bottom of the connector case 15h. The connector 24 is, for example, an internal connector, and an external connector provided for one end of an external wire is inserted into the connector 24. The external connector is inserted into the connector 24 disposed in the connector case 15h, through the opening 15i illustrated in FIG. 31. In such a manner, a conductive terminal of the internal connector provided for one end of the external wire is electrically connected to a conductive terminal provided at the connector 24. As a result, an external device connected to the other end of the external wire, and the connector 24 are electrically connected together and thus signals can be transmitted between the absolute encoder 100-2 and the external device.

Further, the connector case 15h is provided at a location near the first side portion 15A, and the location of the connector 24 in a plan view corresponds to the location of a connector 400 set when the motor 200 is viewed from a given plane, as illustrated in FIG. 18. By configuring the absolute encoder 100-2 in such a manner, a drawn location of the external wire to be electrically connected to a given conductive pin provided at the connector 24 can become closer to a drawn location of the external wire to be electrically connected to a given conductive pin provided at the connector 400. Thus, these external wires can be bundled together near each of the absolute encoder 100-2 and the motor 200, thereby causing the resulting bundled wires to be easily drawn to a given external device.

As illustrated in FIG. 29, the magnetic sensor 40, the magnetic sensor 50, a microcomputer 21, a bidirectional driver 22, and a line driver 23 are provided on the lower surface 20-1 of the substrate 20. The lower surface 20-1 of the substrate 20 is a mounting surface for the magnetic sensor 40 and the magnetic sensor 50. As described above, the lower surface 20-1 of the substrate 20 contacts an upper end surface 10r of the pillar 10q, an upper end surface 10p of the pillar 10m, and an upper end surface 10t of the pillar 10s. As illustrated in FIG. 20, the pillar 10q, the pillar 10m, and the pillar 10s are provided on the main base 10 such that a difference in a separation distance between given pillars is decreased when the main base 10 is viewed from a given plane. For example, the pillar 10q is provided near the second side 302, in the proximity of the middle portion of the main base 10 in the Y-axis direction. The pillar 10q is integral with the wall 80. The pillar 10m is provided near a corner at which the first side 301 and the fourth side 304 meet. The pillar 10s is provided near the third side 303 in the proximity of the middle portion of the main base 10 in the X-axis direction. The pillar 10s is integrated with the wall 70 and the substrate positioning pin 10g. In such a manner, by providing the pillar 10q, the pillar 10m, and the pillar 10s, the locations, in the Z-axis direction, of the magnetic sensor 40 and the magnetic sensor 50 provided on the substrate 20 can be determined accurately. Note that when the pillar 10q, the pillar 10m, and the pillar 10s are each formed in the X-Y plane direction at a location of the main base 10 to the extent possible to be away from other pillars, the location of the substrate 20 can be maintained more stably.

In the absolute encoder 100-2 according to the second embodiment, the main base 10 is formed by die-casting. In such a manner, positional accuracy between given components is improved in comparison to a case where the base 60 of the main base 10 is fabricated by, for example, sheet metal, and then, the pillar 10q, the pillar 10m, the pillar 10s, the substrate positioning pin 10g, the substrate positioning pin 10j, the wall 70, the wall 80, and the like are individually fabricated to subsequently assemble such components. Further, the number of components to be used during manufacture is reduced, and thus the structure of the absolute encoder 100-2 can be simplified. Moreover, a manufacturing time can be reduced due to ease of assembly, thereby allowing for increased reliability of the absolute encoder 100-2.

The magnetic sensor 40 is an example of a main spindle angular sensor. The magnetic sensor 40 is positioned directly above the permanent magnet 9, at a predetermined distance from the permanent magnet 9. By detecting changes in magnetic flux induced through the permanent magnet 9 in accordance with rotation of the permanent magnet 9, which rotates together with the main spindle gear 1, the magnetic sensor 40 detects and determines a corresponding rotation angle of the main spindle gear 1, and then outputs, as a digital signal, angle information indicating the determined rotation angle.

The magnetic sensor 50 is an example of an angular sensor. The layshaft gear 5 is a rotating body that rotates in accordance with rotation of the worm wheel 5a, which is a second driven gear. The magnetic sensor 50 is positioned directly above the permanent magnet 8, at a predetermined distance from the permanent magnet 8. By detecting changes in magnetic flux induced through the permanent magnet 8 in accordance with rotation of the permanent magnet 8, which rotates together with the layshaft gear 5, the magnetic sensor 50 detects and determines a given rotation angle of the layshaft gear 5, and then outputs, as a digital signal, angle information indicating the determined rotation angle.

For example, each of the magnetic sensor 40 and the magnetic sensor 50 includes a sensing element to detect changes in magnetic flux, and an arithmetic circuit to output a digital signal indicating a rotation angle, based on the output of the sensing element. The example of the sensing element may be a combination of elements for sensing a magnetic field, such as a Hall element and a giant magneto resistive (GMR) element. The number of elements for sensing a magnetic field is, for example, four.

When the number of threads of the worm gear 1d of the main spindle gear 1 is 4, and the number of teeth of the worm wheel 2a of the intermediate gear 2 is 20, a deceleration ratio is 5. That is, when the main spindle gear 1 rotates 5 revolutions, the intermediate gear 2 rotates one revolution. When the number of threads of the worm gear 2b of the intermediate gear 2 is 1, and the number of teeth of the worm wheel 5a of the layshaft gear 5 is 18, a deceleration ratio is 18. That is, when the intermediate gear 2 rotates 18 revolutions, the layshaft gear 5 rotates one revolution. In such a manner, when the main spindle gear 1 rotates 90 revolutions, the intermediate gear 2 rotates 18 revolutions, which is given by 90÷5, and the layshaft gear 5 rotates one revolution, which is given by 18÷18.

The permanent magnets 9 and 8 are respectively provided with respect to the main spindle gear 1 and the layshaft gear 5 each of which rotates together with a given permanent magnet among the permanent magnets 9 and 8. In such a manner, each of the magnetic sensor 40 and the magnetic sensor 50, corresponding to a given gear, detects a given rotation angle of the given gear among the main spindle gear 1 and the layshaft gear 5, and a rotation amount of the motor shaft 201 can be thereby determined. When the main spindle gear 1 rotates one revolution, the layshaft gear 5 rotates one ninetieth of one revolution, that is, at 4 degrees. In this case, when the rotation angle of the layshaft gear 5 is less than 4 degrees, a rotation amount of the main spindle gear 1 is less than one revolution, and when the rotation angle of the layshaft gear 5 is 4 degrees or more and is less than 8 degrees, the rotation amount of the main spindle gear 1 is one revolution or more and is less than 2 revolutions. In such a manner, the absolute encoder 100-2 can determine a rotation speed of the main spindle gear 1 in accordance with the rotation angle of the layshaft gear 5. In particular, the absolute encoder 100-2 can utilize a reduction ratio between the worm gear 1d and the worm wheel 2a, as well as a reduction ratio between the worm gear 2b and the worm wheel 5a, to determine the rotation speed of the main spindle gear 1 even when the rotation speed of the main spindle gear 1 is defined by a plurality of revolutions.

The microcomputer 21, the bidirectional driver 22, the line driver 23, and the connector 24 are mounted on the substrate 20. The microcomputer 21, the bidirectional driver 22, the line driver 23, and the connector 24 are electrically connected together by pattern wiring on the substrate 20.

The microcomputer 21 is configured by a central processing unit (CPU), acquires a digital signal indicating a given rotation angle to be output from each of the magnetic sensor 40 and the magnetic sensor 50, and calculates a given rotation amount of the main spindle gear 1.

The bidirectional driver 22 performs bidirectional communication with an external device to be connected to the connector 24. The bidirectional driver 22 converts data such as an operation signal, into a differential signal to thereby perform communication with the external device. The line driver 23 converts data indicating a given rotational amount into a differential signal, and outputs the differential signal in real time to the external device connected to the connector 24. A given connector of the external device is connected to the connector 24.

Figure 33:
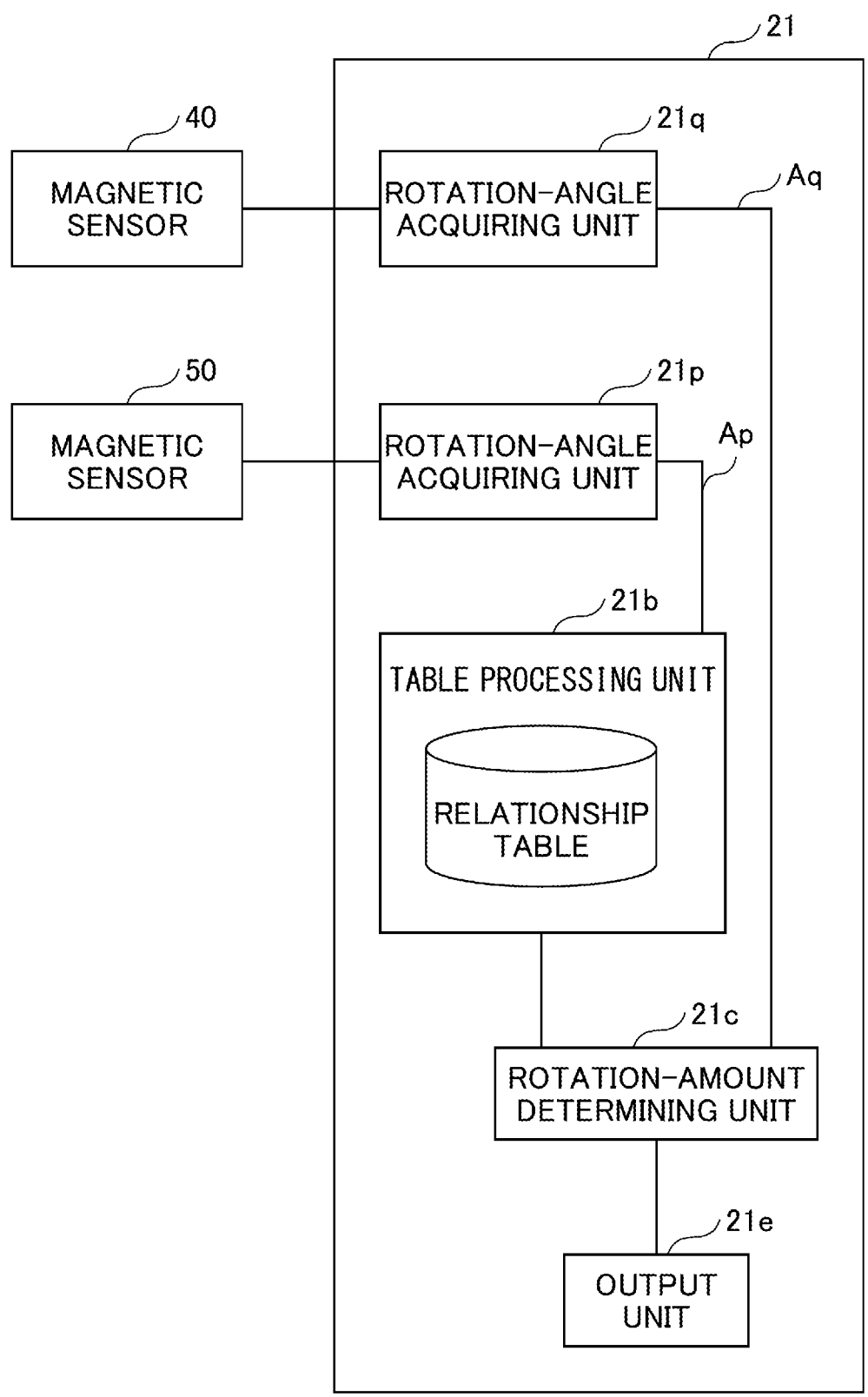
FIG. 33 is a diagram illustrating a functional configuration of a microcomputer 21 included in the absolute encoder 100-2 according to the second embodiment of the present invention.

FIG. 33 is a diagram illustrating a functional configuration of the microcomputer 21 provided in the absolute encoder 100-2 according to the second embodiment of the present invention. Each block of the microcomputer 21 illustrated in FIG. 33 represents a function implemented when the CPU as the microcomputer 21 executes a program.

The microcomputer 21 includes a rotation-angle acquiring unit 21p, a rotation-angle acquiring unit 21q, a table processing unit 21b, a rotation-amount determining unit 21c, and an output unit 21e. The rotation-angle acquiring unit 21q acquires a rotation angle Aq of the main spindle gear 1 based on a signal output from the magnetic sensor 40. The rotation angle Aq corresponds to angle information indicating a given rotation angle of the main spindle gear 1. The rotation-angle acquiring unit 21p acquires a rotation angle Ap of the layshaft gear 5 based on a signal output from the magnetic sensor 50. The rotation angle Ap corresponds to angle information indicating a given rotation angle of the layshaft gear 5. The table processing unit 21b determines a rotation speed of the main spindle gear 1 corresponding to the acquired rotation angle Ap, with reference to a relationship table that stores the rotation angle Ap and the rotation speed of the main spindle gear 1 associated with the rotation angle Ap. The rotation-amount determining unit 21c determines a rotation amount corresponding to a plurality of revolutions of the main spindle gear 1, based on the rotation speed of the main spindle gear 1 determined by the table processing unit 21b, as well as on the acquired rotation angle Aq. The output unit 21e converts the determined rotation amount corresponding to the plurality of revolutions of the main spindle gear 1, into information indicating the determined rotation amount, and outputs the information.

As illustrated in FIG. 21 and the like, the layshaft gear 5 is provided on the side opposite the main spindle gear 1 with respect to the intermediate gear 2, and thus occurrence of magnetic interference to influence a given magnetic sensor not corresponding to a given permanent magnet among the permanent magnet 8 and the permanent magnet 9 can be reduced. In such a manner, by employing a structure capable of reducing the occurrence of the magnetic interference, a relatively reduced size of the absolute encoder 100-2 can be set when the absolute encoder 100-2 is viewed from a plane. Accordingly, the size of the absolute encoder 100-2 is reduced, as well as allowing for prevention of decreases in accuracy of each of the magnetic sensor 40 and the magnetic sensor 50 to detect magnetic flux.

Further, in the absolute encoder 100-2 according to the second embodiment, the intermediate gear 2 disposed parallel to the upper surface of the main base 10 extends obliquely with respect to each of the four sides of the main base 10, and further, the main spindle gear 1 and the layshaft gear 5 are disposed on opposed sides with respect to the intermediate gear 2. In such a manner, the main spindle gear 1, the intermediate gear 2, and the layshaft gear 5 can be disposed in a small region being a portion of the entire region of the upper surface of the main base 10, thereby reducing the dimensions of the absolute encoder 100-2 with respect to the horizontal direction.

Further, in the absolute encoder 100-2 according to the second embodiment, the outer diameter of the worm wheel 2a and the outer diameter of the worm gear 2b are each set to a value to the minimum extent possible. Thus, the dimension of the absolute encoder 100-2 with respect to the Z-axis direction (height direction) can be reduced.

As described above, the absolute encoder 100-2 according to the second embodiment has the effect of reducing the dimension with respect to the Z-axis direction, as well as the dimensions with respect to the directions perpendicular to the Z-axis direction, while preventing the decrease in detection accuracy of a given rotation amount of the main spindle gear 1.

Moreover, in the absolute encoder 100-2 according to the second embodiment, the intermediate gear 2 is pivoted with respect to the shaft 4 that is secured to the wall 80 and that is inserted into the wall 72. In other words, the intermediate gear 2 is rotatably supported with respect to the shaft 4. However, as long as the intermediate gear 2 can be pivoted, a method of supporting the intermediate gear 2 is not limited to the example described above.

For example, the absolute encoder 100-2 is configured such that one end 4a of the shaft 4 is inserted into the hole 10a formed in the wall 72 and the other end 4b of the shaft 4 is press-fitted into the hole 10b formed in the wall 80. Further, the absolute encoder 100-2 may be configured such that the outer ring 3a of the bearing 3 is press-fitted into and secured to the press-fit portion 2d formed in the intermediate gear 2 and the shaft 4 is press fitted into and secured to the inner ring 3b of the bearing 3. In such a manner, the movement of the intermediate gear 2 secured to the shaft 4 in the axial direction Td is restricted. Even when the absolute encoder 100-2 is configured as described above, the intermediate gear 2 is rotatably supported by the shaft 4. Further, the wall 72 and the wall 80 restrict the movement of the shaft 4 in the axial direction Td, and the inner ring 3b of the bearing 3 secured to the shaft 4 also restricts the movement of the intermediate gear 2 in the axial direction Td. Accordingly, the use of the leaf spring 11 is not applied.

Alternatively, for example, without using the bearing 3 illustrated in FIG. 22, the absolute encoder 100-2 may be configured such that in a secured state of the intermediate gear 2 to the shaft 4, the shaft 4 is rotatably supported by a bearing not illustrated, where the bearing is provided with respect to at least one among the wall 72 and the wall 80.

When an outer ring of a given bearing not illustrated is secured to the wall 72 or the wall 80, and one end 4a or the other end 4b of the shaft 4 is inserted into an inner ring of the given bearing, the intermediate gear 2 is secured to the shaft 4 and the shaft 4 is pivoted by the given bearing not illustrated. Thus, the shaft 4 and the intermediate gear 2 can rotate together. In this case, the shaft 4 is not secured to the inner ring of the bearing and is only inserted into the inner ring thereof, and thus the shaft 4 can be moved in the axial direction Td, together with the intermediate gear 2. Accordingly, the leaf spring 11 needs to preload the intermediate gear 2 in the axial direction Td to thereby determine a given location of the intermediate gear 2.

Alternatively, the outer ring of a given bearing not illustrated is secured to the wall 72 or the wall 80, and one end 4a or the other end 4b of shaft 4 may be press-fitted into the inner ring of the given bearing not illustrated. At this time, the movement of the intermediate gear 2 secured to the shaft 4 is restricted in the axial direction Td. In such a manner, the intermediate gear 2 secured to the shaft 4 is only supported rotatably by the given bearing not illustrated, and the movement of the shaft 4 in the axial direction Td is restricted. Thus, the movement of the intermediate gear 2 in the axial direction Td is restricted. Accordingly, the use of the leaf spring 11 is not applied.

As illustrated in FIG. 24, the magnetic sensor 40 primarily detects changes in magnetic flux from the permanent magnet 9 that rotates together with the main spindle gear 1, and detects and identifies a rotation angle of the main spindle gear 1. As illustrated in FIG. 25, the magnetic sensor 50 detects changes in magnetic flux from the permanent magnet 8 that rotates together with the layshaft gear 5, and detects and identifies a rotation angle of the layshaft gear 5. For the absolute encoder 100-2 according to the second embodiment, as described above, by employing a structure that can reduce the occurrence of magnetic interference, the effect of magnetic flux, from the permanent magnet 8, on the magnetic sensor 40 can be reduced. Further, the effect of magnetic flux, from the permanent magnet 9, on the magnetic sensor 50 can be reduced. That is, reductions in accuracy in detecting rotation due to magnetic interference between the main spindle gear 1 and the layshaft gear 5 can be prevented.

FIG. 34 is a diagram illustrating a permanent magnet 9A applicable to the absolute encoders 100-1 and 100-2 according to the first and second embodiments. FIG. 35 is a diagram illustrating a permanent magnet 9B applicable to the absolute encoders 100-1 and 100-2 according to the first and second embodiments. In FIG. 34, the permanent magnet 9A according to an example of a first configuration is illustrated. In the permanent magnet 9A, a first polar portion N having a first polarity, as well as a second polar portion S having a second polarity different from the first polarity, are arranged in a radial direction D1 of the permanent magnet 9A. In FIG. 35, the permanent magnet 9B according to an example of a second configuration is illustrated. In the permanent magnet 9B, in an axial direction D2, as illustrated in the figure, of the permanent magnet 9B, a first polar portion N and a second polar portion S are arranged on the left side of the figure, relative to a middle portion of the permanent magnet 9B. Further, on the right side of the figure, a first polar portion N and a second polar portion S are arranged in the axial direction D2, as illustrated in the figure, of the permanent magnet 9, in a manner such that the first polar portion N and the second polar portion S are inverted with respect to the case of the left side described above. Arrows "DM" illustrated in FIGS. 34 and 35 express magnetization directions.

Any one of the permanent magnet 9A and the permanent magnet 9B can be used as the permanent magnet 9 of each of the absolute encoders 100-1 and 100-2 according to the first and second embodiments. However, in the permanent magnet 9B, the magnetic field formed with a plurality of magnetic field lines is distributed so as to spread in the axial direction D2, in comparison to the magnetic field generated through the permanent magnet 9A. In contrast, in the permanent magnet 9A, the magnetic field formed with a plurality of magnetic field lines is distributed so as to spread in the radial direction D1, in comparison to the magnetic field generated through the permanent magnet 9B. In such a case, when the permanent magnet 9A is used in each of the absolute encoders 100-1 and 100-2 according to the first and second embodiments, magnetic interference that influences the other magnetic sensor, as described above, might be likely to occur due to the magnetic field generated so as to spread outward in the radial direction of the permanent magnet 9A.

In the absolute encoders 100-1 and 100-2 according to the modifications of the first and second embodiments, when the permanent magnet 9B is used as the permanent magnet 9, leakage magnetic flux generated from the permanent magnet 9 does not appreciably influence the magnetic sensor 50, in comparison to the case where the permanent magnet 9A is used. Also, when the permanent magnet 9B is used as the permanent magnet 8, leakage flux from the permanent magnet 8 does not appreciably influence the magnetic sensor 40, in comparison to the case where the permanent magnet 9A is used. As a result, reductions in accuracy in detecting a rotation angle or a rotation amount of each of the layshaft gear 5 and the main spindle gear 1 can be mitigated. Further, the absolute encoders 100-1 and 100-2 can be made more compact, because reductions in accuracy in detecting the rotation angle or the rotation amount can be mitigated.

Note that the absolute encoder 100-1 according to the first embodiment is configured such that the central axes of the permanent magnets 8 and the magnet holder 6 coincide with each other, as in the permanent magnet 8 and the magnet holder 6 illustrated in FIG. 36. Also, the absolute encoder 100-1 according to the first embodiment is configured such that the central axes of the permanent magnet 17 and the second layshaft gear 138 coincide with each other, as in the permanent magnet 8 and the magnet holder 6 illustrated in FIG. 36. Further, the absolute encoder 100-1 according to the first embodiment is configured such that the central axes of the permanent magnet 9 and the main spindle gear 1 coincide with each other, as in the permanent magnet 9 and the main spindle gear 1 illustrated in FIG. 37. With such a configuration, the absolute encoder 100-1 according to the first embodiment can detect a given rotation angle or a given rotation amount with higher accuracy.

A method of fixing the substrate 120 described in the first embodiment is applicable to any absolute encoder, as long as it is an absolute encoder employing at least one configuration in which a circuit board including a sensor to detect a rotation amount of a rotating body is secured to a top end surface of multiple pillars. For example, the method of fixing the substrate 120 described in the first embodiment is also applicable to the absolute encoder described in the second embodiment with reference to FIGS. 17 to 33.

Figure 38:
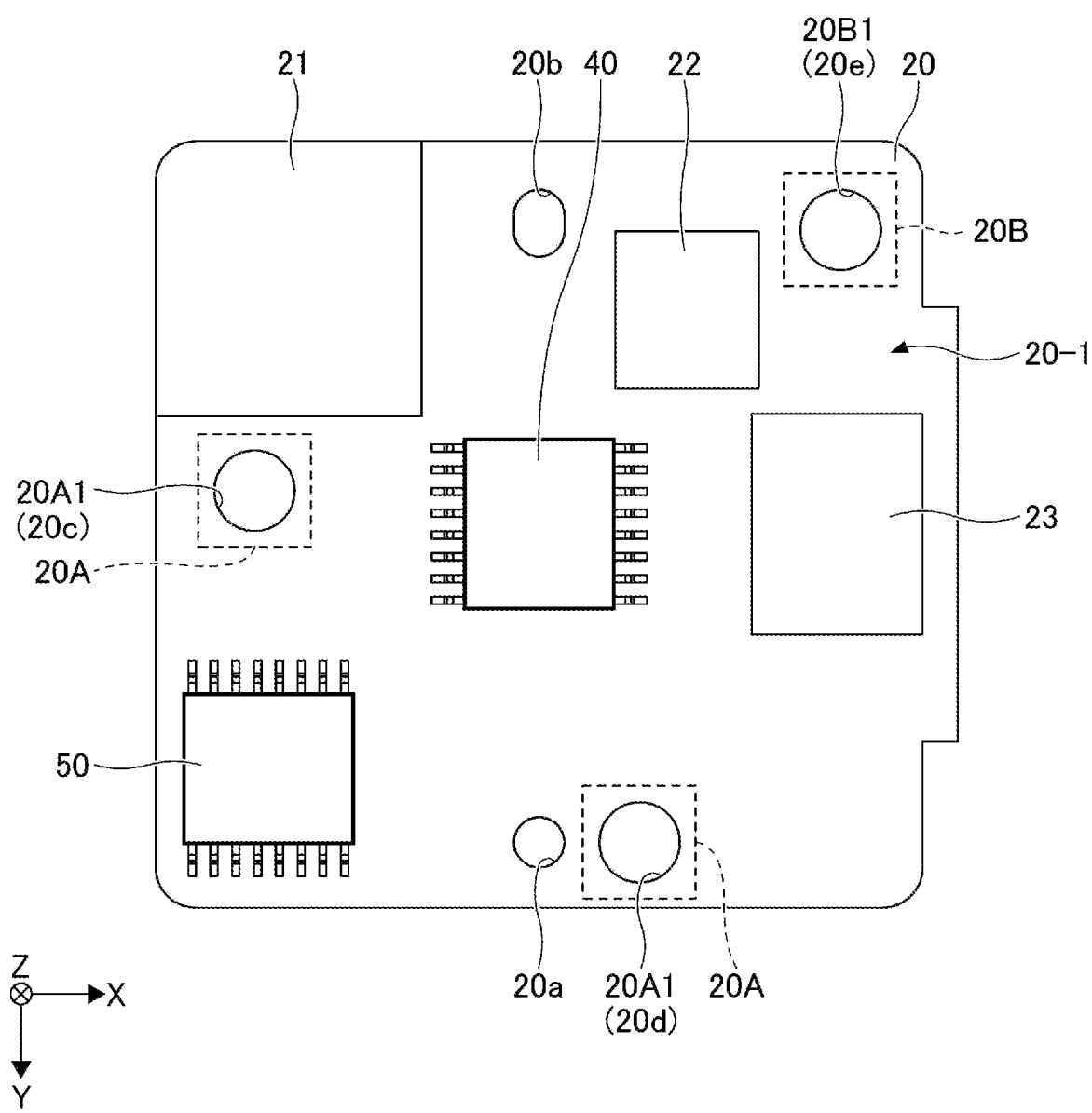
FIG. 38 is a bottom view of the substrate 20 provided in the absolute encoder 100-2, where first fixing portions 20A and a second fixing portion 20B are arranged according to the second embodiment.

For example, FIG. 38 is a bottom view of the substrate 20 of the absolute encoder 100 (e.g., an absolute encoder is a 25 mm per side square in a plan view from the top or the bottom) according to the second embodiment, where a given first fixing portion 20A and the second fixing portion 20B of the substrate 20 are arranged.

In the absolute encoder 100-2 according to the second embodiment, as illustrated in FIG. 24, the detection surface (lower surface) of the magnetic sensor 40 provided on the substrate 20 and the upper surface 9a of the permanent magnet 9 are made parallel to each other, and thus the rotation angle of the main spindle gear 1 (which is an example of a "rotating body") can be detected by the magnetic sensor 40 with relatively high accuracy.

In contrast, in the absolute encoder 100-2 according to the second embodiment, as illustrated in FIG. 19 and FIG. 20, the column 10m, the column 10q, and the column 10s are disposed on the main base 10. Also, as illustrated in FIG. 18, the absolute encoder 100-2 according to the second embodiment employs a construction in which the column 10m, the column 10q, and the column 10s are respectively screwed and fixed at three fixing portions of the substrate 20 by the substrate mounting screws 13 (each of which is an example of a "locking section").

In such a manner, in the absolute encoder 100-2 according to the second embodiment, if heights of the substrate 20 at the three fixing portions differ from one another, the substrate 20 is inclined, and thus the detection surface of the magnetic sensor 40 and the upper surface 9a of the permanent magnet 9 might be not parallel to each other. Also, accuracy in the distance between the detection surface of the magnetic sensor 40 and the upper surface 9a of the permanent magnet 9 is decreased, and thus detection accuracy of the magnetic sensor 40 might be reduced.

In particular, in the absolute encoder 100-2 according to the second embodiment, at one among the three fixing portions of the substrate 20, a connection terminal that is screwed and fixed by a given substrate mounting screw 13 and that is connected to a ground is provided. The height of the substrate 20 at a given fixing portion at which the connection terminal is provided is likely to differ from the height of the substrate at other fixing portions, because a configuration of the substrate at the given fixing portion differs from that of the substrate at other fixing portions.

Therefore, as described below, the absolute encoder 100-2 according to the second embodiment employs a configuration in which the substrate 20 can be fixed to a column 10m, a column 10q, and a column 10s, such that heights of the substrate 20 at corresponding three fixing portions are the same. In such a manner, in the absolute encoder 100-2 according to the second embodiment, the substrate 20 can be fixed in a state of being maintained horizontally. Thus, the detection surface of the magnetic sensor 40 and the upper surface 9a of the permanent magnet 9 can be parallel to each other. Accordingly, the absolute encoder 100-2 according to the second embodiment can mitigate reductions in detection accuracy of the magnetic sensor 40.

Specifically, as illustrated in FIG. 38, the substrate 20 provided in the absolute encoder 100-2 includes two first fixing portions 20A and one second fixing portion 20B.

At each first fixing portion 20A, a portion at which a through-hole 20A1 passing through the substrate 20 vertically (in the Z-axis direction in the figure) is included. Each first fixing portion 20A is a portion at which the substrate is screwed and fixed to a given first pillar portion 10A provided on the main base 10, by a given substrate mounting screw 13 passing through the through-hole 20A1, from the top to bottom thereof. In the example illustrated in FIG. 38, holes 20c and 20d, among three holes 20c, 20e, and 20d provided in the substrate 20, correspond to respective through-holes 20A1 at the first fixing portions 20A. In such a manner, respective first pillars 10A correspond to the columns 10q and 10s, among the column 10m, the column 10q, and the column 10s that are provided on the main base 10.

At the second fixing portion 20B, a through-hole 20B1 passes through the substrate 20 vertically (Z-axis direction in the figure), as well as the connection terminal 20h (see FIG. 13) formed in the through-hole 20B1, are provided. The second fixing portion 20B is a portion at which in the through hole 20B1, the substrate is screwed and fixed to the second pillar 10B provided on the main base 13, by a given substrate mounting screw 13 passing through the connection terminal 20h, from the top to bottom thereof. The above portion is connected to a ground.

In the example illustrated in FIG. 38, the hole 20e, among the three holes 20c, 20e, and 20d provided in the substrate 20, corresponds to the through-hole 20B1 at the second fixing portion 20B. Accordingly, the second pillar 10B corresponds to the pillar 10m among the pillar 10m, the pillar 10q, and the pillar 10s that are provided on the main base 10.

In such a configuration, as in the first embodiment, at each of two first fixing portions 20A of the substrate 20 provided in the absolute encoder 100-2, by providing the adjustment portion 20C or the adjustment portion 20D, the height of the substrate at each of two fixing portions 20A is set to be the same as the height of the substrate at the second fixing portion 20B. Thus, the substrate 20 can be fixed in a horizontal state.

As a result, in the absolute encoder 100-2 according to the second embodiment, as illustrated in FIG. 24, the detection surface of the magnetic sensor 40 provided on the substrate 20 and the upper surface of the permanent magnet 9 provided on the main spindle gear 1 are parallel to each other, and a given distance between their surfaces is maintained in a state of being at a fixed distance with high accuracy. Therefore, according to the absolute encoder 100-2 according to the second embodiment, reductions in detection accuracy of the magnetic sensor 40 can be mitigated.

Note that in the absolute encoder 100-2 according to the second embodiment, as in the absolute encoder 100-1 according to the second embodiment, a given dummy line layer (or dummy connection terminal) illustrated in FIG. 15 and FIG. 16 may be also used as the adjustment portion 20D.

Note that in the first embodiment and the second embodiment, a screw is used as an example of a "locking section", but is not limited thereto. For example, a rivet or the like may be used as a "locking section". Further, in the first embodiment and the second embodiment, a given resist layer and line layer are used as an example of an "adjustment portion." However, there is no limitation to the manner described above. For example, a spacer or the like may be used as the "adjustment portion". Note, however, that for the "adjustment portion", with use of a resist layer or a line layer, the "adjustment unit" can be formed together with the resist layer or the line layer that is entirely formed on or above the substrate.

Note that the configuration illustrated in one or more embodiments described above is an example of the present invention. The configuration can be combined with another known technique. Alternatively, a portion of the configuration can be omitted or changed without departing from a spirit of the present invention.

Note that this International application claims priority under the Japanese Patent Application No. 2019-068117, filed Mar. 29, 2019, the contents of which are incorporated herein by reference in their entirety.

REFERENCE SIGNS LIST 1 main spindle gear, 1a first cylindrical portion, 1b second cylindrical portion, 1c communicating portion, 1d worm gear, 1e bottom, 1f press-fit portion, 1g bottom, 1h magnet holding portion, 2 intermediate gear, 2a worm wheel, 2b worm gear, 2c shaft receiving portion, 2d press-fit portion, 2e sliding portion, 2f bottom, 2g through-hole, 3 bearing, 3a outer ring, 3b inner ring, 3c side surface, 3d side surface, 4 shaft, 4a one end, 4b the other end, 5 layshaft gear, 5-1 top, 5a worm wheel, 5b through-hole, 6 magnet holder, 6a magnet holding portion, 6b shaft, 6c head, 7 bearing, 7a outer ring, 7b inner ring, 8 permanent magnet, 8a surface, 9 permanent magnet, 9a upper surface, 9b lower surface, 10 main base, 10-1 opening, 10-2 lower surface, 10-3 wall surface, 10a hole, 10aa recessed portion, 10ab recessed portion, 10ac recessed portion, 10ad mounting surface, 10ae screw hole, 10b hole, 10c contact surface, 10d bearing holder, 10da lower portion, 10db upper portion, 10dc inner peripheral surface, 10e leaf-spring mounting surface, 10f screw hole, 10g substrate positioning pin, 10g1 base, 10h distal end, 10i stepped portion, 10j substrate positioning pin, 10j1 base, 10k distal end, 10l stepped portion, 10m pillar, 10p upper end surface, 10q pillar, 10r upper end surface, 10s pillar, 10t upper end surface, 10u screw hole, 10v screw hole, 10w screw hole, 11 leaf spring, 11a sliding portion, 11b mounting portion, 11c hole, 11d base, 12 screw, 13 substrate mounting screw, 14 screw, 15 case, 15-1 top portion, 15A first side portion, 15B second side portion, 15C third side portion, 15D fourth side portion, 15a tab, 15b tab, 15c tab, 15d hole, 15e recessed portion, 15f recessed portion, 15g recessed portion, 15h connector case, 15i opening, 16 mounted screw, 17 permanent magnet, 20 substrate, 20-1 lower surface, 20-2 upper surface, 20a positioning hole, 20b positioning hole, 20c hole, 20d hole, 20e hole, 21 microcomputer, 21b table processing unit, 21c rotation-amount determining unit, 21e output unit, 21p rotation-angle acquiring unit, 21q rotation-angle acquiring unit, 22 bidirectional driver, 23 line driver, 24 connector, 40 magnetic sensor, 40a surface, 50 magnetic sensor, 50a surface, 60 base, 61 magnetic flux shielding portion, 61 first plate surface, 61a second plate surface, 61c first end surface, 61d second end surface, 61e third end surface, 62 magnetic flux shielding portion, 62a first plate surface, 62b second end surface, 62c first end surface, 62d second end surface, 62e third end surface, 164 screw, 70 wall, 71 wall, 72 wall, 73 side surface, 80 wall, 90 magnetic sensor, 100-1 absolute encoder, 100-2 absolute encoder, 101 main spindle gear, 101a first cylindrical portion, 101b disk portion, 101c worm gear, 101d magnet holding portion, 102 first intermediate gear, 102a worm wheel, 102b first worm gear, 102c base, 102d first cylindrical portion, 102e second cylindrical portion, 102f third cylindrical portion, 102g hemispherical protrusion, 102h second worm gear, 102i sliding portion, 105 first layshaft gear, 105a worm wheel, 105b shaft receiving portion, 105c disk portion, 105d holding portion, 106 shaft, 110 main base, 110a base, 110b supporting portion, 110c supporting portion, 107 stopper ring, 108 stopper ring, 110-1 opening, 110-1a wall surface, 111 leaf spring, 111a sliding portion, 111b mounting portion, 115 case, 115a outer wall, 115c outer wall, 115d outer wall, 116 cover, 120 substrate, 121 microcomputer, 121b table processing unit, 121c rotation-amount determining unit, 121e output unit, 121p rotation-angle acquiring unit, 121q rotation-angle acquiring unit, 121r rotation-angle acquiring unit, 133 second intermediate gear, 133a worm wheel, 133b shaft receiving portion, 133c extended portion, 133d fourth drive gear, 138 second layshaft gear, 138a fourth driven gear, 138b shaft receiving portion, 138c extended portion, 138d magnet holding portion, 139 shaft, 141 pillar, 200 motor, 201 motor shaft, 202 housing, 202a cut-out portion, 301 first side, 302 second side, 303 third side, 304 fourth side, 400 connector, 500 magnetic flux shielding portion, 500a first plate surface, 500b second plate surface, 500c first end surface, 500d second end surface, 500e third end surface, 501 magnetic flux shielding portion, 501a distal end surface, 502 magnetic flux shielding portion, 502a distal end surface, Td axial direction of each of intermediate gear 2 and shaft 4, 20A first fixing portion, 20B second fixing portion, 20C, 20D adjustment portion, 10A first pillar, 10B second pillar

The invention claimed is:

1. An absolute encoder comprising:
   a circuit board disposed away from a rotation shaft of a motor, the circuit board being in a shaft direction of the rotation shaft of the motor, the circuit board being fixed to top end surfaces of multiple pillars each extending from a motor side, and the top end surfaces of the multiple pillars being locked by respective locking sections; and
   a sensor disposed, on the circuit board, facing a rotating body that rotates in accordance with rotation of the rotation shaft, the sensor being configured to detect a rotation amount of the rotating body,
   wherein the circuit board includes
      first fixing portions each fixed to a top end surface of a first pillar among the multiple pillars, each fixing portion being locked by a corresponding locking section; and
      a second fixing portion fixed to a top end surface of a second pillar among the multiple pillars, the second fixing portion being locked by a corresponding locking section, and the second fixing portion being connected to a ground,
   wherein at each of the first fixing portions, an adjustment portion is disposed between the circuit hoard and a top end portion of a given first pillar, the adjustment portion being set to adjust a distance between the circuit board and the top end portion of the given first pillar, so that a height of the circuit board at each first fixing portion is set to be the same as a height of the circuit board at the second fixing portion, and
   wherein each adjustment portion is a resist layer formed between a surface of the circuit board and a top end surface of a given first pillar.

2. An absolute encoder comprising:
   a circuit board disposed away from a rotation shaft of a motor, the circuit board being in a shaft direction of the rotation shaft of the motor, the circuit board being fixed to top end surfaces of multiple pillars each extending from a motor side, and the top end surfaces of the multiple pillars being locked by respective locking sections; and
   a sensor disposed, on the circuit board, facing a rotating body that rotates in accordance with rotation of the rotation shaft, the sensor being configured to detect a rotation amount of the rotating body,
   wherein the circuit board includes
      first fixing portions each fixed to a top end surface of a first pillar among the multiple pillars, each fixing portion being locked by a corresponding locking section; and
      a second fixing portion fixed to a top end surface of a second pillar among the multiple pillars, the second fixing portion being locked by a corresponding locking section, and the second fixing portion being connected to a ground,
   wherein at each of the first fixing portions, an adjustment portion is disposed between the circuit board and a top end portion of a given first pillar, the adjustment portion being set to adjust a distance between the circuit board and the top end portion of the given first pillar, so that a height of the circuit board at each first fixing portion is set to be the same as a height of the circuit board at the second fixing portion, and
   wherein each adjustment portion is a line layer formed between a surface of the circuit board and a top end surface of a given first pillar.

3. The absolute encoder according to claim 2, wherein each adjustment portion is a dummy line layer that is not connected to any of other line layers that are formed on the surface of the circuit board.

4. An absolute encoder comprising:
   a circuit board disposed away from a rotation shaft of a motor, the circuit board being in a shaft direction of the rotation shaft of the motor, the circuit board being fixed to top end surfaces of multiple pillars each extending from a motor side, and the top end surfaces of the multiple pillars being locked by respective locking sections; and
   a sensor disposed, on the circuit board, facing a rotating body that rotates in accordance with rotation of the rotation shaft, the sensor being configured to detect a rotation amount of the rotating body,
   wherein the circuit board includes
      first fixing portions each fixed to a top end surface of a first pillar among the multiple pillars, each fixing portion being locked by a corresponding locking section; and
      a second fixing portion fixed to a top end surface of a second pillar among the multiple pillars, the second fixing portion being locked by a corresponding locking section, and the second fixing portion being connected to a ground,
   wherein at each of the first fixing portions, an adjustment portion is disposed between the circuit board and a top end portion of a given first pillar, the adjustment portion being set to adjust a distance between the circuit board and the top end portion of the given first pillar, so that a height of the circuit board at each first fixing portion is set to be the same as a height of the circuit board at the second fixing portion, and
   wherein at the second fixing portion, a connection terminal is fixed to a top end surface of the second pillar by a given locking section and is connected to a ground, and
   wherein a thickness of each adjustment portion is the same as a thickness of a portion of the connection terminal protruding from the circuit board toward the top end surface of the second pillar.

\* \* \* \* \*